US010728259B2

(12) United States Patent
McCarter et al.

(10) Patent No.: US 10,728,259 B2
(45) Date of Patent: Jul. 28, 2020

(54) DYNAMIC AUTHORIZATION OF PRE-STAGED DATA EXCHANGES BASED ON CONTEXTUAL DATA

(71) Applicant: The Toronto-Dominion Bank, Toronto (CA)

(72) Inventors: Robert Alexander McCarter, Eden (CA); Vipul Lalka, Oakville (CA); Nadia Moretti, Toronto (CA); Paige Dickie, Toronto (CA); Denny Kuruvilla, Toronto (CA); Dino D'Agostino, Richmond Hill (CA); Dean Tseretopoulos, Toronto (CA); Milos Dunjic, Oakville (CA); John Jong-Suk Lee, Toronto (CA); Arun Victor Jagga, Toronto (CA); Ruby Walia, Demarest, NJ (US)

(73) Assignee: The Toronto-Dominion Bank, Toronto (CA)

( * ) Notice: Subject to any disclaimer, the term of this patent is extended or adjusted under 35 U.S.C. 154(b) by 245 days.

(21) Appl. No.: 15/946,657

(22) Filed: Apr. 5, 2018

(65) Prior Publication Data
US 2019/0312883 A1 Oct. 10, 2019

(51) Int. Cl.
*H04L 29/06* (2006.01)
*G06Q 20/40* (2012.01)
(Continued)

(52) U.S. Cl.
CPC .......... *H04L 63/108* (2013.01); *G06N 20/00* (2019.01); *G06Q 20/3224* (2013.01);
(Continued)

(58) Field of Classification Search
CPC . H04L 63/108; H04L 9/3234; H04L 63/0876; H04L 9/3231; H04L 9/3239;
(Continued)

(56) References Cited

U.S. PATENT DOCUMENTS

| 9,432,804 B2* | 8/2016 | Hanson ................... H04W 4/02 |
| 2003/0061172 A1* | 3/2003 | Robinson ........... G06Q 20/3678 |
| | | 705/67 |

(Continued)

FOREIGN PATENT DOCUMENTS

CN 105868847 8/2016

OTHER PUBLICATIONS

"Wells Fargo Experimenting With 'Pre-Staging' of Transactions," Sep. 24, 2015 (3 pages).

*Primary Examiner* — J. Brant Murphy
(74) *Attorney, Agent, or Firm* — Duane Morris LLP

(57) ABSTRACT

The disclosed exemplary embodiments include computer-implemented systems, apparatuses, and processes that, among other things, dynamically authorize pre-stages data exchanges based on contextual data. For example, an apparatus may receive first data characterizing an initiation of a first exchange of data between a client device and a terminal device. Based on the first data, the apparatus may obtain second data that characterizes an expected initiation of a second exchange of data during a corresponding temporal interval, which may be specified relative to an initiation time of the first data exchange. The apparatus may generate and transmit, to a computing system, pre-authorization data that requests a pre-authorization of the second data exchange to a computing system. The pre-authorization data may include a portion of the second data and may instruct the computing system to pre-authorize the second data exchange in accordance with the second data.

20 Claims, 12 Drawing Sheets

(51) Int. Cl.
*G06Q 20/32* (2012.01)
*H04L 9/32* (2006.01)
*G06N 20/00* (2019.01)

(52) U.S. Cl.
CPC ........... *G06Q 20/40* (2013.01); *H04L 9/3234* (2013.01); *H04L 63/0876* (2013.01)

(58) Field of Classification Search
CPC .... H04L 9/088; G06N 20/00; G06Q 20/3224; G06Q 20/40
See application file for complete search history.

(56) References Cited

U.S. PATENT DOCUMENTS

| | | | | |
|---|---|---|---|---|
| 2004/0064357 A1* | 4/2004 | Hunter | ................... | G06Q 30/02 705/2 |
| 2006/0242084 A1* | 10/2006 | Moses | ................... | G06Q 20/342 705/64 |
| 2008/0114697 A1* | 5/2008 | Black | ................. | G06Q 20/4014 705/67 |
| 2010/0205063 A1* | 8/2010 | Mersky | ................... | G06Q 20/02 705/17 |
| 2010/0280880 A1* | 11/2010 | Faith | ................ | G06Q 10/06375 705/7.37 |
| 2013/0238497 A1* | 9/2013 | Ramachandran | ...... | G06Q 20/18 705/41 |
| 2014/0101034 A1* | 4/2014 | Tanner | ................... | G06Q 20/10 705/39 |
| 2016/0014552 A1* | 1/2016 | Hanson | ................... | H04W 4/02 455/456.3 |
| 2016/0104239 A1* | 4/2016 | Johnson | ................. | G06Q 40/04 705/37 |
| 2016/0132908 A1* | 5/2016 | von Walstrom | ... | G06Q 30/0202 705/7.25 |

* cited by examiner

US 10,728,259 B2

DYNAMIC AUTHORIZATION OF PRE-STAGED DATA EXCHANGES BASED ON CONTEXTUAL DATA

TECHNICAL FIELD

The disclosed embodiments generally relate to computer-implemented systems and processes that dynamically authorize pre-stages data exchanges based on contextual data.

BACKGROUND

Today, payment systems and related technologies continuously evolve in response to advances in payment instruments, such as the ongoing transition from physical transaction cards to digital payment instruments maintained on mobile devices. While these innovations result in additional mechanisms for submitting payment to an electronic or physical merchant, and for flexibly funding transactions initiated by the electronic or physical merchant, these innovations can also be susceptible to fraudulent activity.

SUMMARY

In some examples, an apparatus includes a communications unit, a storage unit storing instructions, and at least one processor coupled to the communications unit and the storage unit. The at least one processor is configured to execute the instructions to receive a first signal via the communications unit. The first signal may include first data characterizing an initiation of a first exchange of data between a client device and a terminal device. Based on the first data, the at least one processor is further configured to access and load, from the storage unit, second data that characterizes an expected initiation of a second exchange of data during a corresponding temporal interval. The temporal interval may be specified relative to an initiation time of the first data exchange. The at least one processor is further configured to generate and transmit a second signal to a computing system via the communications unit. The second signal may include pre-authorization data that requests a pre-authorization of the second data exchange, and the pre-authorization data may include a portion of the second data and a modified temporal interval that reflects the initiation time of the first data exchange. The pre-authorization data may also instruct the computing system to perform operations that pre-authorize the second data exchange in accordance with the portion of the second data and the modified temporal interval.

In other examples, a computer-implemented method includes receiving, by one or more processors, a first signal that includes first data characterizing an initiation of a first exchange of data between a client device and a terminal device, and based on the first data, accessing and loading, from a storage unit, and by the one or more processors, second data that characterizes an expected initiation of a second exchange of data during a corresponding temporal interval. The temporal interval may be specified relative to an initiation time of the first data exchange. The computer-implemented method also includes generating and transmitting, by the one or more processors, a second signal to a computing system. The second signal may include pre-authorization data that requests a pre-authorization of the second data exchange, the pre-authorization data may include a portion of the second data and a modified temporal interval that reflects the initiation time of the first data exchange. The pre-authorization data may instruct the computing system to perform operations that pre-authorize the second data exchange in accordance with the portion of the second data and the modified temporal interval.

Further, in some examples, a tangible, non-transitory computer-readable medium storing instructions that, when executed by at least one processor, performs a method that includes receiving a first signal that includes first data characterizing an initiation of a first exchange of data between a client device and a terminal device, and based on the first data, accessing and loading, from a storage unit second data that characterizes an expected initiation of a second exchange of data during a corresponding temporal interval. The temporal interval may be specified relative to the initiation time of the first data exchange, and the method also includes generating and transmitting a second signal to a computing system. The second signal may include pre-authorization data that requests a pre-authorization of the second data exchange, the pre-authorization data may include a portion of the second data and a modified temporal interval that reflects the initiation time of the first data exchange. The pre-authorization data may instruct the computing system to perform operations that pre-authorize the second data exchange in accordance with the portion of the second data and the modified temporal interval.

It is to be understood that both the foregoing general description and the following detailed description are exemplary and explanatory only and are not restrictive of the invention, as claimed. Further, the accompanying drawings, which are incorporated in and constitute a part of this specification, illustrate aspects of the present disclosure and together with the description, serve to explain principles of the disclosed embodiments as set forth in the accompanying claims.

DETAILED DESCRIPTION

Figure 1:
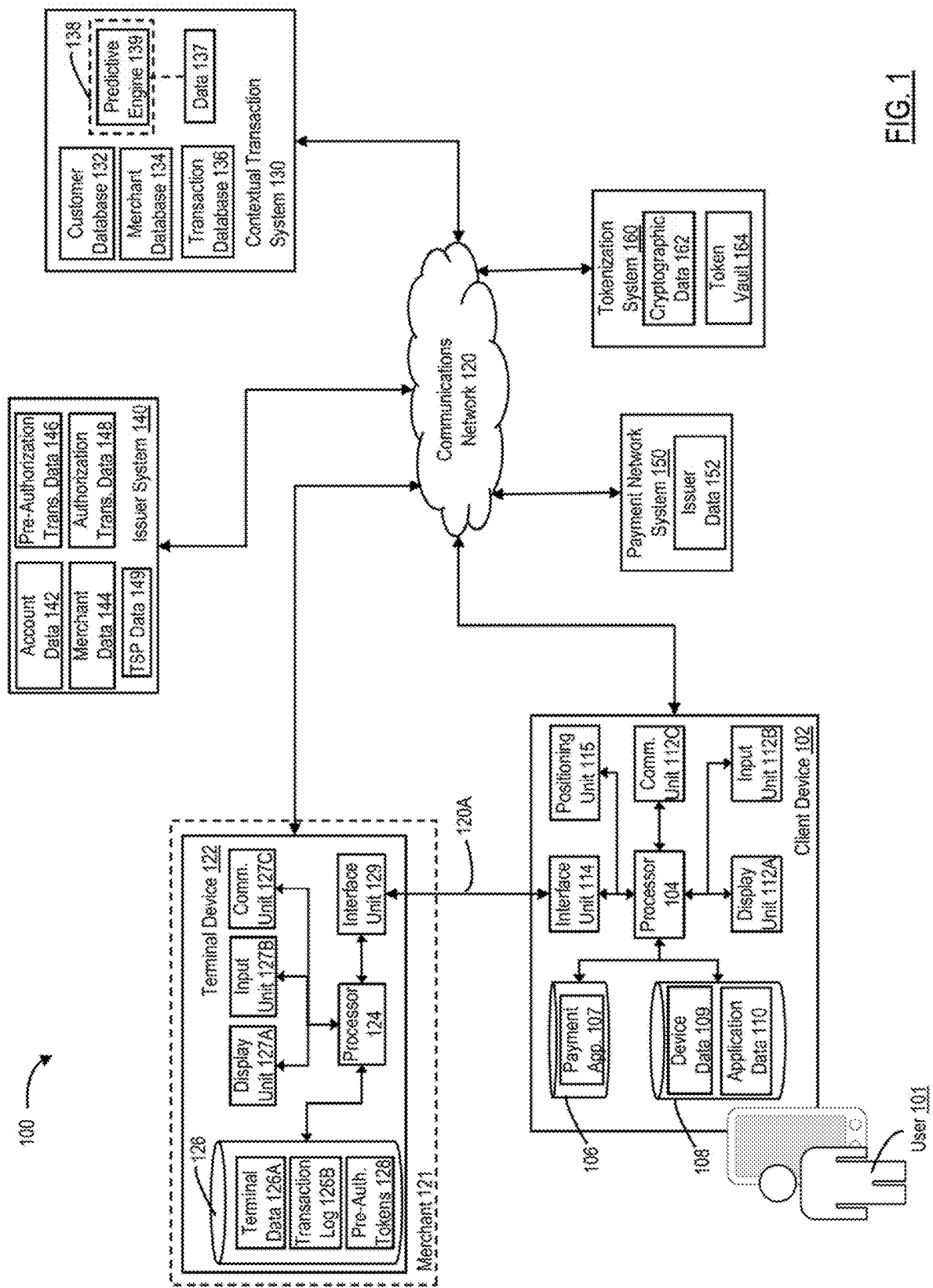
FIG. 1 is a diagram of an exemplary computing environment, consistent with the disclosed embodiments.

Reference will now be made in detail to the disclosed embodiments, examples of which are illustrated in the accompanying drawings. The same reference numbers in the drawings and this disclosure are intended to refer to the same or like elements, components, and/or parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the described subject matter.

I. Exemplary Computing Environments

FIG. 1 is a diagram illustrating an exemplary computing environment 100, consistent with certain disclosed embodiments. As illustrated in FIG. 1, environment 100 may include a client device 102, a terminal device 122, a contextual transaction system 130, an issuer system 140, a payment network system 150, and a tokenization system 160, each of which may be interconnected through any appropriate combination of communications networks, such as network 120.

Examples of network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet. In some instances, the devices and systems operating within environment 100 may perform operations that establish and maintain one or more secure channels of communication across network 120, such as, but not limited to, a transport layer security (TSL) channel, a secure socket layer (SSL) channel, or any other suitable secure communication channel.

Further, as illustrated in FIG. 1, client device 102 and terminal device 122 may also exchange data across a direct channel of communications, e.g., direct communication channel 120A. In one aspect, direct communications channel 120A may correspond to a wireless communications channel established across a short-range communications network, examples of which include, but are not limited to, a wireless LAN, e.g., a "Wi-Fi" network, a network utilizing RF communication protocols, a NFC network, a network utilizing optical communication protocols, e.g., infrared (IR) communications protocols, and any additional or alternate communications network, such as those described above, that facilitate peer-to-peer (P2P) communication between terminal device 122 and client device 102.

Terminal device 122 may, in some instances, be associated with a merchant, e.g., merchant 121, and client device 102 may be associated with or operated by a customer of merchant 121, e.g., user 101. For example, terminal device 122 may be disposed within a physical location of merchant 121, such as a location where a customer, e.g., user 101, provides payment for goods and/or services (e.g., at a cash register at merchant 121). In one aspect, client device 102 may correspond to a consumer payment device that, upon establishing communication with terminal device 122 across communications channel 120A, provides data to terminal device 122 specifying a payment instrument available for use in an initiated transaction to purchase the goods and/or services.

In an embodiment, client device 102 may include a computing device having one or more tangible, non-transitory memories that store data and/or software instructions, and one or more processors, e.g., processor 104, configured to execute the software instructions. The one or more tangible, non-transitory memories may, in some aspects, store software applications, application modules, and other elements of code executable by the one or more processors, e.g., within application repository 106. For example, as illustrated in FIG. 1, client device 102 may maintain, within application repository 106, an executable application associated with or provisioned by a financial institution that operates issuer system 140, e.g., payment application 107 that establishes and maintains a digital wallet within the one or more tangible, non-transitory memories. In other examples, application repository 106 may include additional or alternate application programs, application modules, or other code elements executable by processor 104, such as a mobile banking application associated with or provisioned by the financial institution, a merchant application associated with merchant 121, or a web browser.

Client device 102 may also establish and maintain, within the one or more tangible, non-tangible memories, one or more structured or unstructured data repositories or databases, e.g., data repository 108, that include device data 109 and application data 110. In one instance, device data 109 may include data that uniquely identifies client device 102 within environment 100, such as a media access control (MAC) address or an Internet Protocol (IP) address assigned to client device 102.

Application data 110 may include information that a performance of operations by the one or more executable application programs maintained within application repository 106, e.g., payment application 107. For example, application data 110 may include one or more unique identifiers of payment application 107 (e.g., a wallet address assigned to the digital wallet established and maintained by executed payment application 107) and data identifying one or more payment instruments available to payment application 107 (e.g., tokenized data or cryptograms representative of payment instruments provisioned to the established digital wallet).

In some examples, application data 110 may also store one or more device-specific cryptograms that uniquely identify device 102 within environment 100 and further, that enable a terminal device, such as terminal device 122, to authenticate an identity of client device 102 during a performance of any of the exemplary authorization processes described herein. Examples of the one or more device-specific cryptograms include, but are not limited to, a secure element hash value, a multi-use digital token consistent with a host card emulation (HCE) protocols, or another hash value, code, or cryptogram capable of uniquely identifying client device 102 in accordance with an appropriate payment protocol, such as an EMV payment protocol.

Referring back to FIG. 1, client device 102 may also include a display unit 112A configured to present interface elements to user 101, and an input unit 112B configured to receive input from user 101. By way of example, display unit 112A may include, but is not limited to, an LCD display unit or other appropriate type of display unit, and input unit 112B may include, but input not limited to, a keypad, keyboard, touchscreen, voice activated control technologies, or appropriate type of input device. Further, in additional aspects (not depicted in FIG. 1), the functionalities of display unit 112A and input unit 112B may be combined into a single device, e.g., a pressure-sensitive touchscreen display unit that presents interface elements and receives input from user 101. Client device 102 may also include a communications unit 112C, such as a wireless transceiver device, coupled to processor 104 and configured by processor 104 to establish and maintain communications with network 120 using any of the communications protocols described herein.

Further, in some aspects, client device 102 may include an interface unit 114, which can be configured by processor 104 to establish and maintain communications with terminal device 122 (e.g., through interface unit 128 of FIG. 1) across communications channel 120A. For example, each of interface unit 114 and interface unit 128 may include a communications device, e.g., a wireless transceiver device, capable of exchanging data across communications channel 120A using any of the short-range communications protocols described above (e.g., NFC protocols, RF communications protocols, Bluetooth™ communication protocols, optical communications protocols, etc.). Additionally, in some aspects, client device 102 may include a positioning unit 115, such as, but not limited to, a Global Positioning System (GPS) unit, an assisted GPS (aGPS) unit, or a sensor consistent with other positioning systems. Positioning unit 115 may be configured by processor 104 to determine a geographic location of client device 102 (e.g., a latitude, longitude, altitude, etc.) at regular temporal intervals.

Examples of client device 102 may include, but are not limited to, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), and any other type of computing device that may be configured to store data and software instructions, execute software instructions to perform operations, and/or display information on an interface module, consistent with disclosed embodiments. In some instances, user 101 may operate client device 102 and may do so to cause client device 102 to perform one or more operations consistent with the disclosed embodiments.

Terminal device 122 may correspond to a computing device that includes one or more tangible, non-transitory memories storing data and/or software instructions, and one or more processors, e.g., processor 124, configured to execute the software instructions. The one or more tangible, non-transitory memories may, in some aspects, store software applications, application modules, and other elements of code, which when executed by the one or more processors, cause terminal device 122 to perform operations consistent with the disclosed embodiments, as described below. Further, in certain aspects, terminal device 122 may also store and maintain a data repository, e.g., data repository 125, within the one or more tangible, non-transitory memories.

As illustrated in FIG. 1, data repository 126 may include terminal data 126A, a transaction log 126B, and pre-authorization data 126C, and. In some examples, terminal data 126A may include information that uniquely identifies terminal device 122 within network 120, such as, but not limited to, a MAC address or an IP address of terminal device. Further, transaction log 126B may include information that identifies transactions initiated at terminal device 122 and authorized using any of the exemplary processes described herein.

Pre-authorization data 126C may include elements of tokenized data that reflect a pre-authorization of expected purchase transactions between merchant 121 and one or more potential counterparties, such as user 101 that operates client device 102, during corresponding future temporal intervals. The elements of tokenized data may include one or more digital tokens, e.g., "pre-authorization" tokens, and each of the pre-authorization tokens may reflect, and include data characterizing, the pre-authorization of a corresponding one of the expected purchase transactions. By way of example, each of the expected purchase transactions may associated with a corresponding counterparty, such as user 101 that operates client device 102, and may be funded by an expected payment instrument available to and held by the corresponding counterparty, such as a Visa™ credit card held by user 101 and available to executed payment application 107.

In some examples, the pre-authorization tokens may be specific to, and valid to authorize transactions initiated by, a client device operated by the corresponding counterparty, such as client device 102 operated by user 101. For instance, each of the pre-authorization tokens may include a device-specific cryptogram that uniquely identifies client device 102 and that enables terminal device 122 to authenticate an identity of client device 102 during a performance of any of the exemplary authorization processes described herein. Examples of the one or more device-specific cryptograms include, but are not limited to, a secure element hash value, a multi-use digital token consistent with a host card emulation (HCE) protocol, or another hash value, code, or cryptogram capable of uniquely identifying a counterparty device (e.g., client device 102) in accordance with an appropriate payment protocol, such as an EMV payment protocol.

Referring back to FIG. 1, terminal device 122 may correspond to a point-of-sale (POS) terminal within a physical location of the merchant, such as a location where a customer, such as user 101, may provide payment for goods and/or services (e.g., at a cash register at the merchant). Terminal device 122 may, in some instances, include a display unit 127A configured to present interface elements to user 101, and an input unit 127B configured to receive input from user 101. By way of example, display unit 127A may include, but is not limited to, an LCD display unit or other appropriate type of display unit, and input unit 127B may include, but input not limited to, a keypad, keyboard, touchscreen, voice activated control technologies, or appropriate type of input device. Further, in additional aspects (not depicted in FIG. 1), the functionalities of display unit 127A and input unit 127B may be combined into a single device, e.g., the pressure-sensitive touchscreen display described herein.

Terminal device 122 may also include a communications unit 127C, such as a wireless transceiver device, coupled to processor 124 and configured by processor 124 to establish and maintain communications with network 120 using any of the communications protocols described herein. Further, terminal device 122 may include an interface unit 128, which may be configured by processor 124 to establish and maintain communications with client device 102 (e.g., through interface unit 114 of FIG. 1) across communications channel 120A. In some aspects, interface unit 128 may include a communications device, such as a wireless transceiver device, capable of exchanging data with client device 102 using any of the short-range communications protocols described above (e.g., NFC protocols, RF communications protocols, Bluetooth™ communication protocols, optical communications protocols, etc.).

Examples of terminal device 122 may include, but are not limited to, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), and any other type of computing device that may be configured to store data and software instructions, execute software instructions to perform operations consistent with disclosed embodiments. Further, although not depicted in FIG. 1, terminal device 122 may also be coupled to a computing system associated with and maintained by merchant 121 (e.g., a cash register, etc.), which may include one more processors and one of more tangible, non-transitory memories storing one or more software applications, application modules, and other elements of code that, when executed by the one or more processors, cause the merchant computing system to exchange data with terminal device 122 and perform operations consistent with the disclosed embodiments.

The disclosed embodiments are not limited to such POS terminals, and in additional aspects, terminal device 122 may correspond to one or more application program modules executed by a computer system maintained by merchant 121, one or more computing systems operating within environment 100, one or more client devices operating within environment 100, such as client device 102. In other embodiments, terminal device 122 may represent a device communicatively coupled to client device 102 to provide mobile point-of-sale and payment services, such as a Square™ device in communication with client device 102.

Referring back to FIG. 1, contextual transaction system 130, issuer system 140, payment network system 150, and tokenization system 160 may each represent a computing system that includes one or more servers (e.g., not depicted in FIG. 1) and tangible, non-transitory memory devices storing executable code and application modules. Further, the servers may each include one or more processor-based computing devices, which may be configured to execute portions of the stored code or application modules to perform operations consistent with the disclosed embodiments, including operations consistent with the exemplary transaction preauthorization processes described herein.

In other instances, and consistent with the disclosed embodiments, one or more of contextual transaction system 130, issuer system 140, payment network system 150, and tokenization system 160 may correspond to a distributed system that includes computing components distributed across one or more networks, such as network 120, or other networks, such as those provided or maintained by cloud-service providers. Additionally, in some instances, subsets of contextual transaction system 130, issuer system 140, payment network system 150, and tokenization system 160 can be incorporated into a single computing system, or incorporated into multiple computing systems.

By way of example, contextual transaction system 130 and issuer system 140 may both be associated with, or operated by, the financial institution that provisioned payment application 107 to client device 102, and a single computing system may be configured to perform operations consistent with the respective functionalities of contextual transaction system 130 and issuer system 140, as described herein. For instance, a secure, processor-based server of issuer system 140 may be configured to perform operations consistent with the functionalities of contextual transaction system 130, and additionally, or alternatively, the functionalities of contextual transaction system 130 may be implemented by one or more application modules or code elements executed by issuer system 140.

Referring back to FIG. 1, contextual transaction system 130 may be associated with, or may perform operations in support of, one or more native application programs executed by client devices operating within environment 100, such as, but not limited to, payment application 107 executed by client device 102. To facilitate a performance of the exemplary processes described herein, contextual transaction system 130 may maintain, within one or more tangible non-transitory memories, a customer database 132, a merchant database 134, and a transaction database 136. In some instances, customer database 132 may include data records that identify and characterize users of the one or more native application programs associated with, or supported by, contextual transaction system 130, such as payment application 107 executed by client device 102.

In further instances, merchant database 134 may include data records that identify and characterize one or more merchants, or groups of merchants, that offer products or services for sale to corresponding customers, such as user 101. For example, the data records of merchant database 134 may include information that identifies merchant 121 (e.g., a merchant name or a merchant classification code (MCC) assigned to merchant 121), along with a discrete geographic position associated with merchant 121, such as, but not limited to, a street address of a merchant 121, one or more geophysical coordinates that characterize the discrete geographic position of merchant 121 (e.g., a latitude, longitude, and/or altitude associated with merchant 121, etc.), or a street address or corresponding geophysical coordinates of a terminal device operated by merchant 121, such as terminal device 122.

In other instances, merchant 121 may be located in close proximity to one or more additional merchants, such as within a shopping mall or particular shopping district, and the data records of merchant database 134 may also include discrete geographic positions (e.g., latitudes, longitudes, altitudes, etc.) that collectively establish a virtual boundary enclosing merchant 121 and the one or more additional merchants, such as a geo-fence. The data records of merchant database 134 may store the discrete geographic positions that collectively establish the virtual boundary or geo-fence within corresponding geo-fence data, and may link the geo-fence data to the identifying information and geographic locations of merchant 121 and the one or more additional merchants.

Transaction database 136 may include data records, e.g., occurrence data, that identify and characterize prior exchanges of data initiated by corresponding devices and authorized in accordance with any of the exemplary processes described herein. By way of example, the prior data exchanges may include, but are not limited to, one or more prior purchase transactions initiated by a corresponding client device, such as client device 102, a physical or electronic point-of-sale (POS) terminal associated with corresponding merchant, such as terminal device 122 associated with merchant 121.

In some instances, and for each of the prior purchase transactions, the data records of transaction database 136 may include, but is not limited to device data identifying the client device that initiated the prior purchase transaction (e.g., a device identifier, such as an IP or a MAC address assigned to client device 102, a device location, etc.), and terminal data identifying the corresponding physical or electronic POS terminal involved in the prior purchase transaction (e.g., an IP or MAC address assigned to terminal device 122, a geographic location of terminal device 122, a URL or IP address assigned to the electronic POS terminal, a name, location, or merchant classification code (MCC) of merchant 121, etc.). The data records of transaction database 136 may also include values of transaction parameters that characterize each of the prior purchase transactions, such as, but not limited to, a transaction date or time, a transaction value, or an identifier of a product or service, e.g., an assigned Universal Product Code (UPC). The disclosed embodiments are, however, not limited to these examples of prior transaction information, and in other instances, transaction database 136 may include any additional or alternate information capable of identifying and characterizing one or more of the prior purchase transactions.

In some examples, contextual transaction system 130 may receive information that identifies and characterizes the one or more prior purchase transactions from issuer system 140 (e.g., across network 120 through a corresponding programmatic interface), and may perform operations that store the received information within corresponding portions of the data records of transaction database 136. In one instance, contextual transaction system 130 may receive portions of the information from issuer system 140 at regular or predetermined intervals, or in response to a detection of a corresponding triggering event (e.g., as a "push" operation). Additionally, or alternatively, contextual transaction system 130 may receive portions of the information in response to a programmatically generated and transmitted request (e.g., as a "pull" operation).

Further, as illustrated in FIG. 1, content provisioning system 130 may also maintain, within the one or more tangible, non-transitory memories, one or more executable application programs 138, such as a predictive engine 139. When executed by content provisioning system 130, predictive engine 139 may perform any of the exemplary processes described herein to identify expected occurrences of exchanges of data (e.g., "expected" data exchanges) between merchant 121 and one or more potential counterparties, such as user 101 that operates client device 102, during corresponding future temporal intervals, and to determine values of transaction parameters (e.g., "expected" parameter values) that characterize each of the expected data exchanges.

In one example, executed predictive engine 139 may identify, and characterize, an expected purchase transaction in response to a determined proximity between a geographic position associated with terminal device 122 and a current geographic position of a client device operating within environment 100, e.g., a current geographic position of client device 102. In other examples, executed predictive engine 139 may identify an expected occurrence of a purchase transaction based on an application of one or more machine learning algorithms (or processes) or adaptive processes to portions of transaction database 136. Further, and as illustrated in FIG. 1, contextual transaction system 130 may maintain, within the one or more tangible, non-transitory memories, predictive engine data 137 that supports the execution of, or the training and adaptive improvement of, one or more of the machine learning algorithms (or processes) or adaptive processes described herein.

Referring back to FIG. 1, issuer system 140 may be associated with, or operated by, a financial institution that issues one or more payment instruments to one or more customers of merchant 121 (e.g., a credit card account, debit card account, deposit account, etc., issued by the financial institution and held by user 101). Further, and as described herein, issuer system 140 may also be associated with, maintain, or provide, one or more application programs operated by client devices operating within environment 100, such as payment application 107 executed by client device 102.

To facilitate a performance of certain of the exemplary processes described herein, issuer system 140 may maintain, within one or more tangible non-transitory memories, customer account data 142 that identifies underlying accounts (e.g., account numbers, expiration dates, card verification values, etc.) associated with each of the payment instruments issued by issuer system 140, and merchant data 144 that identifies one or more merchants and other counterparties to initiated data exchanges (e.g., a merchant identifier, geographic position, etc.). Issuer system 140 may also maintain, within the one or more tangible non-transitory memories, pre-authorization data 146 that identifies and characterizes one or more data exchanges pre-authorized by issuer system 140 using any of the exemplary pre-authorization processes described herein, and further, authorization data 148 that identifies and characterizes one or more data exchanges authorized by issuer system 140 using any of the exemplary authorization processes described herein. Issuer system 140 may also maintain, within the one or more tangible, non-transitory memories, tokenization service provider (TSP) data 149 that identifies one or more computing systems (e.g., such as, but not limited to, tokenization system 160) configured to perform tokenization services on behalf of issuer system 140.

Payment network system 150 may perform operations that, in conjunction with issuer system 140, authorize initiated transactions using one or more exemplary authorization processes, and further, clear and settle authorized transactions using one or more exemplary transaction clearance and settlement processes, such as those consistent with EMV payment protocols. In certain aspects, and to facilitate a performance of these exemplary authorization, clearance, and/or settlement processes, payment network system 150 may maintain issuer data 152 that uniquely identifies computer systems maintained by one or more issuers of payment instruments involved in transactions initiated at terminal device 122 (e.g., an IP address, MAC address, or other unique identifier of issuer system 140).

As described herein, tokenization system 160 may, upon execution of stored software instructions, perform operations that provide tokenization services to issuer system 140. To facilitate the provision of these exemplary tokenization services, tokenization system 160 may maintain, within on or more tangible non-transitory memories, cryptographic data 162 and a token vault 164. Cryptographic data 162 may, in some instances, include one or more device-specific cryptograms that uniquely identify device 102 and other client devices within environment 100. For example, the device-specific cryptograms may enable a terminal device, such as terminal device 122, to authenticate an identity of client device 102 or the other client devices during a performance of any of the exemplary transaction authorization processes described herein. Examples of the one or more device-specific cryptograms include, but are not limited to, a secure element hash value, a multi-use digital token consistent with a host card emulation (HCE) protocol, or another hash value, code, or cryptogram capable of uniquely identifying client device 102 or the other client devices in accordance with an appropriate payment protocol, such as an EMV payment protocol.

In some instances, token vault 164 may include data records that include the tokenized data, e.g., such as the generated digital tokens representative of the pre-authorized data exchanges. Further, and in additional to the generated tokens, token vault 164 may also maintain the expected parameter values characterizing each of the pre-authorized data exchanges, information identifying the payment instrument associated with each of the pre-authorized data exchanges, and information characterizing the temporal validity of each of the generated digital tokens.

II. Exemplary Computer-Implemented Processes for Dynamically Generating and Provisioning Digital Pre-Authorization Tokens in Real Time As described herein, client device 102 may execute one or more native application programs, which may cause client device 102 to perform operations that initiate an exchange of data with a terminal device, such as terminal device 122, in accordance with a specified data type. In some instances, client device 102 may provide information identifying the specified data type to terminal device 122 across direct communications channel 120A using any of the exemplary communications protocols described herein, such as NFC protocols.

By way of example, the initiated data exchange may facilitate a purchase of a good or service offered for sale by merchant 121, and the specified data type may correspond to a payment instrument, such as a Visa™ credit card held by user 101 and available to fund the initiated purchase transaction. Further, in some examples, information identifying the available payment instrument, e.g., as provided to terminal device 122 by client device 102, may include tokenized payment data that replaces all or a portion of the sensitive account data associated with the payment instrument with a non-sensitive equivalent, e.g., a digital token or cryptogram, having no extrinsic or exploitable meaning or value to a third party. Terminal device 122 may receive the tokenized payment data from client device 102, and in some examples, may perform operations that facilitate an "online" authorization of the initiated purchase transaction, e.g., based on authorization data generated and provided by a computing system operated by an issuer of the available payment instrument, such as issuer system 140.

The implementation of certain "online" authorization protocols by network-connected devices and systems operating within environment 100 may, in some instances, reduce a potential exposure of merchant 121, user 101, or an issuer of the available payment instrument (e.g., the financial institution that issued the Visa™ credit card) to fraudulent activity during the performance of authorization processes. The online authorization protocols may, however, result in an appreciate temporal lag between transaction initiation and authorization, as terminal device 122, issuer system 140, payment network system 150, and tokenization system 160 perform operations that process initiated purchase transactions in real time and on a transaction-by-transaction basis. Further, the properly implement these online authorization protocols described herein, terminal device 122 maintain network connectivity throughout the online authorization process.

In other instances, terminal device may perform operations that locally authorize the initiated purchase transaction without input or intervention from issuer system 140, e.g., in accordance with certain "offline" authorization protocols. For example, terminal device 122 may implement local risk assessment protocols that compute values of one of more metrics that, collectively, predict a likelihood that the initiated purchase transaction represents an instance of fraud (e.g., based on a transaction velocity, etc.), or a likelihood that the initiated transaction will be declined by issuer system 140 (e.g., based on a magnitude of the transaction, deviations from user-specific transaction patterns, etc.).

Based on the implementation of these local risk assessment protocols, terminal device 122 may elect to locally authorize the initiated purchase transaction, and store data characterizing the locally authorized transaction within an accessible memory. Further, and upon expiration of a predetermined or adaptively determined temporal interval (e.g., a close of business, a storage of data characterizing a predetermined number of locally authorized transactions, etc.), terminal device 122 may transmit data characterizing groups of locally authorized transactions across network 120 to payment network system 150 for authorization, clearance, and settlement on a batch basis (e.g., through operations performed by issuer system 140 and other computing systems operating within environment 100).

Although reducing a temporal delay between transaction initiation and authorization, and enabling terminal device 122 to initiate and authorize transactions during periods of limited or non-existent network connectivity, the implementation of these offline authorization protocols may expose participants in the authorization, settlement, and clearance processes to an increased incidence of fraudulent activity. For example, a malicious third party could fraudulently obtain tokenized payment data associated with a valid payment instrument held by a corresponding user (e.g., by intercepting a payment token associated with user 101's Visa™ credit card) and further, could obtain information characterizing the risk assessment protocols implemented by terminal device 122 during the offline authorization of an initiated purchase transaction.

In some instances, and based on knowledge of these risk assessment protocols, the malicious third party may selectively initiate fraudulent transactions in a manner that evades detection by terminal device 122 during implementation of the risk assessment protocols (e.g., by initiating selected fraudulent transactions having values below certain thresholds, or at frequencies that avoid detection). Instead, this fraudulent activity may be detected during a subsequent, batch-based authorization, settlement, and clearance processes implemented by issuer system 140, payment network system 150, or other computing systems operating within environment 100. The delayed detection of these fraudulent purchase transactions can, in some instances, increase a number of discrete computational operations and discrete exchanges of data performed by issuer system 140, payment network system 150, or the other computing systems during a reconciliation and reversal of the locally authorized fraudulent purchase transactions.

In some exemplary embodiments, as described herein, contextual transaction system 130, issuer system 140, and tokenization system 160 may perform operations that, individually or collectively, identify a potential counterparty to one or more expected purchase transactions capable of initiation by client device 102 during a future temporal interval, and compute expected values of parameters that characterize each of the expected purchase transactions. As described herein, the identification of the potential counterparty, and the computation of the expected parameter values, may be based on contextual data that characterizes user 101 or client device 102 during one or more prior temporal intervals. Examples of the contextual data include, but are not limited to, values of demographic parameters that characterize user 101, parameter values characterizing prior transactions initiated by client device 102 during the prior temporal intervals (or by demographically similar users during the prior temporal intervals), or positional data characterizing prior geographic positions of user 101 or client device 102. Contextual transaction system 130, issuer system 140, and tokenization system 160 may perform additional operations that, individually or collectively, pre-authorize each of the expected purchase transactions in accordance with the computed parameter values, generate elements of tokenized data (e.g., "pre-authorization" tokens) representative of corresponding ones of the pre-authorized purchase transactions, and provision the generated pre-authorization tokens to corresponding terminal devices, such as terminal device 122, operating within environment 100 through a secure, programmatic channel.

For example, each of the pre-authorization tokens may include a device-specific cryptogram that links the pre-authorization token to particular client device, such as client device 102, and that enables the particular terminal device, such as terminal device 122, to verify not only an identity of client device 102, but also an integrity of the pre-authorization token. Each of the pre-authorization tokens may include a value of one or more transaction parameters that characterize the corresponding one of the pre-authorized purchase transactions (e.g., a pre-authorized transaction value, an expected transaction date or time, an expected product or service, etc.) and additionally, or alternatively, temporal data that specifies a period of temporal validity for the pre-authorization token. In other examples, one or more of the pre-authorization tokens may also include payment data that identifies and characterizes a payment instrument available to fund the pre-authorized purchase transactions.

By provisioning the pre-authorization tokens to corresponding ones of the terminal devices, such as terminal device 122, certain of the exemplary embodiments described herein may enable terminal device 122 to perform operations that authorize locally a purchase transaction initiated by client device 102 based not on locally implemented risk assessment protocols, but instead based on a digital pre-authorization token provisioned to terminal device 122 through a secure, programmatic channel of communications. For example, during an initiation of the purchase transaction, client device 102 may transmit a local copy of the device-specific cryptogram to terminal device 122, and terminal device 122 may perform operations that establish a consistency between received, local copy of the device-specific cryptogram and the device-specific cryptogram maintained within the digital pre-authorization token.

In some instances, the implementation of the exemplary token-based local authorization protocols, as described herein, may reduce an incidence of fraudulent activity by malicious third parties that participate in the transaction initiation and authorization process, especially when compared to certain conventional offline authorization protocols. For example, to successfully initiate and obtain authorization for a fraudulent purchase transaction, a device operated by a malicious third party must intercept or obtain tokenized payment data provisioned to client device 102 and a device-specific cryptogram associated with the client device 102, and then provide the tokenized payment data and the device-specific cryptogram to a terminal device that is provisioned with a temporally valid pre-authorization token linked to both the tokenized payment data and to the device-specific cryptogram.

Further, when compared to conventional online authorization protocols, which authorize initiate purchase transactions on a transaction-by-transaction basis, an implementation of the exemplary token-based local authorization protocols, as described herein, described herein can reduce a number of discrete computational operations and discrete exchanges data of required to authorize each initiated purchase transaction. Certain of the exemplary processes described herein, which authorize locally an initiated purchase transaction based on a provisioned device- and transaction-specific pre-authorization token, may be implemented by terminal devices in addition to, or as an alternate to, other authorization protocols that rely on real-time authorization processing by a centralized authorization system (such as, but not limited to, issuer system 140) or that rely risk management protocols locally implemented in accordance with underlying payment protocols.

A. Exemplary Computer-Implemented Processes for Identifying and Characterizing Expected Occurrences of Data Exchanges During Future Temporal Intervals In some exemplary environments, contextual transaction system 130 may be associated with, or may perform operations in support of, a native application program executed by client device 102, such as, but not limited to, executed payment application 107. For example, contextual transaction system 130 may perform operations that monitor a current geographic position of client device 102 based on positional data transmitted from client device 102 to contextual transaction system 130 through a secure, programmatic interface. In response to the receipt of the positional data, contextual transaction system 130 may perform any of the exemplary processes described herein to identify, for one or more expected exchanges of data, potential counterparties to associated with geographic positions that are disposed proximate to the current geographic position of client device 102.

In further instances, contextual transaction system 130 may perform any of the exemplary processes described herein to predict parameter values that characterize the expected data exchanges between client device 102 and a terminal device operated by each of the potential counterparties, such as terminal device 122 operated by merchant 121, and to request a pre-authorization of the expected data exchanges in accordance with the predicted parameter values. In one example, described below in reference to FIG. 2A, the exchange of data may correspond to a purchase transaction (e.g., expected to be initiated at terminal device 122 by client device 102 during a future temporal interval), and a geographic position associated with merchant 121 or terminal device 122 may be disposed proximate to the current geographic position of client device 102 within a corresponding geographic region.

Figure 2A:
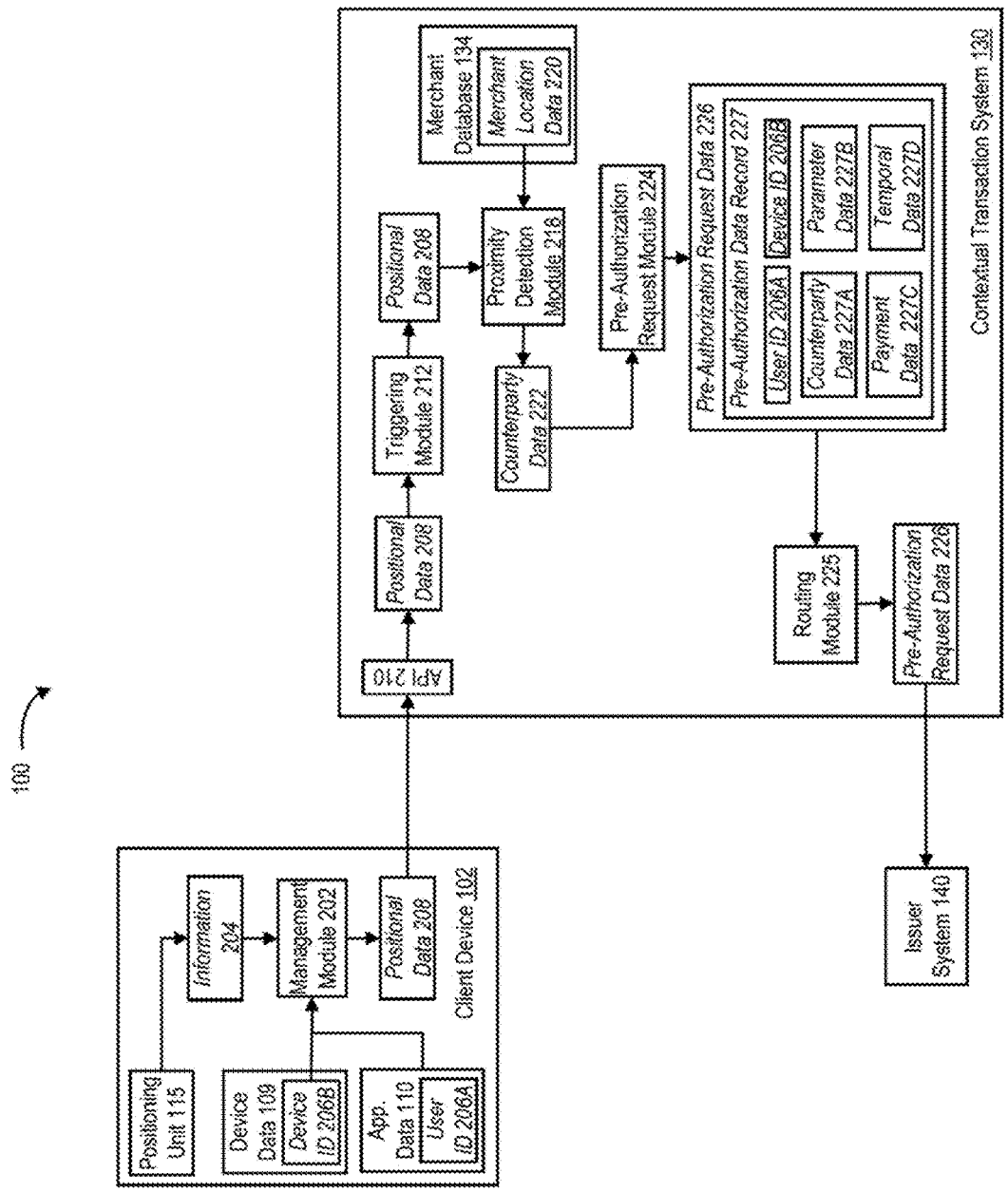
FIGS. 2A and 2B are diagrams illustrating portions of an exemplary computing environment, consistent with the disclosed embodiments.

Referring to FIG. 2A, a management module 202 of executed payment application 107 may perform operations that establish, and maintain, a secure programmatic channel of communications with contextual transaction system 130. In some instances, to establish or maintain the secure, programmatic channel of communications, management module 202 may generate and transmit, across network 120, device- or application-specific data to contextual transaction system 130 at predetermined temporal intervals, or in response to predetermined events, such as a change in operation state of client device 102.

By way of example, the device- or application-specific data may include positional data that characterizes a current geographic position of client device 102, and management module 202 may receive, from positioning unit 115, information 204 that identifies and characterizes the current geographic position of client device 102. In some examples, information 204 may specify the current geographic position in terms of corresponding geo-spatial coordinates (e.g., a corresponding longitude, latitude, and/or altitude), and information 204 may also include temporal data specifying at time or date at which positioning unit 115 determined the current geographic position of client device 102. Further, although not illustrated in FIG. 2A, management module 202 may perform operations that store portions of information 204 within one or more tangible, non-transitory memories, e.g., within device data 109.

Management module 202 may package information 204 (e.g., which specifies the current geographic position of client device 102) into positional data 208, along with further information that uniquely identifies user 101 to contextual transaction system 130 or issuer system 140 (e.g., user identifier 206A) and additionally, or alternatively, that uniquely identifies client device 102 within environment 100 (e.g., device identifier 206B). For example, user identifier 206A may include an alpha-numeric authentication credential (e.g., a user name assigned to user 101 by contextual transaction system 130 or issuer system 140) or a biometric authentication credential (e.g., fingerprint data or data characterizing a digital image of a portion of user 101's face). In some instances, management module 202 may access application data 110 and extract user identifier 206A. In other instances, management module 202 may also access device data 109 and obtain device identifier 206B, examples of which include, but not limited to, an IP address or a MAC address that uniquely identifies client device 102 within environment 100.

Client device 102 may transmit positional data 208 across network 120 to contextual transaction system 130, e.g., through communications unit 112C using any appropriate communications protocol. In one example, management module 202 may generate positional data 208, and client device 102 may transmit positional data 208 to contextual transaction system 130, at predetermined intervals or in response to occurrences of certain events, such as a change in an operational mode of client device 102 or a change in a geographic position of client device 102 (e.g., a push operation). In other examples, the initiation and transmission of positional data 208 may be responsive to a receipt, by client device 102, of request data transmitted by contextual transaction system 130 (e.g., a pull operation).

A programmatic interface established and maintained by contextual transaction system 130, such as application programming interface (API) 210, may receive positional data 208 from client device 102. In some instances, API 210 may provide positional data 208 as an input to triggering module 212, and triggering module 212 may perform operations (not illustrated in FIG. 2A) that store positional data 208 within one or more tangible, non-transitory memories. Triggering module 212 may also provide positional data 208, which specifies the current geographic position of client device 102, as an input to a proximity detection module 218 of contextual transaction system 130.

In some examples, proximity detection module 218 may perform any of the exemplary processes described herein to identify a single merchant, or a group of merchants, associated with geographic positions that are proximate to the current geographic position of client device 102, e.g., as specified within positional data 208. Based on the corresponding proximity to client device 102, and as described herein, the identified merchant, or the identified group of merchants, may each represent a potential participant in an expected purchase transaction capable of initiation by client device 102 during a future temporal interval.

For instance, proximity detection module 218 may receive positional data 208, and may perform operations that parse positional data 208 to identify and extract the current geographic position of client device 102 (e.g., as specified by a longitude, latitude, or an altitude). Proximity detection module 218 may further access merchant database 134, and obtain merchant location data 220 that identifies one or more merchants that elected participate in the exemplary token generation and transaction authorization processes described herein, and that characterizes a discrete geographic position, or a range of discrete geographic positions, associated with each of the identified merchants.

By way of example, merchant 121 may correspond to a provider of public or mass transportation, such as the Metro™ system operated by the Washington Metropolitan Area Transit Authority™, that maintains a subway station in Washington, D.C., at 2301 I Street N.W. In some instances, merchant location data 220 may include one or more merchant identifiers associated with or assigned to merchant 121, such as, but not limited to, a merchant name (e.g., the Metro™ system), a merchant classification code (MCC) that characterizes merchant 121, or a network identifier assigned to a terminal device operated by merchant 121 (e.g., an IP address or a MAC address assigned to terminal device 122, such as fare machine or fare gate). Merchant location data 220 may also specify a discrete geographic position that characterizes merchant 121 (and additionally, or alternatively, terminal device 122), and may associate the particular geographic position with the one or more merchant identifiers. Examples of the discrete geographic position include, but are not limited to, a street address associated with merchant 121 or terminal device 122 or geo-spatial coordinates that characterize merchant 121 or terminal device 122 (e.g., a corresponding longitude, latitude, or altitude).

Additionally, or alternatively, merchant location data 220 may further specify a range of discrete geographic positions (e.g., geo-spatial coordinates, such as latitudes, longitudes, altitudes, etc.) that collectively establish a virtual geographic boundary, or geo-fence, enclosing merchant 121 and one or more additional merchants located in close proximity to merchant 121. For example, merchant 121 and the one or more additional merchants may be located within a shopping mall, a particular business district, or a particular shopping district, and the established virtual geographic boundary or geo-fence may enclose all or a portion of the shopping mall, the particular business district, or the particular shopping district. Further, merchant location data 220 may associate the range of discrete geographic positions with not only the one or more merchant identifiers that characterize merchant 121, but also with merchant identifiers characterizing each of the additional merchants located within the virtual boundary or geo-fence.

Based on portions of positional data 208 and merchant location data 220, proximity detection module 218 may determine that one or more of the identified merchants (e.g., as identified within merchant location data 220) are disposed "proximate" to the current geographic position of client device 102 (e.g., as specified within positional data 208). By way of example, proximity detection module 218 may establish that a corresponding one of the identified merchants is disposed proximate to the current geographic position of client device 102 when either: (i) a discrete geographic position associated with the corresponding merchant is disposed within a threshold distance of the current geographic position of client device 102; or (ii) the current geographic position of client device 102 is located within, or is coincident with, a virtual boundary or geo-fence that encloses the corresponding merchant. In some instances, the threshold distance may be a fixed, predetermined distance established by contextual transaction system 130 or issuer system 140 (e.g., a distance of 500 meters, one kilometer, etc.), or alternatively, may vary in accordance with a speed at which client device 102 travels within a corresponding geographic region, one or more traffic or transit conditions, or one or more weather conditions.

Based on the established proximity of the corresponding merchant to client device 102, proximity detection module 218 may perform operations that extract, from merchant location data 220, the one or more merchant identifiers of the corresponding merchant, along with positional information that identifies the discrete geographic position of the corresponding merchant or the range of discrete geographic positions that establish the virtual boundary or geo-fence. In some examples, as described herein, proximity detection module 218 may perform additional operations that package the one or more extracted merchant identifiers and the extracted positional information into corresponding portions of counterparty data 222.

For example, positional data 208 may indicate that client device 102 (and thus, user 101) is currently positioned in Washington, D.C., at the corner of $22^{nd}$ and I Streets NW (e.g., 38° 53' N latitude, and 77° 02' W longitude). Further, and based on portions of merchant location data 220, proximity detection module 218 may establish that merchant 121 corresponds to the Metro™ station associated with a discrete geographic position in Washington, D.C., at 2301 I Street N.W. (e.g., 38° 54' N latitude and 77° 3' W longitude). In some instances, proximity detection module 218 may determine that the discrete geographic position of merchant 121 is disposed within the threshold distance of the current geographic position of client device 102, and as such, that client device 102 is proximate to merchant 121.

Based on the established proximity between client device 102 and merchant 121, proximity detection module 218 may extract the one or more merchant identifiers of merchant 121 (e.g., the merchant name, the network identifier of terminal device 122, etc.) and the discrete geographic position (e.g., the street address of 2301 I Street N.W., or the geospatial coordinates of 38° 54' N latitude and 77° 3' W longitude), and package the one or more extracted merchant identifiers and the discrete geographic position within a portion of counterparty data 222. Further, proximity detection module 218 may perform any of the exemplary processes described herein to determine a proximity between the current geographic position of client device 102 and the one or more discrete geographic positions associated with each additional or alternate merchant identified within merchant location data 220.

Referring back to FIG. 2A, proximity detection module 218 may provide counterparty data 222 as an input to a pre-authorization request module 224. As described herein, counterparty data 222 may include information (e.g., merchant identifiers, one or more discrete geographic positions, etc.) that identifies and characterizes one or more merchants that, based on their determined proximity to the current geographic position of client device 102, represent potential counterparties in purchase transactions initiated by client device 102. Pre-authorization request module 224 may receive counterparty data 222, and may perform any of the exemplary processes described herein to generate data 226 that requests a pre-authorization of a purchase transaction involving each of the proximately disposed merchants identified within counterparty data 222, such as, but not limited to, merchant 121.

Pre-authorization request module 224 may, in some instances, perform operations that package user identifier 206A (e.g., which uniquely identifies user 101 to contextual transaction system 130 or issuer system 140) and/or device identifier 206B (e.g., the IP or MAC address assigned to client device 102) into a portion of pre-authorization request data 226 (e.g., within a header portion, etc.). Further, preauthorization request module 224 may perform additional operations that establish, within pre-authorization request data 226, a discrete pre-authorization data record associated with a requested pre-authorization of each of the expected purchase transactions involving client device 102 and corresponding ones of the proximately disposed merchants identified within counterparty data 222, such as, but not limited to, merchant 121.

For example, counterparty data 222 may establish a proximity of merchant 121 (e.g., the Metro™ station in Washington, D.C., at 2301 I Street N.W.) to the current geographic position of client device 102. As described herein, and based on the established proximity, merchant 121 may represent a potential counterparty in an expected purchase transaction, such as a purchase of a subway fare initiated at terminal device 122. Counterparty data 222 may also include the one or more merchant identifiers that characterize merchant 121 (e.g., the merchant name, the MCC code, the network address of terminal device 122, etc.), along with the discrete geographic position associated with merchant 121, such as the street address and/or corresponding geospatial coordinates. Further, and based on portions of counterparty data 222, pre-authorization request module 224 may perform additional operations that: (i) determine expected parameter values that characterize the purchase of the subway fare from merchant 121; (ii) generate payment data identifying the payment instrument available to fund that purchase transaction; and additionally, or alternatively, (iii) establish a temporal interval during which client device 102 is expected to initiate the purchase transaction at terminal device 122.

In some examples, the expected parameters values may include a default, merchant-specific parameter value established in accordance with one or more of payment, authorization, clearance, or settlement protocols, such as an EMV-based protocol. For instance, pre-authorization request module 224 may access data records within merchant database 134 that are associated with merchant 121 (e.g., based on the merchant identifier), and may perform operations that extract the default, merchant-specific parameter value (or values) from accessed data records. Examples of the default, merchant-specific parameter values for merchant 121 include, but are not limited to, a default transaction value, or a default set of expected products or services (e.g., universal product codes (UPCs) assigned to certain products offered for sale by the Metro™ station, such as a trip-specific, daily, or monthly subway fare).

Further, pre-authorization request module 224 may perform operations that identify the payment instrument available to fund the purchase transaction involving merchant 121 based on an analysis of preference data maintained within customer database 132 and additionally, or alternatively, based on any analysis of the historical transaction data maintained within transaction database 136. For example, the preference data for user 101 (e.g., as maintained within customer database 132 and associated with user identifier 206A or device identifier 206B) may identify a "preferred" payment instrument for the exemplary pre-authorization processes described herein, such as the Visa™ credit card account held by user 101. In some instances, pre-authorization request module 224 may extract payment data that identifies and specifies the Visa™ credit card account from the accessed data records, and examples of the payment data may include an identifier of, or tokenized account data associated with, the Visa™ credit card account.

In other examples, the temporal interval during which client device 102 is expected to initiate the purchase transaction at terminal device 122 may correspond to a merchant-specific, default temporal interval, such as, but not limited to, an upper bound on a temporal validity of the pre-authorized purchase transaction, e.g., as maintained within the data records of merchant database 134. Examples of the default temporal intervals include, but are not limited to, five minutes, ten minutes, thirty minutes, or any additional or alternate temporal interval consistent with the exemplary payment authorization, clearance, and settlement processes described herein (e.g., an EMV-based payment protocol).

In other examples, pre-authorization request module 224 may perform operations the determine one or more of the expected parameter values, the temporal interval, or the available payment instrument based on an analysis of transaction data, e.g., within transaction database 136, that characterizes prior authorized purchase transactions initiated by client device 102 and additionally, or alternatively, by other client devices operating within environment 100. For example, although not illustrated in FIG. 2A, pre-authorization request module 224 may route all, or a portion, of counterparty data 222 to predictive engine 139, which may compute one or more of the expected parameter values, the temporal interval, or the available payment instrument based on an application of a machine learning algorithm or other adaptive process to portions of the transaction data.

Referring back to FIG. 2A, pre-authorization request module 224 may perform operations that establish, within pre-authorization request data 226, a pre-authorization data record 227 that corresponds to the requested pre-authorization of the purchase transaction involving client device 102 and merchant 121 (e.g., the purchase of subway fare from the Metro™ station located in Washington, D.C., at 2310 I Street N.W.). By way of example, and as illustrated FIG. 2A, pre-authorization data record 227 may include counterparty data 227A, parameter data 227B, payment data 227C, and temporal data 227D.

For instance, counterparty data 227A may include the one or more merchant identifiers of merchant 121 (e.g., an IP address or a MAC address of terminal device 122, as operated by the Metro™ station, etc.). Further, parameter data 227B may include the expected parameter values that characterize the expected purchase transaction, such as, but not limited to, the expected transaction value (e.g., the $7.50 daily fare credit) and the identifiers of the products or services involved in the expected purchase transaction (e.g., the UPC assigned to the daily subway fare). In additional instances, payment data 227C may identify the expected payment instrument available to fund the expected purchase transaction (e.g., an identifier or, or tokenized data associated with, the Visa™ credit card account held by user 101), and temporal data 227D may specify a temporal interval during which client device 102 is expected to initiate the purchase transaction with merchant 121.

The disclosed embodiments are, however, not limited to, these exemplary components of pre-authorization data record 227, and in other instances, pre-authorization data record 227 may include any additional or alternate data facilitating a pre-authorization of the expected purchase transaction by a computing system operated by a financial institution that issued the expected payment instrument, e.g., issuer system 140. Further, in some examples (not illustrated in FIG. 2A), pre-authorization request module 224 may perform any of the exemplary processes described herein to generate an additional, or alternate, pre-authorization data record for each of the expected purchase transactions involving corresponding ones of the potential counterparties identified and characterized within counterparty data 222.

In some instances, pre-authorization request module 224 may provide pre-authorization request data 226 as an input to a routing module 225 of contextual transaction system 130. Routing module 225 may extract a unique network address of issuer system 140 (e.g., an IP or a MAC address assigned to issuer system 140) from a locally accessible memory, and may perform additional operations that cause contextual transaction system 130 to transmit pre-authorization request data 226 across network 120 to the extracted network address of issuer system 140, e.g., using any appropriate communications protocol. For example, and as described herein, user 101 may elect to fund each of the expected purchase transactions using the Visa™ credit card account held issued by the financial institution that operates issuer system 140, and issuer system 140 may be configured to pre-authorize each of the expected purchase transactions in accordance with respective portions of pre-authorization request data 226.

In some instances, as described herein, contextual transaction system 130 may perform operations that monitor a geographic position of client device 102, and based on the monitored geographic position, that request a pre-authorization of an expected data exchange involving a potential counterparty associated with a location disposed proximate to the monitored geographic position of the client device. In other instances, described below in reference to FIG. 2B, contextual transaction system 130 may perform operations that predict an expected occurrence of an exchange of data during a future temporal interval, and that compute expected values of parameters characterizing the expected data exchanges, based on locally maintained data that identifies and characterizing prior exchanges of data initiated and authorized during one or more prior temporal intervals.

In one example, described below in reference to FIG. 2B, the data exchange may correspond to a purchase transaction, e.g., expected to be initiated at terminal device 122 by client device 102 during a future temporal interval. Contextual transaction system 130 may, in some instances, predict the expected occurrence of the purchase transaction, and compute the expected parameter values that characterize the purchase transaction, based on an application of one or more machine learning algorithms (or processes) or adaptive processes to portions of transaction data maintained locally within transaction database 136. Further, and as described herein, contextual transaction system 130 may perform additional operations that request a pre-authorization of the expected purchase transaction in accordance with the computed parameter values.

Figure 2B:
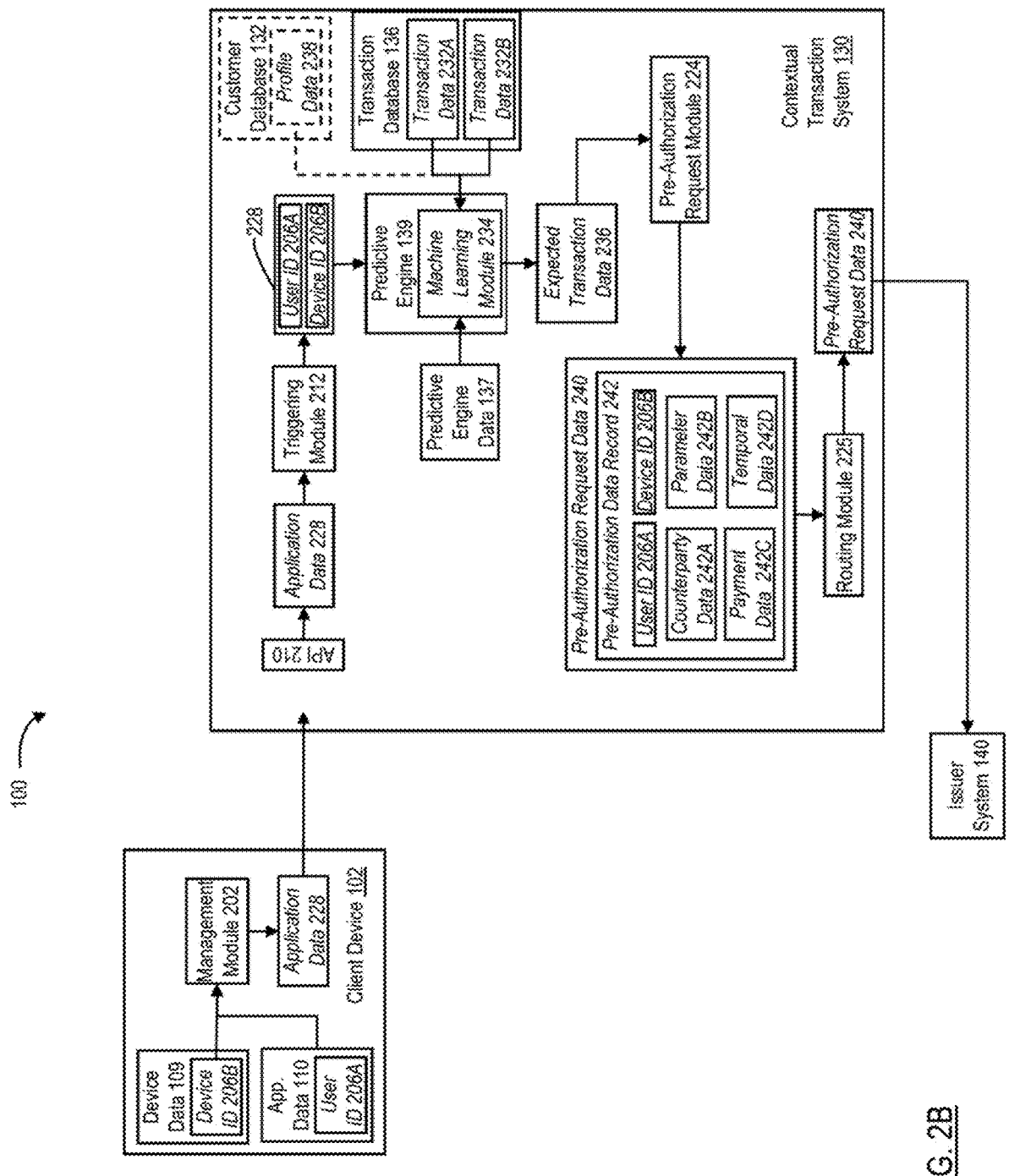

Referring to FIG. 2B, client device 102 may execute payment application 107 (or an additional or alternate application program supported by or associated with contextual transaction system 130), and management module 202 of executed payment application 107 may perform operations that establish, and maintain, a secure programmatic channel of communications with contextual transaction system 130. To establish or maintain the secure, programmatic channel of communications, management module 202 may perform operations that generate and transmit, across network 120, device- or application-specific data to contextual transaction system 130 at predetermined temporal intervals, or in response to predetermined events, such as a change in operation state of client device 102.

In one instance, described herein the device- or application-specific data may correspond to positional data (e.g., positional data 208 of FIG. 2A) that includes, among other things, a current geographic position of client device 102, a unique identifier of user 101 (e.g., user identifier 206A), and a unique identifier of client device 102 (e.g., device identifier 206B). The disclosed embodiments are, however, not limited to device- or application-specific data that includes the exemplary positional data described herein, and in other instances, client device 102 may generate and transmit any additional or alternate device- or application-specific data to contextual transaction system 130 that includes user identifier 206A, device identifier 206B, and additionally, or alternatively, a unique identifier of executed payment application 107.

By way of example, and as illustrated in FIG. 2B, management module 202 may access and package user identifier 206A and device identifier 206B into application data 228. Client device 102 may transmit device application data 228 across network 120 to contextual transaction system 130, e.g., through communications unit 112C using any appropriate communications protocol. In one example, management module 202 may generate application data 228, and client device 102 may transmit application data 228 to contextual transaction system 130, at predetermined intervals or in response to occurrences of certain events, such as a change in an operational mode of client device 102 or a change in a geographic position of client device 102 (e.g., a push operation). In other examples, the generation and transmission of application data 228 may be responsive to a receipt, by client device 102, of request data transmitted by contextual transaction system 130 (e.g., a pull operation).

A programmatic interface established and maintained by contextual transaction system 130, such as API 210, may receive application data 228 from client device 102. API 210 may route application data 228 to triggering module 212, which may store application data 228 within one or more tangible, non-transitory memories (not illustrated in FIG. 2B). Triggering module 212 may also provide application data 228, which includes user identifier 206A and device identifier 206B, as an input to predictive engine 139 of contextual transaction system 130.

Predictive engine 139 may parse application data 228 to extract user identifier 206A and additionally, or alternatively, device identifier 206B. Further, predictive engine 139 may perform operations that access transaction database 136, and identify and extract transaction data 232A that includes, or references, user identifier 206A or device identifier 206B. In some examples, transaction data 232A may identify and characterize one or more prior purchase transactions initiated by client device 102, or involving user 101, during corresponding prior temporal intervals. For each of the prior purchase transactions, transaction data 232A may include, but is not limited to, data that uniquely identifies a corresponding counterparty (e.g., a device identifier of terminal device 122, such as an IP address or a MAC address, a merchant name, an assigned MCC code, etc.), a geographic position of client device 102 or of the corresponding counterparty, and values of one or more transaction parameters, such as a transaction value, a transaction date or time, or an identifier of a purchased good or service (e.g., an assigned UPC code, etc.).

In other examples, predictive engine 139 may perform operations that identify and extract, from transaction database 136, additional transaction data 232B that identifies characterizes one or more additional prior purchase transactions initiated by other client devices operating within environment 100 or involving users of these client devices. For each of these additional prior purchase transactions, transaction data 232B may include, but is not limited to, data that uniquely identifies each counterparty (e.g., a device identifier the corresponding client and terminal devices, such as an IP address or a MAC address, a user or merchant name, an assigned MCC code, etc.), a geographic position of the corresponding client or terminal devices, and values of one or more transaction parameters, such as a transaction value, a transaction date or time, or an identifier of a purchased good or service (e.g., an assigned UPC code, etc.).

Based on portions of transaction data 232A and additionally, or alternatively, transaction data 232B, predictive engine 139 may perform operations that identify a potential counterparty to one or more expected purchase transactions capable of initiation by client device 102 during a future temporal interval, and to compute expected values of parameters that characterize each of the expected purchase transactions. In some instances, described herein, predictive engine 139 may perform the operations that identify the potential counterparty for each of the expected purchase transactions, and that compute the expected parameter values that characterize the expected purchase transactions, in accordance with one or more machine learning algorithms (or processes) or adaptive processes.

For example, as illustrated in FIG. 2B, predictive engine 139 may include a machine learning module 234, which accesses transaction data 232A (e.g., that identifies and characterizes prior purchase transactions initiated by client device 102 or involving user 101) and additionally, or alternatively, transaction data 232B (e.g., that identifies and characterizes additional prior purchase transactions initiated by the other client devices or involving the users of these client devices). Further, in some instances, machine learning module 234 may also access portions of predictive engine data 137 (e.g., as maintained by content provisioning system 130 in one or more tangible, non-transitory memories) that specify and/or support the execution of the machine learning algorithms (or processes) or adaptive processes.

Machine learning module 234 may, in some examples, identify one or more expected purchase transactions capable of initiation by client device 102 during a future temporal interval, determine a potential counterparty to each of the expected purchase transactions, and compute expected values of parameters that characterize each of the expected purchase transactions based on an application of the one or more machine learning algorithms (or processes) or adaptive processes to portions of transaction data 232A and additionally, or alternatively, to transaction data 232B. As described herein, the expected parameters values that characterize each of the expected purchase transactions may include, but are not limited to, an expected transaction value or a range of expected transaction values, an identifier of an expected product or service (e.g., an assigned UPC, etc.), and temporal data characterizing an expected transaction initiate time or date, or an expected range of transaction times or dates.

Examples of the one or more machine learning algorithms (or processes) or adaptive processes include, but are not limited to, an association-rule algorithm (such as an Apriori algorithm, an Eclat algorithm, or an FP-growth algorithm), a clustering algorithm (such as a hierarchical clustering module, a k-means algorithm, or other statistical clustering algorithms), a collaborative filtering algorithm (such as a memory- or model-based algorithm), or an artificial intelligence algorithm (such as an artificial neural network). Further, and as described herein, one or more of these machine learning algorithms or adaptive processes may be trained against, and adaptively improved using, certain portions of transaction database 136, including those portions that identify and characterize purchase transactions recently initiated by client device 102 or newly authorized by terminal device 122 or issuer system 140 using any of the exemplary processes described herein.

In some instances, through the application of the one or more machine learning algorithms (or processes) or adaptive processes to portions of transaction data 232A, machine learning module 234 may detect an existence of one or more patterns or trends characterizing a transactional behavior of user 101 (or client device 102) during the corresponding prior temporal intervals. Based on the detected existence of these patterns or trends, machine learning module 234 may perform any of the exemplary processes described herein to identify the one or more expected purchase transactions capable of initiation by client device 102 during the future temporal interval, and to generate output data, e.g., expected transaction data 236, that uniquely identifies the determined potential counterparty to each of the expected purchase transactions, and specifies the expected parameter values that characterize each of the expected purchase transactions.

For example, and based on the application of the machine learning algorithms (or processes) or adaptive processes to the portions of the transaction data characterizing prior purchase transactions initiated by client device 102 or involving user 101 (e.g., the portions of transaction data 232A), machine learning module 234 may predict that client device 102 (e.g., as operated by user 101) will initiate a first expected purchase transaction at a terminal device operated by a Starbucks™ coffee shop located in Washington, D.C., at 2130 H Street N.W., on Apr. 9, 2018 between 8:45 a.m. and 9:00 a.m. Further, and using any of the exemplary processes described herein, machine learning module 234 may predict that client device 102 will initiate a second expected purchase transaction at a terminal device operated by a Devon & Blakely™ marketplace located in Washington, D.C., at 1331 F Street N.W., on Apr. 9, 2018, between 12:45 p.m. and 1:00 p.m.

In additional instances, machine learning module 234 may implement any of the exemplary processes described herein to predict, for the first expected purchase transaction, an expected transaction value of $11.00 and expected products or services that include, but are not limited to, oatmeal and/or coffee, and to predict, for the second expected purchase, and expected transaction value of $13.00 and expected products or services that include, but are not limited to, a large soup and a sandwich. In other instances, and based on the application of the machine learning algorithms (or processes) or adaptive processes to the portions of transaction data 232A, machine learning module 234 may predict and identify a payment instrument (e.g., an "expected" payment instrument) held by user 101 and available to fund corresponding ones of the first and second expected purchase transaction (e.g., a Visa™ credit card account held by user 101 and provisioned to executed payment application 107).

Machine learning module 234 may further generate elements of expected transaction data 236 that correspond to each of the first and second expected purchase transactions, and further, that correspond to any additional or alternate expected purchase transactions identified and characterized by machine learning module 234. For example, the elements of expected transaction data 236 that characterize the first and second expected purchase transactions may include, but are not limited to: a unique identifier of client device 102 or user 101 (e.g., an IP or MAC address assigned to client device 102, a user name or authentication credential associated with user 101, etc.); a unique identifier of the corresponding counterparty (e.g., an IP address or MAC address assigned to the terminal device operated by corresponding ones of the Starbucks™ coffee shop and Devon & Blakely™ marketplace, a corresponding merchant name, corresponding assigned MCC, etc.); the expected parameter values that characterize corresponding ones of the first and second expected purchase transactions (e.g., the expected transaction value, the expected product or service, etc.); temporal data that characterizes corresponding ones of the first and second expected purchase transactions (e.g., the range of transaction times or dates, etc.); and payment data characterizing the expected payment instrument available to fund the first and second expected purchase transactions (e.g., the tokenized payment data or an identifier of the expected payment instrument).

The disclosed embodiments are, however, not limited to these examples of expected purchase transactions, or to these examples of expected parameter values or expected temporal intervals. In other exemplary embodiments, machine learning module 234 may identify any additional or alternate number or type of expected purchase transactions, or may populate expected transaction data 236 with any additional or alternate information characterizing one or more of the expected purchase transactions.

In other examples, machine learning module 234 may apply the one or more the machine learning algorithms (or processes) or adaptive processes described herein not only to portions of transaction data 232A, but also to portions of transaction data 232B, which characterizes prior purchase transactions initiated by the other client devices or involving the users of these client devices, during the prior temporal intervals. For instance, and using any of the exemplary processes described herein, machine learning module 234 may identify, as an expected purchase transaction, a purchase of a bowling shoe rental for $15.00 (e.g., the expected transaction value) from a Lucky Strike™ bowling alley in Washington, D.C. (e.g., the expected counterparty), on Friday, Apr. 13, 2018, between 9:00 p.m. at 9:15 p.m. (e.g., the expected transaction date and time).

In further instances, machine learning module 234 may access predictive engine data 137, and extract information characterizing an association-rule algorithm, which machine learning module 234 may apply to portions of transaction data 232B that identify and characterize prior purchase transactions initiated by the other client devices, or the users of these client devices, at terminal devices operated by the Lucky Strike™ bowling alley in Washington, D.C. For example, and based on the application of the association-rule algorithm to the portions of transaction data 232B, machine learning module 234 may determine that other customers of the Lucky Strike™ bowling alley initiated a purchase transaction for a first round of concessions (e.g., a purchase of soft drinks and cocktails having a transaction value of $22.50) between five to eight minutes after the purchase of the bowling shoe rental, and for a second round of concessions (e.g., a purchase of pizza having a transaction value of $10.00) between fifteen and eighteen minutes after the purchase of the bowling shoe rental.

Based on the outcome of the association-rule algorithm, machine learning module 234 may identify additional expected purchase transactions that include, but are not limited to, an expected purchase of drinks for $22.50 from the Lucky Strike™ bowling alley on April 13$^{th}$ between 9:03 p.m. and 9:23 p.m., and an expected purchase of pizza for $10.00 from the Lucky Strike™ bowling alley on April 13$^{th}$ between 9:15 p.m. and 9:33 p.m. Machine learning module 234 may perform any of the exemplary processes described herein to generate elements of expected transaction data 236 that identify and characterize each of the expected purchase transactions, e.g., the purchases of the bowling shoe rental and the first and second rounds of concessions from the Lucky Strike™ bowling alley on Friday, April 13$^{th}$.

Additionally, or alternatively, machine learning module 234 may extract, from predictive engine data 137, information characterizing a collaborative filtering algorithm that, when applied to portions of transaction data 232A and 232B by machine learning module 234, identifies expected purchase transactions capable of initiation by client device 102 (or by user 101) during a future temporal interval based on prior purchase transactions initiated by portions of the users of additional client devices (e.g., "additional" users) during prior temporal intervals. For example, a subset of the additional users may be associated with transactional or spending behaviors that are similar to those exhibited by user 101 (e.g., as specified within corresponding ones of transaction data 232A and 232B), and machine learning module 234 (or predictive engine 139) may identify the subset of the additional users based on an application of the collaborative filtering algorithm to transaction data 232A and 232B.

In other examples, the subset of the additional users may exhibit demographic characteristics (e.g., age, sex, profession, educational level, etc.) that are similar to those exhibited by user 101, and additionally, or alternatively, may be connected to user 101 within one or more social networking platforms (e.g., direct or intermediate connections on LinkedIn™, Facebook™, etc.). For instance, contextual transaction system 130 may maintain, within a locally accessible memory (e.g., customer database 132), profile data 238 that includes, but is not limited to, values of the demographic parameters that characterize corresponding ones of user 101 and the additional users, and social networking data that characterizes relationships between user 101 and the additional users within the one or more social networking platforms.

Machine learning module 234, or predictive engine 139, may access profile data 238 within customer database 132, and may extract the demographic parameter values and/or the social networking data associated with user 101 and the additional users, e.g., based on unique identifiers of user 101 and the additional users. Further, machine learning module 234 may apply the collaborative filtering algorithm to the extracted portions of the demographic parameter values and/or the social networking data to identify the subset of additional users that are demographically similar to user 101, or are connected or related to user 101 through the social networking platforms.

In further examples, and based on an application of the collaborative filtering algorithm to transaction data 232A and to a portion of transaction data 232B that corresponds to the subset of the additional users (e.g., that exhibit transaction or spending patterns similar to user 101, that are demographically similar to user 101, are related to user 101 via the social networking platforms, etc.), machine learning module 234 may predict one or more additional expected purchase transactions capable of initiation by client device 102 during the future temporal interval, identify a potential counterparty to each of the additional expected purchase transactions, and compute expected values of parameters that characterize each of the additional expected purchase transactions. Machine learning module 234 may also perform any of the exemplary processes described herein to generate elements of expected transaction data 236 that identify and characterize each of the additional expected purchase transactions.

In some examples, as described herein, predictive engine 139, or machine learning module 234, may perform operations that identify the potential counterparty to the one or more expected purchase transactions, and that compute the expected parameters values for the expected purchase transactions, based on portions of transaction data 232A and/or transaction data 232B. In other examples, described herein, predictive engine 139, or machine learning module 234, may perform additional operations that identify the potential counterparty and that compute the expected parameter values based on additional or alternate contextual data that characterizes user 101 or client device 102 during the prior or future temporal intervals.

The additional or alternate contextual data may be locally maintained by contextual transaction system 130 (e.g., within customer database 132 or merchant database 134), or may be obtained from a computing system or device (e.g., client device 102) across a secure, programmatic channel of communication. Examples of the additional or alternate contextual data include, but are not limited to, positional data characterizing a current or prior geographic position of client device 102 (e.g., positional data 208 of FIG. 2A), data generated by an additional application program executed by client device 102 (e.g., calendar data generated by and received from a calendar application executed by client device 102), or data characterizing a condition impacting a physical environment in which client device 102 operates (e.g., traffic or weather data received from the computing system via a programmatic interface).

Referring back to FIG. 2B, machine learning module 234 may generate and output expected transaction data 236, which uniquely identifies the determined potential counterparty to each of the expected purchase transactions, and specifies the expected parameter values, the expected temporal interval, and/or the expected payment instrument that characterize each of the expected purchase transactions. In some instances, predictive engine 139 may receive and route expected transaction data 236 to pre-authorization request module 224, which may perform any of the exemplary processes described herein to generate data 240 that requests a pre-authorization of each of the expected purchase transactions.

For example, pre-authorization request module 224 may perform operations that package user identifier 206A (e.g., which uniquely identifies user 101 to contextual transaction system 130 or issuer system 140) and/or device identifier 206B (e.g., the IP or MAC address assigned to client device 102) into a portion of pre-authorization request data 240 (e.g., within a header portion, etc.). Further, pre-authorization request module 224 may perform additional operations that establish, within pre-authorization request data 240, a discrete pre-authorization data record associated with the requested pre-authorization of each of the expected purchase transactions identified and characterized by expected transaction data 236.

By way of example, and as described herein, the elements of expected transaction data 236 may identify and characterize expected purchase transactions that include, but are not limited to, an expected initiation of a transaction to purchase oatmeal and coffee in the amount of $11.00 from a Starbucks™ coffee shop located in Washington, D.C., at 2130 H Street N.W., on Apr. 9, 2018 between 8:45 a.m. and 9:00 a.m. In some instances, the elements of expected transaction data 236 may specify, for the expected purchase transaction from the Starbucks™ coffee shop, information that includes, but is not limited to, an identifier of a corresponding counterparty (e.g., an IP or MAC address assigned to a terminal device operated by the Starbucks™ coffee shop, such as terminal device 122), expected parameter values that characterize the expected purchase transaction (e.g., the expected transaction value of $11.00, identifiers of the expected products or services, such as UPCs assigned to the oatmeal and coffee, etc.), an expected temporal interval for the expected purchase transaction (e.g., Apr. 9, 2018 between 8:45 a.m. and 9:00 a.m.), and expected payment data characterizing the payment instrument available to fund the expected purchase transaction (e.g., an identifier of, or tokenized data associated with, the Visa™ credit card account held by user 101).

Pre-authorization request module 224 may perform operations that establish, within pre-authorization request data 240, a pre-authorization data record 242 for the expected purchase of coffee and oatmeal from the Starbucks™ coffee shop. Further, pre-authorization request module 224 may perform additional operations that packages portions of expected transaction data 236, which identify and characterize the expected purchase of coffee and oatmeal from the Starbucks™ coffee shop, into corresponding portions of pre-authorization data record 242.

For example, pre-authorization data record 242 may include, but is not limited to, counterparty data 242A that identifies and characterizes the Starbucks™ coffee shop (e.g., an IP or MAC address of terminal device 122 operated by the Starbucks™ coffee shop, etc.), and parameter data 242B that identifies and characterizes the expected purchase transaction for coffee and oatmeal from the Starbucks™ coffee shop. In some instances, parameter data 242B may include, but is not limited to, the expected transaction value (e.g., $11.00) and the identifiers of the products or services involved in the expected purchase transaction (e.g., the UPCs assigned to the oatmeal and coffee).

Pre-authorization data record 242 may also include payment data 242C, which identifies and characterizes the expected payment instrument (e.g., the identifier of, or the tokenized data associated with, the Visa™ credit card account held by user 101), and temporal data 242D, which specifies the temporal interval during which client device 102 is expected to initiate the purchase transaction with the Starbucks™ coffee shop (e.g., Apr. 9, 2018 between 8:45 a.m. and 9:00 a.m.). The disclosed embodiments are, however, not limited to, these exemplary components of pre-authorization data record 242, and in other instances, pre-authorization data record 242 may include any additional or alternate data facilitating a pre-authorization of the expected purchase of coffee and oatmeal from the Starbucks™ coffee shop by a computing system operated by a financial institution that issued the expected payment instrument, e.g., issuer system 140.

In some examples, pre-authorization request module 224 may perform any of the exemplary processes described herein to generate a pre-authorization data record for each of the expected purchase transactions identified and specified within expected transaction data 236. In some instances, as described herein, the expected purchase transactions identified within expected transaction data 236 may represent discrete, unrelated events (e.g., an initiation of the expected purchase transaction involving the Devon & Blakely™ marketplace is unrelated to, and not conditioned upon, a prior initiation of the expected purchase transaction the Starbucks™ coffee shop).

In other instances, and consistent with the disclosed exemplary embodiments, one (or more) of the expected purchase transactions identified within expected transaction data 236 may represent a parent purchase transaction, the initiation of which conditions, triggers, or facilitates the subsequent initiation of one or more supplemental purchase transactions. For example, the expected purchase of the bowling shoe rental at the Lucky Strike™ bowling alley may represent a parent purchase transaction, and the expected purchases of the first and second rounds of concessions at the Lucky Strike™ bowling alley may represent supplemental transactions, the initiation of which is conditioned upon the initiation of the primary purchase transaction.

Referring back to FIG. 2B, pre-authorization request module 224 may perform operations that provide pre-authorization request data 240 as an input to routing module 225 of contextual transaction system 130. In some instances, routing module 225 may extract, from a locally accessible, tangible, non-transitory memory, the unique network address of issuer system 140 (e.g., an IP of a MAC address assigned to issuer system 140), and may perform additional operations that cause contextual transaction system 130 to transmit pre-authorization request data 240 across network 120 to the extracted network address of issuer system 140, e.g., using any appropriate communications protocol. For example, and as described herein, user 101 may elect to fund each of the expected purchase transactions using the Visa™ credit card account held issued by the financial institution that operates issuer system 140, and issuer system 140 may be configured to pre-authorize each of the expected purchase transactions in accordance with respective portions of pre-authorization request data 240.

Figure 3:
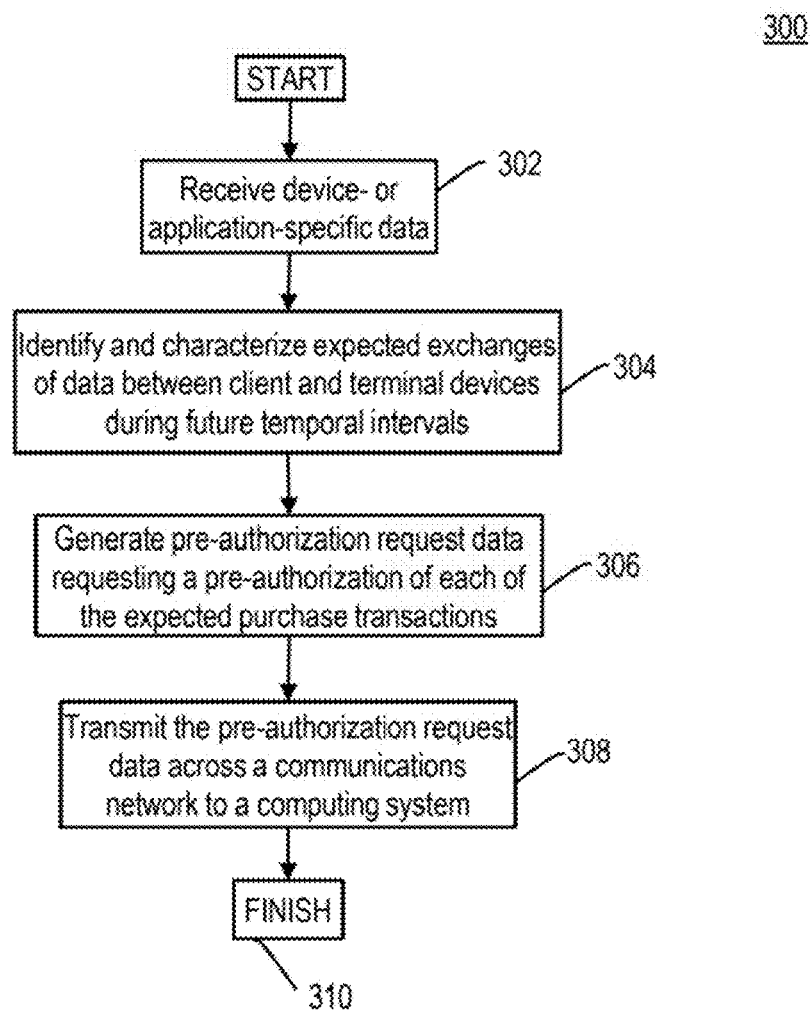
FIG. 3 is a flowchart of an exemplary process for identifying, characterizing, and requesting a pre-authorization of an expected exchange of data, in accordance with disclosed exemplary embodiments, consistent with the disclosed embodiments.

FIG. 3 is a flowchart of an exemplary process 300 for identifying, characterizing, and requesting pre-authorization of expected exchanges of data capable of initiation between client and terminal devices during future temporal intervals, in accordance with disclosed exemplary embodiments. In one example, the expected data exchanges may correspond to an expected occurrence of a purchase transaction (e.g., an expected purchase transaction), which may be initiated between a client device, such as client device 102, and a terminal device, such as terminal device 122, during a future temporal interval. In some examples, contextual transaction system 130, which may be associated with an application program executed by client device 102 (e.g., executed payment application 107) may perform the steps of exemplary process 300.

Referring to FIG. 3, contextual transaction system 130 may receive device- or application-specific data from client device 102 through a corresponding secure, programmatic interface (e.g., in step 302). The received device- or application-specific data may also include a unique identifier of user 101 (e.g., an authentication or login credential associated with payment application 107, such as an alphanumeric character string or a biometric authentication credential) and in some instances, may also include a unique device identifier (e.g., an IP address or a MAC address assigned to client device 102). Additionally, or alternatively, the device- or application-specific data may also include positional data that, among other things, specifies a current geographic position of client device 102 in terms of one or more geospatial coordinates (e.g., a longitude, latitude, and/or altitude) and/or a time or date upon which client device 102 captured the current geographic position.

In some examples, all or a portion of the device- or application-specific data may be generated by an application program executed by client device 102 (e.g., executed payment application 107), and contextual transaction system 130 may receive the device- or application-specific data from client device 102 at predetermined intervals, or in response to occurrences of certain events, such as a change in an operational mode of client device 102 or a change in a geographic position of client device 102 (e.g., a push operation). In other examples, client device 102 may generate and transmit the device- or application-specific data to contextual transaction system 130 in response a receipt of request data transmitted by contextual transaction system 130 (e.g., a pull operation).

Referring back to FIG. 3, and responsive to the receipt of the device- or application-specific data, contextual transaction system 130 may perform any of the exemplary location-based processes and/or predictive processes described herein to identify a potential counterparty to one or more expected data exchanges (such as, but not limited to, purchase transactions) capable of initiation by client device 102 during a future temporal interval, and to compute expected values of parameters that characterize each of the expected purchase transactions (e.g., in step 304). In some exemplary embodiments, in step 304, contextual transaction system 130 may perform any of the exemplary processes described herein to the identify the potential counterparties (e.g., one or more merchants) based on a determined proximity of these potential counterparties to the current geographic position of client device 102, and to determine the expected parameter values that characterize expected data exchanges and/or purchase transactions involving these potential counterparties based on a merchant-specific parameter value, customer-specific parameter value, or a default parameter value.

In additional exemplary embodiments, in step 304, contextual transaction system 130 may perform any of the exemplary processes described herein to the identify the potential counterparties (e.g., the one or more merchants), or to determine the expected parameter values that characterize expected purchase transactions involving these potential counterparties, based on an application of one or more machine learning algorithms (or processes) or adaptive processes to locally stored transaction data. The locally stored transaction data may, in some instances, characterize prior purchase transactions initiated by client device 102, and additionally, or alternatively, by other client devices operating within environment 100.

For instance, in step 304, contextual transaction system 130 may generate, for each of the expected purchase transactions, counterparty data that uniquely identifies the corresponding potential counterparty, such as a device identifier of terminal device 122 (e.g., an assigned IP or MAC address). Further, the expected parameter values computed for each of the expected purchase transactions may include, among other things, an expected transaction value, an expected product or service, an expected transaction date or time (or expected temporal interval defining a range of transaction dates or time), and an expected payment instrument. Further, in step 304, contextual transaction system 130 may perform any of the exemplary processes described herein to package the expected parameter values into corresponding portions of parameter data (e.g., that includes the expected transaction values, expected products or services, etc.), temporal data (e.g., that includes the expected transaction date or time, or the range of expected transaction dates or time), and payment data (e.g., that includes an identifier of, or tokenized account data associated with, the expected payment instrument).

In step 306, contextual transaction system 130 may perform any of the exemplary processes described herein to generate data that requests a pre-authorization of each of the expected data exchanges and/or purchase transactions in accordance with the expected parameter values (e.g., in step 306). For example, the generated pre-authorization request data may include one or more discrete pre-authorization data records, each of which request the pre-authorization of a corresponding one of the expected purchase transactions, and each of which include a corresponding portions of the counterparty, parameter, temporal, and/or payment data. Contextual transaction system 130 may also perform operations that transmit the generated pre-authorization request data across network 120 to issuer system 140 (e.g., in step 308).

Issuer system 140 may perform any of the exemplary processes described herein, either alone or in conjunction with payment network system 150 or tokenization system 160, to pre-authorize the expected data exchanges in accordance with the corresponding portions of the counterparty, parameter, temporal, and/or payment data, to generate a pre-authorization token that represents each of the pre-authorized data exchanges, and to provision that pre-authorization token to a terminal device operated by the corresponding counterparty, e.g., terminal device 122. Exemplary process 300 is then complete in step 310.

B. Exemplary Computer-Implemented Processes for Generating and Provisioning Pre-Authorization Tokens to Network-Connected Terminal Devices in Real Time Referring to FIG. 4A, a programmatic interface established and maintained by issuer system 140, such as application programming interface (API) 402, may receive pre-authorization request data 404 from contextual transaction system 130. By way of example, API 402 may provide pre-authorization request data 404 as an input to a local management module 406 of issuer system 140, which may store pre-authorization request data 404 within one or more tangible, non-transitory memories (e.g., within a portion of pre-authorization data 146 of FIG. 1). In some examples, pre-authorization request data 404 may include elements of data that uniquely identify user 101 (e.g., user identifier 206A) and/or client device 102 (e.g., device identifier 206B), and one or more pre-authorization data records that reflect a request to pre-authorize a corresponding expected purchase transaction capable of initiation by client device 102 during a future temporal interval.

Local management module 406 may, in some instances, provide pre-authorization request data 404 as an input to a pre-authorization module 408 of issuer system 140. In some instances, pre-authorization module 408 may receive pre-authorization request data 404 from local management module 406, and parse pre-authorization request data 404 to extract user identifier 206A and additionally, or alternatively, device identifier 206B. As described herein, user identifier 206A may include an alpha-numeric character string, a biometric authentication credential, or other appropriate authentication credential that uniquely identifies user 101 to issuer system 140), and device identifier 206B may include a unique network identifier of client device 102 within environment 100, such as the IP or MAC address assigned to client device 102.

Further, pre-authorization module 408 may perform any of the exemplary processes described herein to pre-authorize each of the expected purchase transactions identified and characterized by corresponding pre-authorization data records of pre-authorization request data 404. In some instances, pre-authorization request data 404 may include a pre-authorization data record 410, which corresponds to a request to pre-authorize an expected initiation, by client device 102, of a transaction to purchase oatmeal and coffee in the amount of $11.00 from a Starbucks™ coffee shop located in Washington, D.C., on Apr. 9, 2018 between 8:45 a.m. and 9:00 a.m.

For example, pre-authorization data record 410 may include, but is not limited to, counterparty data 410A and identifies the counterparty to the expected purchase transaction (e.g., that specifies an IP or a MAC address assigned to terminal device 122, as operated by the Starbucks™ coffee shop), and parameter data 410B that identifies the expected value of the parameters that characterize the expected purchase transaction (e.g., the expected transaction value of $11.00, the UPCs assigned to the oatmeal and coffee, etc.) Pre-authorization data record 410 may also include payment data 410C that identifies the expected payment instrument (e.g., an identifier of, or tokenized account data associated with, the Visa™ credit card account held by user 101) and temporal data 410D that identifies a temporal interval during which client device 102 is expected to initiate the expected purchase transaction with terminal device 122 (e.g., Apr. 9, 2018 between 8:45 a.m. and 9:00 a.m.).

In some instances, pre-authorization module 408 may extract, from pre-authorization data record 410, portions of parameter data 4106 that identify the expected parameter values (e.g., the $11.00 expected transaction value, etc.) and payment data 410C that identify the expected payment instrument (e.g., the identifier of, or the tokenized account data associated with, the Visa™ credit card account). Further, pre-authorization module 408 may also access stored data that identifies one or more payment instruments issued by the financial institution that operates issuer system 140, and that characterizes a current account status of each of the one or more identified payment instruments (e.g., as maintained within customer account data 142).

In some instances, pre-authorization module 408 may identify one or more data records 412 within customer account data 142 that include or reference user identifier 206A or device identifier 206B, and data records 412 may identify, and characterize a current account status of, one or more payment instruments held by user 101, such as the Visa™ credit card account described herein. For example, data records 412 may specify, among other things, data identifying the Visa™ credit card account (e.g., actual or tokenized account data, such as an account number, expiration date, verification code, etc.), a current account balance or credit limit of the Visa™ credit card account, and/or values of other account parameters that characterize and facilitate a pre-authorization (or an authorization) of purchase transactions involving the Visa™ credit card account.

Pre-authorization module 408 may determine whether to authorize the expected purchase transaction using the expected payment instrument (e.g. the Visa™ credit card account) based on portions of the expected parameter values (e.g., as extracted from parameter data 4106) and extracted data records 412 that identify and characterize the Visa™ credit card account (e.g., in accordance with the one or more payment or authorization protocols, such as the EMV payment protocol). In one instance, portions of extracted data records 412 may associate tokenized account data identifying the Visa™ credit card account with the data indicative of the current account status (e.g., the account balance, available credit, credit limit, etc.), and pre-authorization module 408 may perform operations that locally determine whether to pre-authorize, or alternatively, to decline, the expected purchase transaction in accordance with the expected parameter values.

Figure 4A:
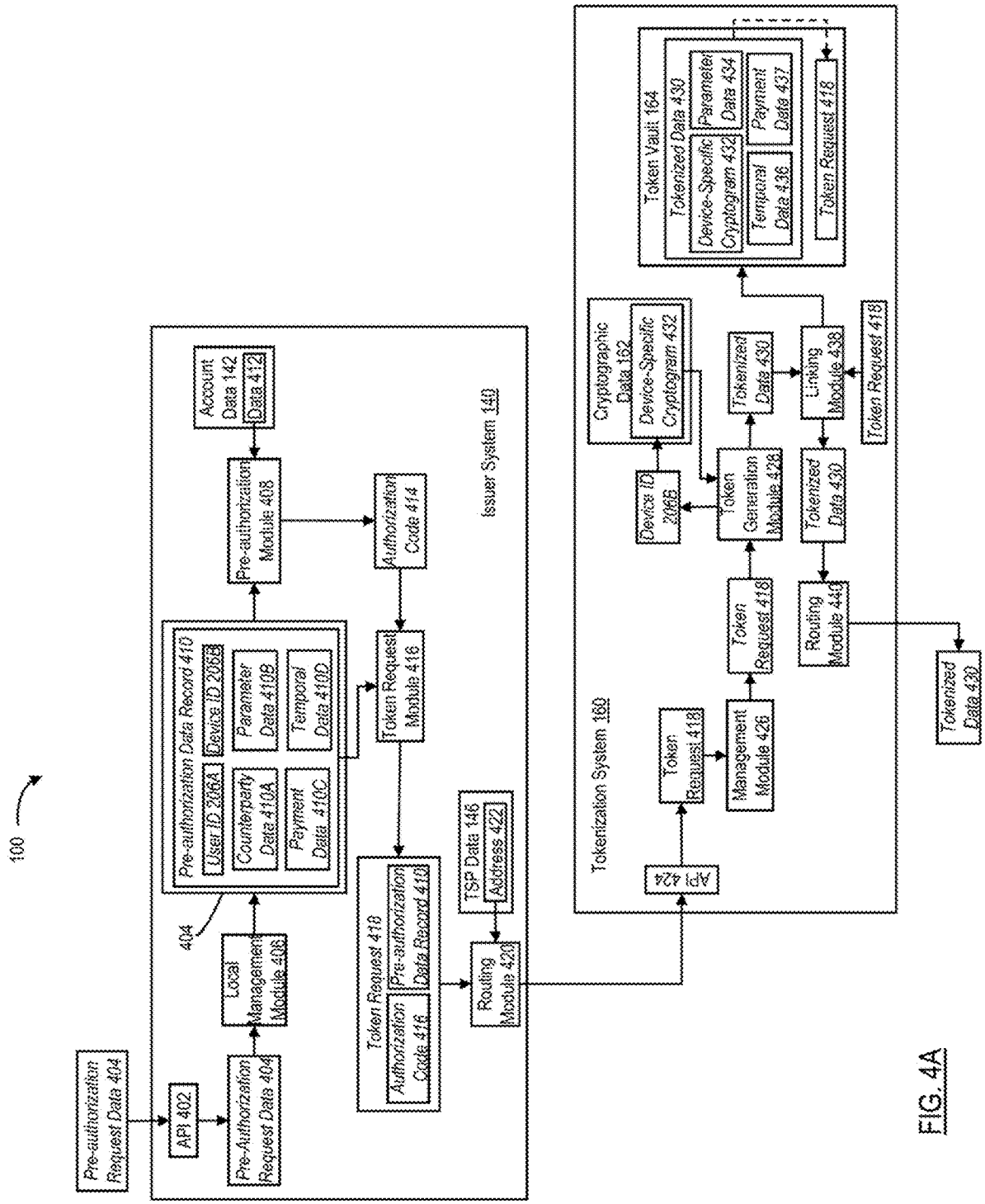
FIGS. 4A and 4B are diagrams illustrating portions of an exemplary computing environment, consistent with the disclosed embodiments.

In other instances, not illustrated in FIG. 4A, extracted data records 412 may associate the data indicative of the current status of the Visa™ credit card account with portions of actual account data, and not with the extracted portions of the tokenized account data included within payment data 410C. Pre-authorization module 408 may perform additional operations that transmit all or a portion the tokenized account data (e.g., as extracted from payment data 410C) across network 120 to tokenization system 160, e.g., through a secure, programmatic communications channel. Tokenization system 160 may receive the tokenized account data, e.g., through a corresponding programmatic interface, and may perform operations that access and load the actual account information associated with the tokenized account data from one or more secure data repositories, such as token vault 164 of FIG. 1. Tokenization system 160 may package and transmit the actual account information across network 120 to issuer system 140, e.g., through the secure, programmatic communications channel. Based on portions of the actual account information, pre-authorization module 408 may access the data indicative of the current status of the Visa™ credit card account (e.g., within extracted data records 412), and perform any of the exemplary processes described herein to pre-authorize, or alternatively, to decline, the expected purchase transaction in accordance with the expected parameter values.

Referring back to FIG. 4A, and in response to a decision to pre-authorize the expected purchase transaction in accordance with the expected parameter values and using the Visa™ credit card account (e.g., that the expected transaction value of $11.00 would not increase the account balance of the Visa™ credit card account above the credit limit, etc.), pre-authorization module 408 may generate an authorization code 414 that confirms the pre-authorization of the expected purchase transaction. In some examples, pre-authorization module 408 may provide generated authorization code 414, along with portions of pre-authorization data record 410, as inputs to a token request module 416 of issuer system 140.

Alternatively, and in response to a decision to decline the expected purchase transaction (e.g., based on a determination that expected transaction value of $11.00 would increase the account balance of the Visa™ credit card account above the credit limit, that the expected purchase transaction increases a transaction velocity above a threshold value, etc.), pre-authorization module 408 may discard pre-authorization data record 410 (not illustrated in FIG. 4A). Pre-authorization module 408 may further access an additional one of the pre-authorization data records, and perform any of the exemplary processes described herein to pre-authorization the corresponding expected purchase transaction.

Token request module 416 may receive pre-authorization code 414 and pre-authorization data record 410, and in some instances, may perform operations that package pre-authorization code 414, and all or a portion of pre-authorization data record 410, into a token request 418 for tokenized data representative of the pre-authorization of the expected purchase transaction involving client device 102 and merchant 121, e.g., the Starbucks™ coffee show identified above. In some examples, token request module 416 may provide token request 418 as an input to a routing module 420 of issuer system 140, which may receive token request 418 and extract a unique network address 422 of tokenization system 160 from one or more tangible, non-transitory memories, e.g., from TSP data 149. Routing module 420 may perform operations that cause issuer system 140 to transmit token request 418 across network 120 to network address 422 of tokenization system 160, e.g., using any appropriate communications protocols.

A programmatic interface established and maintained by tokenization system 160, such as application programming interface (API) 424, may receive token request 418 from issuer system 140. By way of example, API 424 may provide token request 418 as an input to a management module 426 of tokenization system 160, which may store token request 418 within one or more tangible, non-transitory memories. Management module 426 may also parse token request 418 to detect authorization code 414, which confirms the successful pre-authorization of the expected purchase transaction involving client device 102 and merchant 121, e.g., the Starbucks™ coffee shop.

In response to the detection of pre-authorization code 414, management module 426 may provide token request 418 as an input to a token generation module 428 of tokenization system 160, which may perform any of the exemplary processes described here to generate tokenized data, such as a digital "pre-authorization" token, representative of the pre-authorization of the expected purchase transaction (e.g., the expected purchase of oatmeal and coffee involving client device 102 and terminal device 122 operated by the Starbucks™ coffee shop) in accordance with the expected parameter values and selected payment instrument (e.g., the Visa™ credit card account held by user 101).

Token generation module 428 may receive token request 418 from management module 426, and may parse token request 418 to extract, among other things, data identifying user 101 or client device 102 (such as user identifier 206A or device identifier 206B) and transaction data characterizing the pre-authorized purchase transaction (such as the expected transaction value of $11.00, etc., from parameter data 410B). Token generation module 428 may perform any of the exemplary processes described herein to generate tokenized data 430 that is representative of pre-authorized purchase transaction between client device 102 and terminal device 122, e.g., the expected $11.00 purchase of the coffee at oatmeal from the Starbucks™ coffee shop on Apr. 9, 2018, between 8:45 a.m. and 9:00 a.m.

In some examples, during the generation of tokenized data 430, token generation module 428 may access cryptographic data 162 and extract a device-specific cryptogram 432 associated with, linked to, device identifier 206B. As described herein, the device-specific cryptogram may uniquely identify client device 102, and may enable terminal device 122 to authenticate an identity of client device 102 during a performance of any of the exemplary offline authorization processes described herein. Examples of the one or more device-specific cryptograms include, but are not limited to, a secure element hash value, a multi-use digital token consistent with a host card emulation (HCE) protocol, or another hash value, code, or cryptogram capable of uniquely identifying client device 102 in accordance with an appropriate payment protocol, such as an EMV payment protocol.

Token generation module 428 may perform operations that package device-specific cryptogram 432 into a portion of tokenized data 430. In further examples, token generation module 428 may also incorporate, within tokenized data 430, additional parameter data 434, which identifies the parameter values that characterize the newly pre-authorized purchase transaction (e.g., the pre-authorized transaction value of $11.00), additional temporal data 436, which characterizes the temporal interval of validity for tokenized data 430 (e.g., Apr. 9, 2018, between 8:45 a.m. and 9:00 a.m.), and/or additional payment data 437, which identifies the payment instrument that funded the newly pre-authorized purchase transaction (e.g., an identifier or, or tokenized account data associated with, the Visa™ credit card account).

In some instances, token generation module 428 may provide tokenized data 430 as an input to a linking module 438, which may access locally stored token request 418 (e.g., as maintained within the one or more transitory memories), and may perform operations that store tokenized data 430 and portions of token request 418 within one or more portions of token vault 164. Linking module 438 may also provide tokenized data 430 as an input to a routing module 440 of tokenization system 160. In some instances, routing module 440 may access a unique network identifier of issuer system 140, such as an IP address or a MAC address, and may perform operations that cause tokenization system 160 to transmit tokenized data 430 to issuer system 140, e.g., using any appropriate communications protocol. As described below in reference to FIG. 4B, issuer system 140 may perform any of the exemplary processes described herein to provision tokenized data to the terminal devices associated with the pre-authorization data record 410, e.g., terminal device 122 operated by merchant 121.

Further, although not illustrated in FIG. 4A, issuer system 140 and tokenization system 160 may, individually and collectively, perform any of the exemplary processes described herein to pre-authorize each additional, or alternate, expected purchase transaction included within pre-authorization request data 404 (e.g., as specified in respective additional, or alternate, pre-authorization data records), and to generate additional elements of device-specific tokenized data that reflect respective ones of the pre-authorized purchase transactions between client device 102 and corresponding counterparties. In some instances, issuer system 140 and tokenization system 160 may pre-authorize the expected purchase transactions and generate the additional elements of device-specific tokenized data on a transaction-by-transaction basis, or using batch or parallelized processing.

Figure 4B:
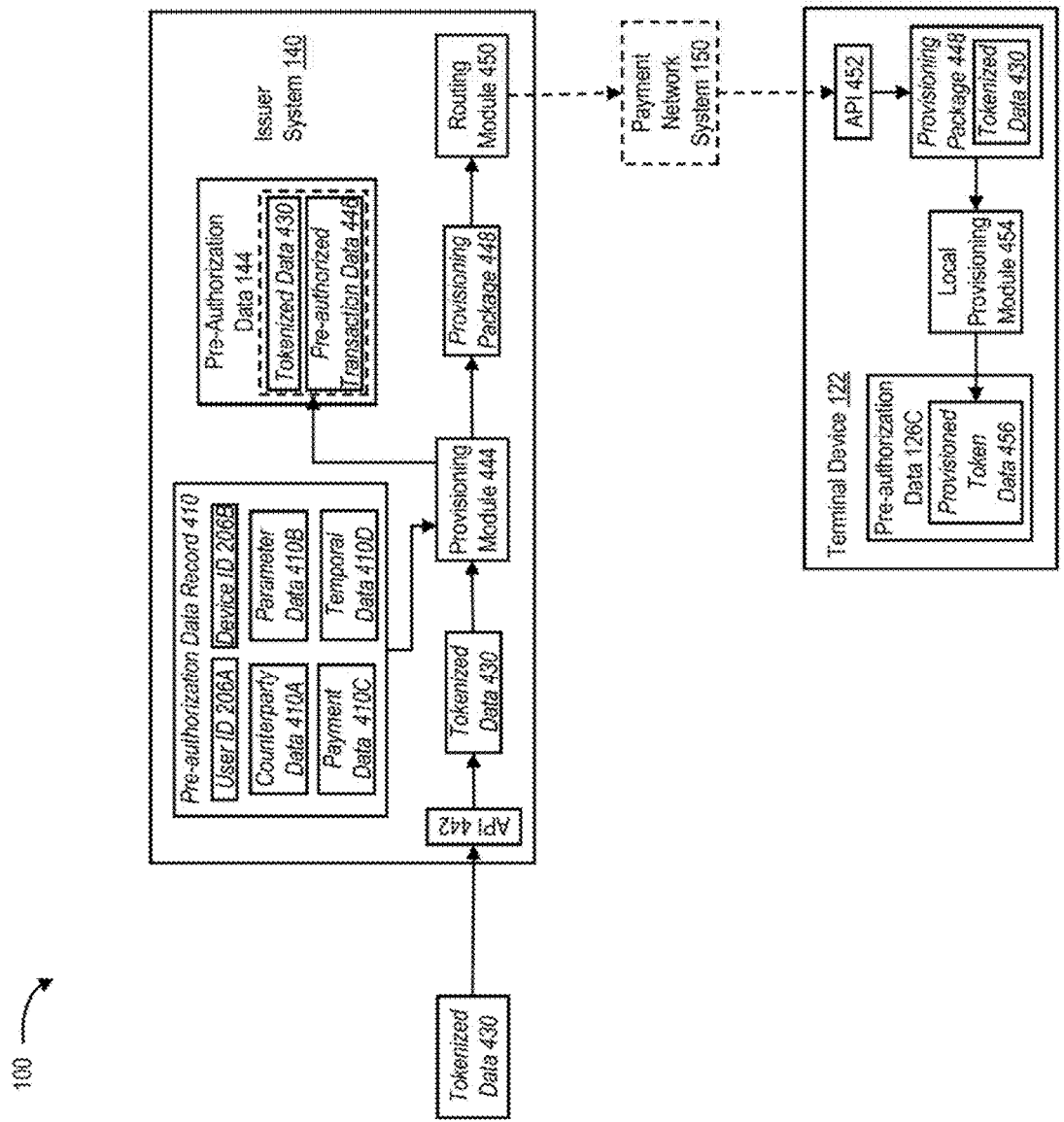

Referring to FIG. 4B, a programmatic interface established or maintained by issuer system 140, such as application programming interface (API) 442, may receive tokenized data 430 from tokenization system 160, and API 442 may route tokenized data 430 to a provisioning module 444 of issuer system 140. Provisioning module 444 may receive tokenized data 430, and may perform additional operations that store tokenized data 430 within one or more tangible, non-transitory memories, e.g., within pre-authorization data 146, along with pre-authorized transaction data 446 that includes the parameter values of the pre-authorized purchase transaction and identifies the payment instrument that funded the pre-authorized purchase transaction.

For example, provisioning module 444 may access locally stored pre-authorization request data 404, and extract the parameter values of the pre-authorized purchase transaction from parameter data 4106 of pre-authorization data record 410 (e.g., the $11.00 pre-authorized transaction value, the UPCs assigned to the expected oatmeal and coffee). Provisioning module 444 may also extract payment data identifying the payment instrument that funded the pre-authorized purchase transaction from payment data 410C of pre-authorization data record 410 (e.g., the identifier of, or the tokenized data associated with, the Visa™ credit card). Provisioning module 444 may package the extracted parameter values and payment data into potions of pre-authorized transaction data 446, which provisioning module 444 may store within pre-authorization data 146 and link to tokenized data 430.

Provisioning module 444 may also perform operations that package portions of tokenized data 430 into a provisioning package 448 for transmission across network 120 to terminal device 122, e.g., as operated by the Starbucks™ coffee shop located at 2130 H Street N.W. in Washington, D.C. In some instances, provisioning module 444 may also extract a unique device identifier of terminal device 122 (e.g., an assigned IP or MAC address) from counterparty data 410A of pre-authorization data record 410, and provide device identifier 206B and provisioning package 448 as inputs to routing module 450.

Routing module 450 may perform operations that cause issuer system 140 to transmit provisioning package 448 across network 120 to the unique network address of terminal device 122, e.g., using any appropriate communications protocol. In some examples, issuer system 140 may transmit provisioning package 448 across network 120 to terminal device 122 through a secure, programmatic communications channel established and maintained by payment network system 150 and one or more acquirer systems associated with terminal device 122, or directly without any intermediaries (e.g., the issuer system 140 is maintains by a financial institution that both issues the Visa™ credit card and provides merchant banking services to merchant 121, such as the Starbucks™ coffee shop).

In some examples, a programmatic interface established and maintained by terminal device 122, e.g., application programming interface (API) 452 may receive provisioning package 448 from issuer system 140. API 452 may provide provisioning package 448 as an input to a local provisioning module 454 of terminal device 122, which may perform any of the exemplary processes described herein to automatically provision tokenization data 430, which represents the pre-authorized purchase transaction involving client device 102 and terminal device 122 of merchant 121 (e.g., the pre-authorized purchase of the oatmeal and coffee from the Starbucks™ coffee shop on Apr. 9, 2018 between 8:45 a.m. and 9:00 a.m.) to terminal device 122 prior to the expected occurrence of that pre-authorized purchase transaction automatically and without intervention from user 101.

In some examples, local provisioning module 454 may process provisioning package 448, extract tokenized data 430 (e.g., which represents the pre-authorized purchase transaction involving client device 102 and terminal device 122) and store tokenized data 430 within a corresponding portion of pre-authorization data 126C, e.g., as provisioned token data 456. Upon storage within provisioned token data 456 (e.g., alone or in conjunction with elements of the supporting data), tokenized data 430 may be provisioned to facilitate an offline authorization of purchase transactions initiated by client device 102 and additionally, or alternatively, other client devices operating within environment 100.

As described herein, tokenized data 430 may correspond to a device-specific digital token, such as a pre-authorization token, that reflects a pre-authorization of an exchange of data between a corresponding pair of terminal and client devices, such as terminal device 122 and client device 102, and may include a device-specific cryptogram that uniquely identifies client device 102. Further, tokenized data 430, and the corresponding pre-authorization token, may also be associated with, and characterized by a limited period of temporal validity, e.g., as defined by the expected initiation of the pre-authorized purchase transaction on Apr. 9, 2018, between 8:45 a.m. and 9:00 a.m.

The device specificity and the limited temporal validity of tokenization data 430 may, in some examples, reduce an ability of a malicious third party to initiate fraudulent transactions via mobile devices, as a device operated by the malicious third party would need not only to intercept payment data associated with client device 102, but also to obtain the device-specific cryptogram associated with the client device 102, and to provide the intercepted payment data and the device-specific cryptogram to terminal device 122, which maintains tokenized data 430 linked to the device-specific cryptogram, during the corresponding period of temporal validity of tokenized data 430. Certain of these exemplary processes, which facilitate an offline authorization of initiated data exchanges and transactions based on device-specific, tokenized data having limited temporal validity, may be implemented in addition to, or as an alternate to, other processes that initiate and authorize transactions based on online or offline authorization protocols.

Figure 5:
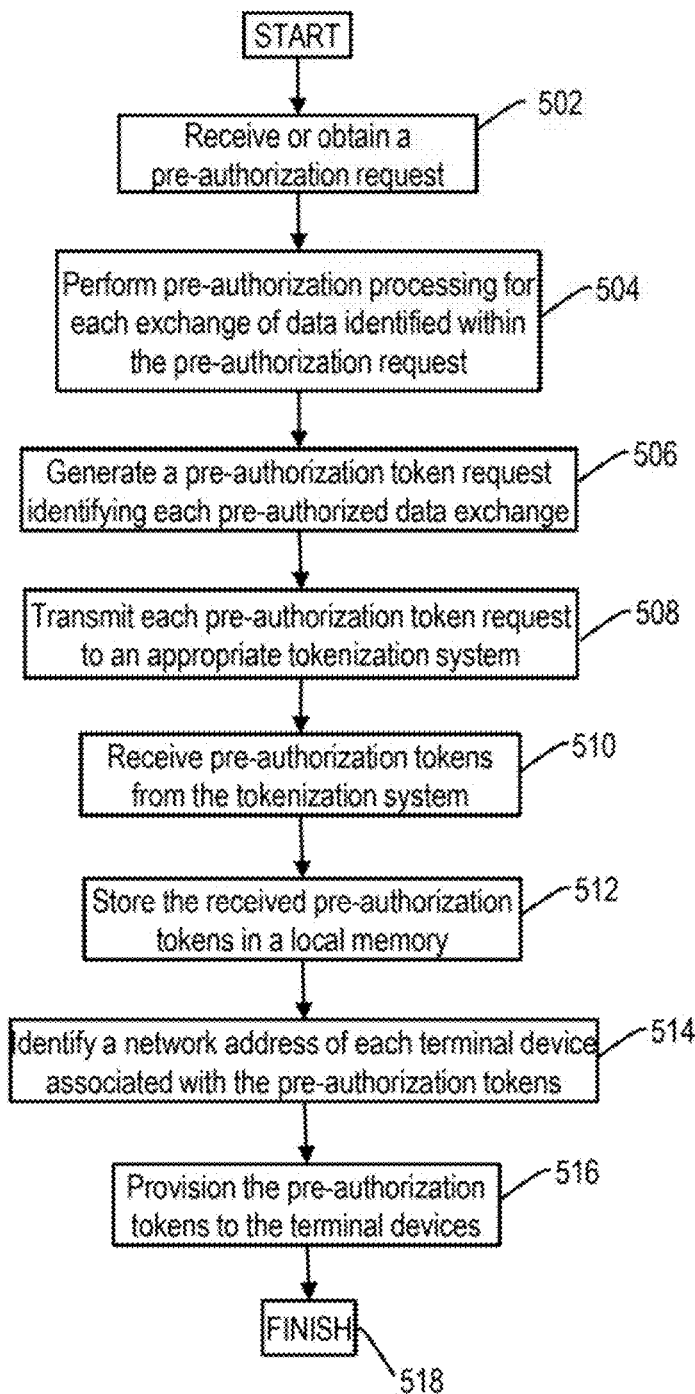
FIG. 5 is a flowchart of an exemplary process for generating and provisioning pre-authorization tokens, consistent with the disclosed embodiments.

FIG. 5 is a flowchart of an exemplary process 500 for generating and provisioning pre-authorization tokens to a terminal device, in accordance with disclosed exemplary embodiments. In one example, each of the pre-authorization tokens may be associated with a pre-authorization of an exchange of data, such as a pre-authorization of a purchase transaction, subject to initiation by client device 102 and a terminal device of a corresponding counterparty, such as terminal device 122 of merchant 121. Further, an as described herein, each of the pre-authorization tokens may be characterized by a limited period of temporal validity and additionally, or alternatively, and may include a device-specific cryptogram that enables terminal device 122 to not only authenticate an identity of client device 102, but also validate an integrity of the pre-authorization tokens. In some instances, issuer system 140 may perform all or a portion of the steps of exemplary process 500.

Referring to FIG. 5, issuer system 140 may receive a request to pre-authorize one or more expected exchanges of data capable of initiation by client device 102 during a corresponding future temporal interval (e.g., in step 502). In some examples, each of the one or more expected exchanges of data may correspond to a purchase of a product or service offered for sale by a corresponding merchant, such as merchant 121 that operates terminal device 122. Further, and as described herein, a computing system, such as contextual transaction system 130, may generate and transmit one or more digital signals that include the pre-authorization request across network 120 to issuer system 140, e.g., via a secure, programmatic interface In some instances, and for each of the expected purchase transactions, the received pre-authorization request may include a unique identifier of user 101 (e.g., an alphanumeric or biometric authentication credential), a unique identifier of client device 102 (e.g., an IP address or a MAC address). The pre-authorization request may also include, for each of the expected purchase transactions, counterparty data that identifies and characterizes a corresponding one of the counterparties (e.g., a unique identifier of terminal device 122, such as an IP address of a MAC address, one or more the merchant identifiers described herein, discrete geographic positions of the counterparty merchants, etc.).

Further, in additional examples, the pre-authorization request may also include parameter data specifying an expected value of one or more transaction parameters that characterize each of the expected purchase transactions (e.g., an expected transaction value, an expected product or service, etc.), and payment data characterizing a payment instrument capable of funding each of the expected purchase transactions (e.g., a payment-instrument identifier, tokenized account information, such as a tokenized account number, expiration date, or verification code, etc.). The pre-authorization request may also include temporal data that specifies an expected transaction time or date, or a range of expected transactions times or dates, for each of the expected purchase transactions. In some examples, the range of expected transactions times or dates may establish a period of temporal validity for corresponding pre-authorization tokens or tokenized data generated in accordance with the exemplary processes described herein.

Referring back to FIG. 5, issuer system 140 may perform operations that pre-authorize, or alternatively, decline, each of the expected data exchanges specified within the received pre-authorization request (e.g., in step 504). For example, in step 504, issuer system 140 may perform any of the exemplary processes described herein to pre-authorize or decline each of the specified in accordance with corresponding portions of the parameter data and the payment data. Further, and as described herein, issuer system 140 may also generate a pre-authorization code for each of the pre-authorized purchase transactions in step 504, or may discard information characterizing each of the now-declined purchase transactions.

Issuer system 140 may perform also operations that generate a pre-authorization token request that identifies and characterizes each of the pre-authorized data exchanges (e.g., in step 506). By way of example, and for each of the pre-authorized purchase transactions, the pre-authorization token request may include, but is not limited to, the generated authorization code, the user or device identifier, corresponding portions of the counterparty data (e.g., the identifiers of the terminal device, etc.), and corresponding portions of the parameter, payment, and temporal data. The disclosed embodiments are, however, not limited to these pre-authorization token requests that include exemplary components, and in other examples, the pre-authorization token request may include any additional or alternate information, including a subset of the information described herein, capable of identifying each of the pre-authorized purchase transactions.

In some examples, issuer system 140 may transmit the pre-authorization token request to one or more computing systems configured to provide tokenization services to issuer system 140, such as tokenization system 160 (e.g., in step 508). Tokenization system 160 may receive the pre-authorization token request, and may perform any of the exemplary processes described herein to generate a pre-authorization token for each of the pre-authorized data exchanges (e.g., the pre-authorized purchase transactions), and to store each of the pre-authorization tokens within a secure data repository, such as token vault 164 of FIG. 1. Further, tokenization system 160 may also associate or link, within token vault 164, each of the pre-authorization tokens with the corresponding generated authorization code, the user or device identifier, the corresponding portions of the counterparty data, and the corresponding portions of the parameter, payment, and temporal data. In some instances, and as described herein, tokenization system 160 may perform additional operations that package and transmit each of the generated pre-authorization tokens across network 120 to issuer system 140, e.g., using any of the secure communications protocols described herein.

As described herein, each of the generated pre-authorization tokens may reflect corresponding one of the pre-authorized purchase transactions, and may be associated with, and linked to, a corresponding client device, such as client device 102, and a corresponding terminal device, such as terminal device 122. In some instances, each of the generated pre-authorizations tokens may also include a device-specific cryptogram that uniquely identifies the client device involved in the corresponding pre-authorized purchase transaction, and that enables the terminal device involved in the corresponding pre-authorized purchase transaction to authenticate an identity of the client device. Examples of the one or more device-specific cryptograms include, but are not limited to, a secure element hash value, a multi-use digital token consistent with a host card emulation (HCE) protocol, or another hash value, code, or cryptogram capable of uniquely identifying client device 102 in accordance with an appropriate payment protocol, such as an EMV payment protocol.

Further, and as described herein, each of the generated pre-authorization tokens may also include temporal data that establishes the period of temporal validity for the pre-authorization token. In some instances, the period of temporal validity for the pre-authorization token may include an expected transaction time or date for the corresponding pre-authorized purchase transaction, and additionally or alternatively, may be established by a range of transaction dates or times that characterize the corresponding pre-authorized purchase transaction. One or more of the pre-authorization tokens may also include parameter data specifying the parameter values that characterize the corresponding pre-authorized purchase transaction (e.g., the pre-authorized transaction value, etc.), and/or payment data identifying the payment instrument that funded the corresponding pre-authorized purchase transaction (e.g., an identifier or, or tokenized account data associated with, the payment instrument).

Referring back to FIG. 5, issuer system 140 may receive the newly generated pre-authorization tokens from tokenization system 160 (e.g., in step 510), and perform additional operations that store the pre-authorization tokens within one or more tangible, non-transitory memories, such as within pre-authorization data 146 of FIG. 1 (e.g., in step 512). In some instances, issuer system 140 may also store, within pre-authorization data 146, additional transaction data that characterizes each of the pre-authorized purchase transactions (e.g., portions of the counterparty, parameter, payment, and/or temporal data described herein), and link elements of the additional transaction data to corresponding ones of the pre-authorization tokens.

Issuer system 140 may access and obtain a network address of the terminal device associated with each of the pre-authorization tokens, such as an assigned IP or MAC address (e.g., in step 514). In some instances, issuer system 140 may perform any of the exemplary processes described herein to package each of the pre-authorization tokens into a provisioning package, which issuer system 140 may transmit across network 120 to the network address of the corresponding terminal device using any appropriate communications protocol (e.g., in step 516).

The terminal devices may receive corresponding ones of the provisioning packages, and may perform operations that extract the pre-authorization token from the corresponding provisioning package and store the pre-authorization token within a portion of a locally accessible memory. Upon storage within the locally accessible memories, the pre-authorization tokens may be provisioned to the terminal devices, and may facilitate an offline authorization of purchase transactions initiated by client device 102 and additionally, or alternatively, other client devices operating within environment 100. Exemplary process 500 is then complete in step 518.

III. Exemplary Computer-Implemented Processes for Authorizing Exchanges of Data Locally and in Real Time Using Provisioned Digital Tokens As described herein, client device 102 may execute one or more native application programs, which may cause client device 102 to perform operations that initiate an exchange of data with a terminal device, such as terminal device 122, across an established communications channel, such as direct communications channel 120A. For example, terminal device 122 may be associated with or disposed within a physical location of merchant 121, such as an Starbucks™ coffee shop located in Washington, D.C., at 2130 H Street N.W., and user 101 may enter the Starbucks™ coffee shop, and may place an order to purchase coffee and oatmeal at 8:53 a.m. on Monday, Apr. 9, 2018. In instances, the initiated data exchange between client device 102 and terminal device 122 may facilitate a transaction to purchase the coffee and oatmeal from the Starbucks™ coffee shop.

For example, a cash register or other computing system maintained by at the Starbucks™ coffee shop (e.g., which corresponds to merchant 121 of FIG. 1) may obtain transaction data characterizing the purchase transaction (e.g., a transaction value of $10.25, identifiers of the purchase coffee and oatmeal, etc.), and provide the obtained transaction data to terminal device 122 across any appropriate wired or wireless connection. Terminal device 122 may receive the transaction data from the merchant computing system, and may perform operations that generate interface elements representative of portions of the received transaction data, which terminal device 122 may present within a graphical user interface (GUI) displayed on display unit 127A.

In response to the presented interface elements, which may prompt user 101 to provide a payment instrument capable of funding the transaction value of the initiated transaction, user 101 may dispose client device 102 proximate to terminal device 122, and interface unit 114 of client device 102 may establish communications channel 120A with terminal device 122 (e.g., through the communications device included within interface unit 128 of terminal device 122 using any of the short-range, wireless communication protocols described above). In some instances, processor 104 of client device 102 may execute a payment application, e.g., payment application 107, which may cause client device 102 to present, to user 101 through display unit 112A, one or more interface elements that identify a payment instrument, such as a Visa™ credit card account, provisioned to executed payment application 107 and available to fund initiated purchase transactions. The presented interface elements may also prompt user 101 to provide input to client device 102 that confirms an initiation of the purchase transaction.

Figure 6A:
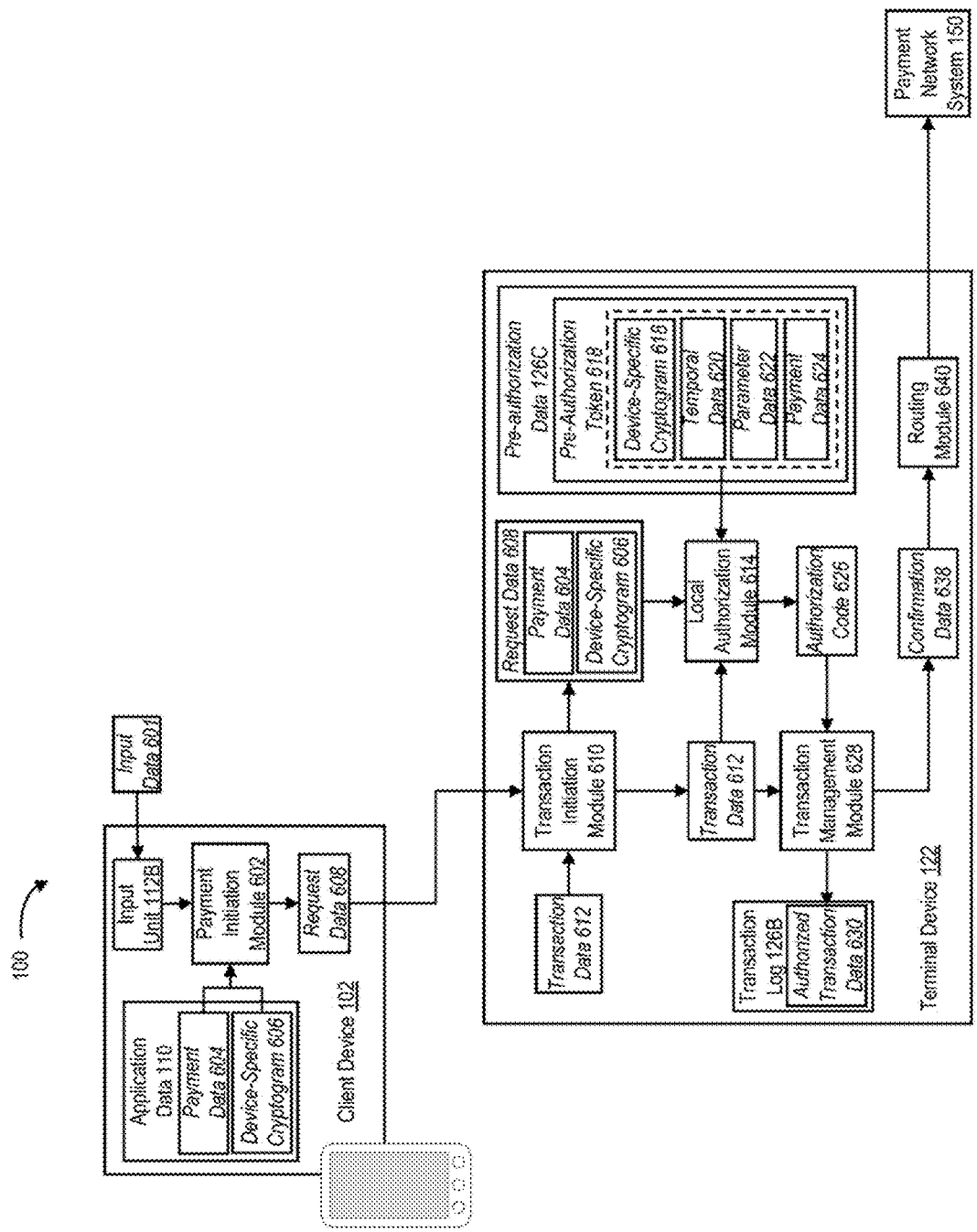
FIGS. 6A and 6B are diagrams illustrating portions of an exemplary computing environment, consistent with the disclosed embodiments.

For example, user 101 may decide to initiate the purchase transaction (e.g., the $10.25 purchase of oatmeal and coffee from the Starbucks™ coffee shop on Apr. 9, 2018, at 8:53 a.m.) using the provisioned Visa™ credit card account. Referring to FIG. 6A, user 101 may provide input data 601 indicative of that decision to client device 102, e.g., via input unit 112B. In some instances, input data 601 may include one or more authentication credentials, such as, but not limited to, an alphanumeric character string or a biometric authentication credential (e.g., data indicative of a fingerprint scan or a captured facial image), and executed payment application 107 may perform operations that authenticate an identity of user 101 based on input data 601.

Payment initiation module 602 of executed payment application 107 may receive input data 601 that confirms the decision of user 101 to initiate the $10.25 purchase of coffee and oatmeal from the Starbucks™ coffee shop on Apr. 9, 2018, at 8:53 a.m. As described herein, input data 601 may include the one or more authentication credentials of user 101, and in some instances (not illustrated in FIG. 6A), payment initiation module 602 may authenticate an identity of user 101 (and as such, a permission of user 101 to initiate the purchase transaction) based on a comparison of the one or more authentication credentials with portions of authentication data stored locally within one or more tangible, non-transitory memories. Responsive to a successful authentication of user 101's identity, payment initiation module 602 may perform operations that access application data 110 (e.g., as maintained within data repository 108 of FIG. 1), and identify and load payment data 604, which includes tokenized data account data associated with the provisioned Visa™ credit card account (e.g., a tokenized account number, expiration date, verification code, etc.).

Payment initiation module 602 may also identify and load a device-specific cryptogram 606, which uniquely identifies client device 102 within environment 100. In some instances, device-specific cryptogram 606 may enable a terminal device, such as terminal device 122, to authenticate an identity of client device 102 during a performance of any of the exemplary transaction authorization processes described herein. Examples of device-specific cryptogram 606 include, but are not limited to, a secure element hash value, a multi-use digital token consistent with a host card emulation (HCE) protocol, or another hash value, code, or cryptogram capable of uniquely identifying client device 102 in accordance with an appropriate payment protocol, such as an EMV payment protocol. In some examples, payment initiation module 6032 may package payment data 604 and device-specific cryptogram 606 into corresponding portions of request data 608, which client device 102 may transmit across communications channel 120A to terminal device 122 using any of the short-range communications protocols outlined above.

A transaction initiation module 610 of terminal device 122 may receive request data 608 from client device 102, and further, may receive transaction data 612 from the merchant computing system, e.g., the cash register operated by merchant 121. Transaction data 612 may, for example, include data characterizing the initiated transaction, such as, but not limited to, the corresponding transaction value (e.g., $10.25), the corresponding transaction time or date (e.g., 8:53 a.m. on Apr. 9, 2018), and the identifier of the product or products involved in the transaction (e.g., the UPCs assigned to the oatmeal and the coffee). In some aspects, transaction initiation module 610 may provide portions of request data 608 and transaction data 612 as an input to a local authorization module 614, which may perform any of the exemplary processes described herein to locally authorize the initiated purchase transaction based on a determined consistency between portions of request data 608 and transaction data 612 and corresponding elements of one or more pre-authorization tokens provisioned to terminal device 122.

For example, local authorization module 614 may receive request data 608 and transaction data 612, and may perform additional operations identify and extract device-specific cryptogram 606 from request data 608. Local authorization module 614 may also access pre-authorization data 126C, which maintains one or more elements of tokenized data, such as pre-authorization tokens, generated and provisioned to terminal device 122 using any of the exemplary processes described herein. In some examples, each of the pre-authorization tokens may reflect, and correspond to, a pre-authorized purchase transaction capable of initiation between terminal device 122 and a client device, such as, but not limited to client device 102. As described herein, each of the pre-authorization tokens may be specific to a corresponding client device, and may include a device-specific cryptogram that uniquely identifies the corresponding client device within environment 100.

In some examples, each of the pre-authorization tokens may also be associated with, and characterized by, a period of temporal validity, and may include temporal data that specifies the period of temporal validity. For instance, the period of temporal validity for each pre-authorization token may include, but is not limited to, a range of times or dates during which the corresponding client device is expected to initiate the corresponding pre-authorized purchase transaction. Further, and as described herein, each of the pre-authorization tokens may include values of one or more transaction parameters that characterize the corresponding pre-authorized purchase transaction (e.g., a pre-authorized transaction value, pre-authorized products or services, etc.) and payment data that identifies the payment instrument selected to fund the corresponding pre-authorized purchase transaction (e.g., tokenized account data, etc.).

Referring back to FIG. 6A, local authorization module 614 may access each of the pre-authorization tokens maintained within pre-authorization data 126C, and determine whether device-specific cryptogram 606 (e.g., as received from client device 102) matches the device-specific cryptogram included within one, or more, of the pre-authorization tokens. If, for example, local authorization module 614 were to determine that device-specific cryptogram 606 fails to match any of the device-specific cryptograms included within the locally maintained pre-authorization tokens, local authorization module 614 may establish that client device 102 is not a counterparty to any of the pre-authorized purchase transactions involving terminal device 122 (and merchant 121). Local authorization module 614 may decline to authorize the initiated purchase transaction based on the locally maintained pre-authorization tokens, and in some examples, terminal device 122 may generate and transmit a request for an online authorization of the initiated purchase transaction (e.g., based on processes performed by issuer system 140 or tokenization system 160) across network 120 to payment network system 150.

Alternatively, if local authorization module 614 were to determine that device-specific cryptogram 606 matches the device-specific cryptogram included within one or more of the locally maintained pre-authorization tokens, local authorization module 614 may determine that client device 102 is counterparty to one or more of the pre-authorized purchase transactions involving terminal device 122. Based on this determination, local authorization module 614 may perform additional operations that determine whether the temporal data, parameter values, and payment data that characterize the initiated purchase transaction (e.g., as set forth in portions of request data 608 and transaction data 612) are consistent with temporal data, parameter values, and payment data maintained within the one or more locally maintained pre-authorization tokens.

For example, as illustrated in FIG. 6A, local authorization module 614 may determine that device-specific cryptogram 606 is matches a local device-specific cryptogram 618 included within pre-authorization token 616. Based on the determined consistency between device-specific cryptogram 606 and local device-specific cryptogram 618, local authorization module 614 may establish that client device 102 is a counterparty to the pre-authorized purchase transaction represented by pre-authorization token 616. As illustrated in FIG. 6A, local authorization module 614 may perform additional operations that identify and access, within pre-authorization token 616, temporal data 620, parameter data 622, and payment data 624, which characterize the pre-authorized purchase transaction represented by pre-authorization token 616 and/or the validity of pre-authorization token 616.

For instance, temporal data 620 may specify a period of temporal validity for pre-authorization token 616 (e.g., Apr. 9, 2018, between 8:45 a.m. and 9:00 a.m.), and parameter data 622 may include values of one or more transaction parameters that characterize the pre-authorized purchase transaction represented by pre-authorization token 616 (e.g., a pre-authorized transaction value of $11.00, UPCs assigned to pre-authorized products that include, among other things, oatmeal and coffee). In further instances, payment data 624 may include an identifier of, or tokenized account data associated with, the payment instrument selected to fund the pre-authorized purchase transaction represented by pre-authorization token 616, e.g., the Visa™ credit card account. The disclosed embodiments are, however, not limited to these examples of temporal, parameter, or payment data, and in other instances, pre-authorization token 616 may maintain any additional or alternate temporal, parameter, or payment data capable of characterizing the pre-authorized purchase transaction or the validity of pre-authorization token 616.

By way of example, and based on portions of transaction data 612, local authorization module 614 may determine that client device 102 initiated the purchase transaction with terminal device 122 at 8:53 a.m. on Apr. 9, 2019, which falls within the period of temporal validity that characterizes pre-authorization token 616 (e.g., Apr. 9, 2018, between 8:45 a.m. and 9:00 a.m.). Based on the disposition of the initiated transaction time and date within the period of temporal validity for pre-authorization token 616, local authorization module 614 may confirm that pre-authorization token 616 remains valid and available to support the local authorization of the initiated purchase transaction using any of the processes described herein.

Further, and based on additional portions of transaction data 612, local authorization module 614 may determine that the initiated transaction value of $10.25 is less than the pre-authorized transaction value of $11.00, and additionally, or alternatively, that identifiers of the products involved in the initiated purchase transaction, e.g., the UPCs assigned to the oatmeal and the coffee, are consistent with the identifiers of the products involved in the pre-authorized purchase transaction. In additional instances, and based on portions of request data 608, local authorization module 614 may determine that the payment instrument selected to fund the initiated purchase transaction, e.g., the Visa™ credit card, is consistent with the payment instrument that funded the pre-authorized transaction represented by pre-authorization token 616.

In some examples, based on the established validity of pre-authorization token 616, and the determined consistency between the parameter and payment data that characterize the initiated purchase transaction and the pre-authorized purchase transaction (e.g., as represented by pre-authorized token 616), local authorization module 614 may elect to authorize locally the initiated purchase transaction based on pre-authorization token 616, and may perform operations that generate a unique authorization code 626 indicate of the now-authorized purchase transaction. As illustrated in FIG. 6A, local authorization module 614 may provide authorization code 626 and transaction data 612 as inputs to a transaction management module 628, which may link together and store authorization code 626 and transaction data 612 within a corresponding portion of transaction log 126B, e.g., within a discrete data records of authorized transaction data 630.

Further, although not illustrated in FIG. 6A, transaction management module 628 may also provide authorization code 626 and transaction data 612, which confirm the local authorization of the purchase transaction initiated by client device 102, as inputs to an interface element generation module of terminal device 122. The interface element generation module may process authorization code 626 and transaction data 612 to generate one or more interface elements, and may provide the generated interface elements to display unit 127A, which may present the interface elements within a graphical user interface (GUI). In some instances, the presented interface elements may identify authorization code 626 and confirm the local authorization of the purchase transaction initiated by client device 102, e.g., the purchase of oatmeal and coffee in the amount of $10.25 from the Starbucks™ coffee shop located in Washington, D.C., at 2130 H Street N.W.

Referring back to FIG. 6A, transaction management module 628 may also package authorization code 626 and additionally, or alternatively, portions of transaction data 612 and request data 608 (e.g., the payment data), into confirmation data 638 indicative of the local authorization of the purchase transaction by terminal device 122 (e.g., based on pre-authorization token 616). Transaction management module 628 may provide confirmation data 638 as an input to a routing module 640, which may access a unique network address of payment network system 150 (e.g., an IP or MAC address maintained within a locally accessible memory) and perform operations that cause terminal device 122 to transmit confirmation data 638 across network 120 to the unique network address of payment network system 150, e.g., directly or through one or more intermediary computer systems, such as a computing system operated by an acquirer associated with terminal device 122 (not illustrated in FIG. 6A).

Figure 6B:
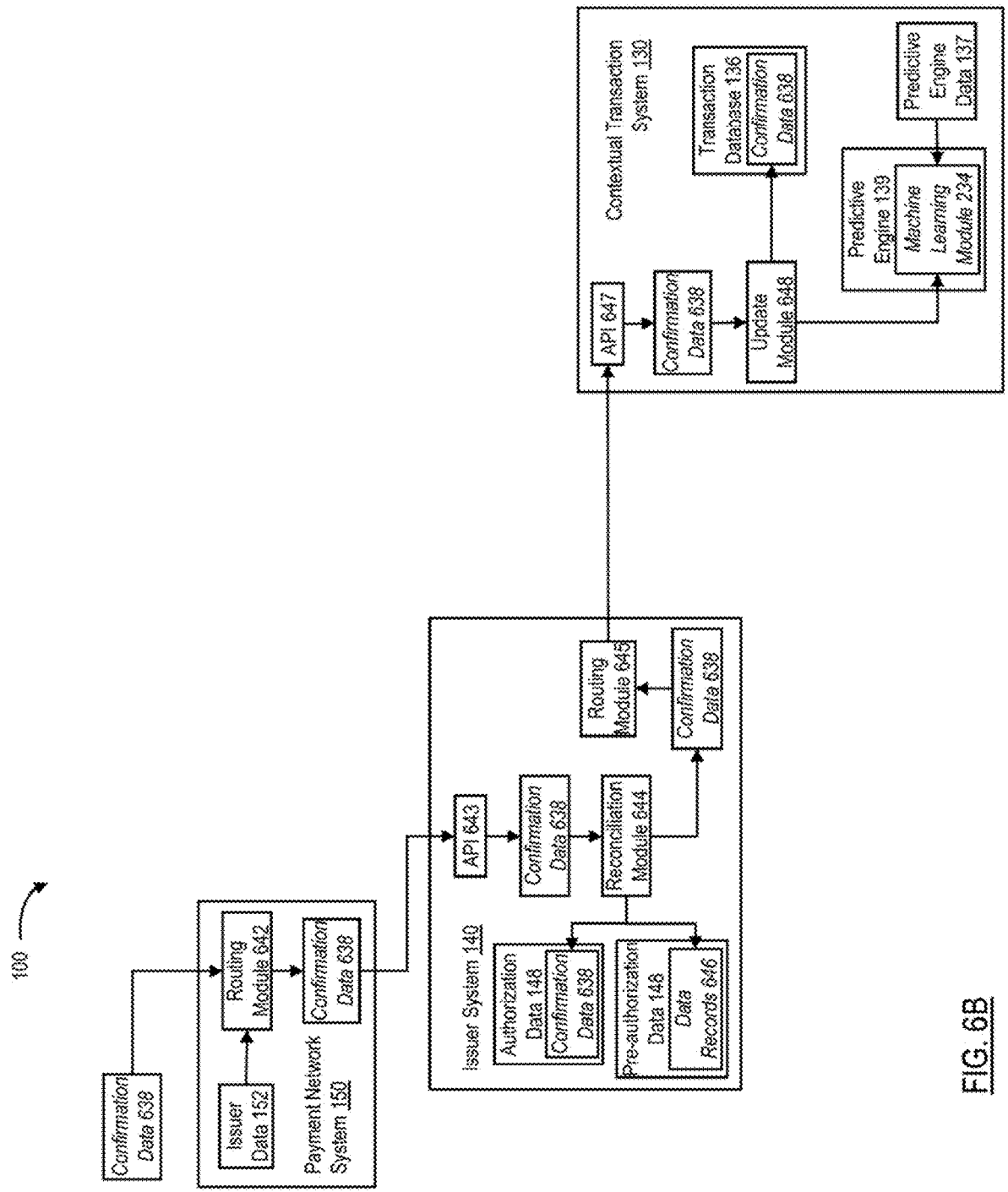

Referring to FIG. 6B, payment network system 150 may receive confirmation data 638 from terminal device 122 (e.g., through a corresponding programmatic interface or API) and in some instances, may perform operations that store confirmation data 638 within a locally accessible memory. A routing module 642 of payment network system 150 may access issuer data 152 and extract a unique network address of issuer system 140 (e.g., an IP or MAC address), and may perform operations that cause payment network system 150 to transmit confirmation data 638 across network 120 to issuer system 140.

In some instances, a programmatic interface established and maintained by issuer system 140, such as an application programming interface (API) 643, may receive confirmation data 638 from payment network system 150, and may route confirmation data 638 to a reconciliation module 644 of issuer system 140. Reconciliation module 644 may, for example, perform operations that store all or a portion of confirmation data 638 (e.g., authorization code 626 and portions of request data 608 and/or transaction data 412) within one or more data records of authorization data 148, which identify and characterize corresponding purchase transactions authorized in accordance with any of the exemplary processes described herein. In some instances, reconciliation module 644 may also access pre-authorization data 146, and perform operations that identify, and delete, one or more data records 646 that characterize the prior pre-authorization of the now-authorized purchase transaction, e.g., the $10.25 purchase of coffee and oatmeal from the Starbucks™ coffee shop on Apr. 9, 2018, at 8:53 a.m. Further, reconciliation module 644 may also provide confirmation data 638 as an input to routing module 645, which may access a unique network address of contextual transaction system 130 (e.g., an assigned IP or MAC address), and may perform operations that cause issuer system 140 to transmit confirmation data 638 across network 120 to contextual transaction system 130.

A programmatic interface established and maintained by contextual transaction system 130, such as API 647, may receive confirmation data 638 from issuer system 140 and route confirmation data 638 to an update module 648 of contextual transaction system 130. In some instances, update module 648 may process confirmation data 638 and perform operations that store authorization code 626 and portions of request data 608 and transaction data 612 within one or more data records of transaction database 136, e.g., to update transaction database 136 to reflect the newly authorized purchase of oatmeal and coffee in the amount of $10.25 from the Starbucks™ coffee shop located in Washington, D.C., at 2130 H Street N.W., on Apr. 9, 2018, at 8:52 a.m. Further, although not illustrated in FIG. 6B, contextual transaction system 130 may receive additional or alternate data that confirms the newly authorized purchase transaction from terminal device 122, or from client device 102, across network 120 through a corresponding programmatic interface.

Update module 648 may also provide confirmation data 638 and as input to machine learning module 234 of predictive engine 139. In some instances, machine learning module 234 may access predictive engine data 137 (e.g., as maintained by contextual transaction system 130 in one or more tangible, non-transitory memories), and may perform operations that train or adaptively improve one or more of the machine learning algorithms (or processes), clustering algorithms, collaborative filtering algorithms, or adaptive processes described herein.

In some examples, described herein in reference to FIGS. 6A and 6B, the data records of authorized transaction data 630 (e.g., as maintained within transaction log 126B of terminal device 122) each represent a corresponding purchased transaction initiated at terminal device 122 by a corresponding client device, and authorized by terminal device 122 in accordance with any of the exemplary local authorization processes described herein. Although not illustrated in FIGS. 6A and 6B, a settlement module of terminal device 122 may access authorized transaction data 630, and may perform operations that submit the data records of authorized transaction data 630 to payment network system 150 for batch-based reconciliation, settlement, and clearance at the expiration of a predetermined temporal interval, such as the end of a calendar day, a business day, or a business shift, or at a predetermined or regular date or time.

Further, and as described above in reference to FIGS. 6A and 6B, local authorization module 614 may elect to authorize locally the initiated purchase transaction based on pre-authorization token 616 based on the established validity of pre-authorization token 616, and the on the determined consistency between the parameter and payment data that characterize the initiated purchase transaction and the pre-authorized purchase transaction. In other examples, not illustrated in FIG. 6A, local authorization module 614 may determine that pre-authorized token 616 is invalid and unable to authorize locally the initiated purchase transaction (e.g., the initiated transaction time or date falls outside the period of temporal validity for pre-authorized token 616), or may detect an inconsistency among the parameter or payment data that characterizes the initiated purchase transaction and the pre-authorized purchase transaction (e.g., as represented by pre-authorized token 616).

Based on the determined invalidity of pre-authorized token 616, or on the detected inconsistency within the parameter data or the payment data, local authorization module 614 may decline to authorize the initiated purchase transaction based on locally maintained pre-authorization token 616. In some examples, terminal device 122 may perform any of the exemplary processes described herein to generate and transmit a request for an online authorization of the initiated purchase transaction (e.g., based on processes performed by issuer system 140 or tokenization system 160) across network 120 to payment network system 150.

Figure 7:
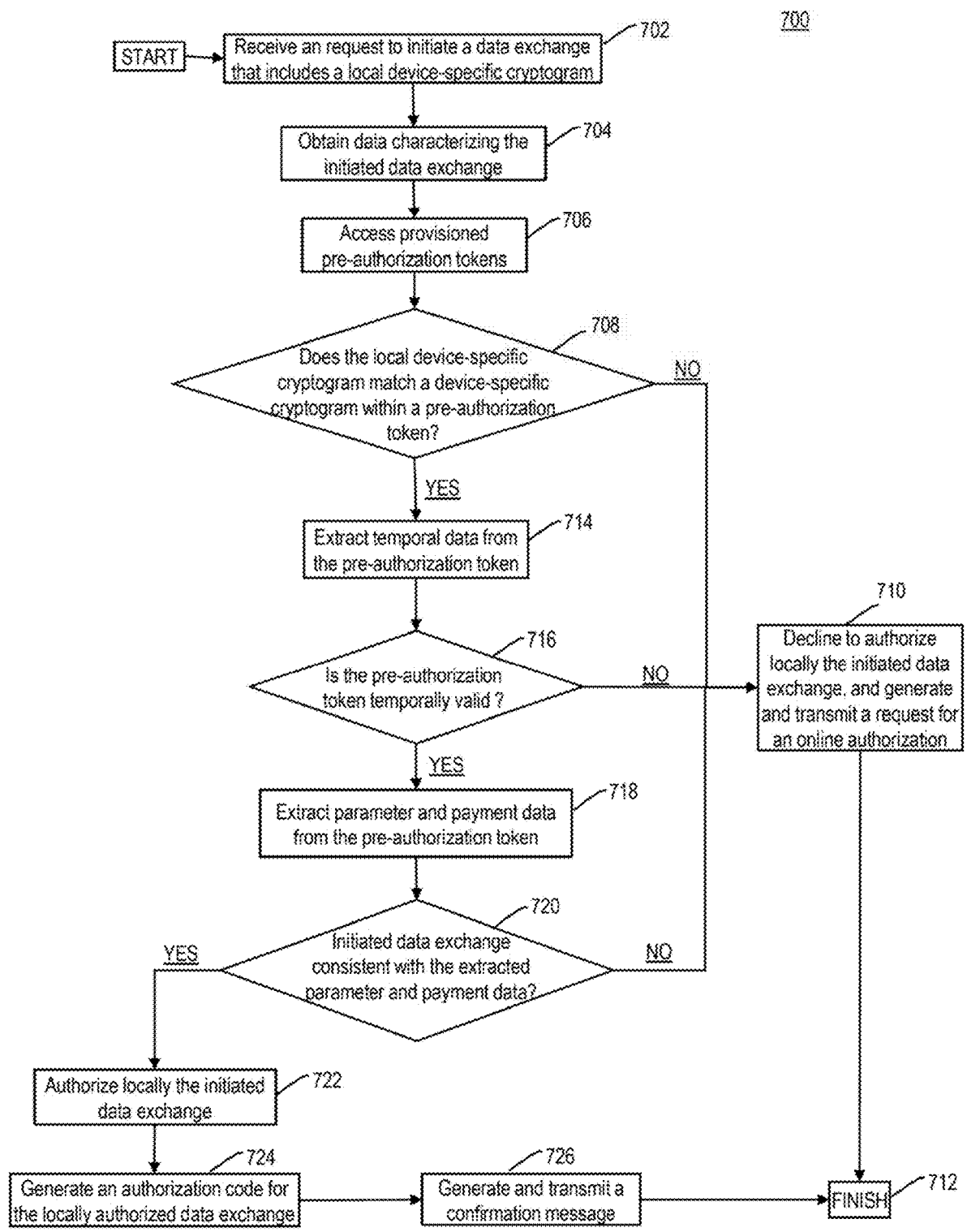
FIG. 7 is a flowchart of an exemplary process for authorizing initiated exchanges of data locally and in real-time using device-specific tokenized data having limited temporal validity, consistent with the disclosed embodiments.

FIG. 7 is a flowchart of an exemplary process 700 for authorizing initiated exchanges of data locally and in real-time using device-specific tokenized data having limited temporal validity, in accordance with disclosed embodiments. In some examples, issuer system 140 may perform the steps of exemplary process 700, which include, among other things, receiving a request to authorize a purchase transaction initiated at a terminal device, such as terminal device 122 of FIG. 1, by a corresponding client device, such as client device 102 of FIG. 1. As described herein, the received authorization request may include payment data, that characterizes a payment instrument selected to fund the initiated purchase transaction, and a local device-specific cryptogram that uniquely identifies client device 102.

Terminal device 122 may maintain elements of the device-specific tokenized data, such as pre-authorization tokens, within a local memory, and each of the pre-authorization tokens may be representative of a corresponding pre-authorized purchase transaction, and further, may include a device-specific cryptogram that uniquely identifies a client device involved in the corresponding pre-authorized purchase transaction. The steps of exemplary process 700 may also include, among other things, determining that a device-specific cryptogram included within a corresponding one of the pre-authorization tokens is consistent with the local device-specific cryptogram, and performing operations that authorize locally the initiated purchase transaction based on the corresponding pre-authorization token.

Referring to FIG. 7, terminal device 122 may receive a request to initiate a data exchange from a client device, such as client device 102, across a corresponding secure communications channel, such as direct communications channel 120A (e.g., in step 702). In some examples, terminal device 122 may be operated by a corresponding merchant, such as merchant 121, and the initiated data exchange may correspond to a purchase transaction initiated by client device 102 and involving a product or service offered for sale by merchant 121.

In some examples, the received request may include payment data identifying or characterizing a payment instrument available to fund the initiated purchase transaction (e.g., an identifier or, or tokenized account data associated with, the payment instrument). Further, the request may also include a local device-specific cryptogram that uniquely identified client device 102 within environment 100. Examples of the device-specific cryptogram include, but are not limited to, a secure element hash value, a multi-use digital token consistent with a host card emulation (HCE) protocol, or another hash value, code, or cryptogram capable of uniquely identifying client device 102 in accordance with an appropriate payment protocol, such as an EMV payment protocol.

Further, terminal device 122 may also obtain elements of data that identify and characterize the initiated data exchange, e.g., the initiated purchase transaction (e.g., in step 704). For example, the obtained data elements may include transaction data received from a computing system associated with or operated by merchant 121, such as a cash register, and examples of the received transaction data include, but are not limited to, a corresponding transaction value, a corresponding transaction time or date, and an identifier of the product or products involved in the initiated purchase transaction.

In some examples, terminal device 122 may perform operations that access a local memory that maintains one or more elements of tokenized data, such as pre-authorization tokens, generated and provisioned to terminal device 122 using any of the exemplary processes described herein (e.g., in step 706). In some instances, each of the pre-authorization tokens may reflect, and correspond to, a pre-authorized purchase transaction capable of initiation between terminal device 122 and a corresponding client device, such as, but not limited to, client device 102. As described herein, each of the pre-authorization tokens may be specific to a corresponding one of the client devices, and may include a device-specific cryptogram that uniquely identifies the corresponding client device within environment 100.

In some examples, each of the pre-authorization tokens may also be associated with, and characterized by, a period of temporal validity, and may include temporal data that specifies the period of temporal validity. For instance, the period of temporal validity for each pre-authorization token may include, but is not limited to, a range of times or dates during which a client device is expected to initiate the corresponding pre-authorized purchase transaction. Further, and as described herein, each of the pre-authorization tokens may include values of one or more transaction parameters that characterize the corresponding pre-authorized purchase transaction (e.g., a pre-authorized transaction value, pre-authorized products or services, etc.) and payment data that identifies the payment instrument selected to fund the corresponding pre-authorized purchase transaction (e.g., tokenized account data, etc.).

Referring back to FIG. 7, terminal device 122 may perform any of the exemplary processes described herein to determine whether the device-specific cryptogram (e.g., as received from client device 102) matches the device-specific cryptogram included within one, or more, of the pre-authorization tokens (e.g., in step 708). If, for example, terminal device 122 were to determine that local device-specific cryptogram fails to match any of the device-specific cryptograms included within the pre-authorization tokens (e.g., step 708; NO), terminal device 122 may establish that client device 102 is not a counterparty to any of the pre-authorized purchase transactions involving terminal device 122, and may decline to authorize the initiated purchase transaction locally based on the pre-authorization tokens. In some instances, terminal device 122 may generate and transmit a request for an online authorization of the initiated purchase transaction (e.g., based on processes performed by issuer system 140 or tokenization system 160) across network 120 to payment network system 150 (e.g., in step 710). Exemplary process 700 is then complete in step 712.

Alternatively, if terminal device 122 were to determine that the local device-specific cryptogram matches the device-specific cryptogram included within a corresponding one of the pre-authorization tokens (e.g., step 708; YES), terminal device 122 may extract, from the corresponding pre-authorization token, temporal data characterizing a period of temporal validity of the corresponding pre-authorization token (e.g., in step 714). Terminal device 122 may perform any of the exemplary processes described herein to determine whether the transaction date or time of the initiated purchase transaction falls within the period of temporal validity of the corresponding pre-authorization token, and as such, to determine whether the corresponding pre-authorization token remains temporally valid for use in the local authorization of the initiated purchase transaction (e.g., in step 716).

For example, if terminal device 122 were to determine that transaction date or time falls outside the period of temporal validity, and as such, that the corresponding pre-authorization token is invalid (e.g., step 716; NO), terminal device 122 may decline to authorize locally the initiated purchase transaction. Exemplary process 700 may pass back to step 710, and terminal device 122 may perform any of the exemplary processes described herein to initiate an online authorization of the initiated purchase transaction.

Alternatively, if terminal device 122 were to determine that transaction date or time falls within the period of temporal validity, and as such, that the corresponding pre-authorization token remains invalid (e.g., step 716; YES), terminal device 122 may extract, from the corresponding pre-authorization token, parameter data specifying the transaction parameter values that characterize the corresponding pre-authorized purchase transaction, along with payment data that identifies the payment instrument selected to fund the corresponding pre-authorized purchase transaction (e.g., in step 718). In some examples, terminal device 122 may perform any of the exemplary processes described herein to determine whether the parameter and payment data that characterizes the initiated purchase transaction are consistent with the parameter and payment data extracted from the corresponding pre-authorization token (e.g., in step 720).

In one instance, if terminal device 122 were to detect one or more inconsistencies between the parameter and payment data that characterizes the initiated purchase transaction and the parameter and payment data extracted from the corresponding pre-authorization (e.g., step 720; NO), terminal device 122 may decline to authorize locally the initiated purchase transaction. Exemplary process 700 may pass back to step 710, and terminal device 122 may perform any of the exemplary processes described herein to initiate an online authorization of the initiated purchase transaction.

Alternatively, if terminal device 122 were to determine that the parameter and payment data characterizing the initiated purchase transaction are consistent with corresponding elements of the parameter and payment data extracted from the pre-authorization token (e.g., step 720; YES), terminal device 122 may elect to authorize locally the initiated purchase transaction based on the corresponding pre-authorization token (e.g., in step 722), and may generate a unique authorization code indicative of the now-authorized purchase transaction (e.g., in step 724). Further, although not depicted in FIG. 7, terminal device 122 may perform additional operations that store the generated authorization code and the transaction data characterizing the now-authorized purchase transaction within a locally accessible memory (e.g., within a corresponding portion of transaction log 126B), and that generate and present a representation of the locally authorized purchase transaction within a corresponding graphical user interface.

Further, in some examples, terminal device 122 may perform additional operations that package the generated authorization code and additionally, or alternatively, portions of the transaction data and the received request into confirmation data indicative of the local authorization of the purchase transaction by terminal device 122, and transmit the generated confirmation data across network 120 to a unique network address of payment network system 150, e.g., directly or through one or more intermediary computer systems, such as a computing system operator by an acquirer associated with terminal device 122 (e.g., in step 726). Exemplary process 700 is complete in step 712.

IV. Exemplary Computer-Implemented Processes for Triggering a Pre-Authorization of Pre-staged Exchanges in Real Time Using Provisioned Digital Tokens In some exemplary embodiments, contextual transaction system 130 may perform any of the exemplary processes described herein to identify potential counterparties to one or more expected exchanges of data capable of initiation by client devices during corresponding future temporal intervals, and to predict values of parameters that characterize each of the expected data exchanges. For example, the expected data exchanges, as identified and characterized by contextual transaction system 130, may correspond to a sequence of purchase transactions capable of initiation by the client devices during corresponding and successive temporal intervals. In one instance, as described herein, each of expected purchase transaction may be independent of the other expected purchase transactions, and an initiation of a corresponding one of the expected purchase transactions by the client devices need not be conditioned on an initiation and successfully authorization of any of the other expected purchase transactions.

In other instances, however, the initiation of one or more of the expected data exchanges may be conditioned upon a prior initiation, and successful authorization, of an additional one of the expected data exchanges. For example, and as described above, contextual transaction system 130 may perform any of the exemplary processes described herein to identify and characterize an expected occurrence of a $15.00 purchase of a bowling shoe rental from a Lucky Strike™ bowling alley in Washington, D.C. on Friday, Apr. 13, 2018, between 9:00 p.m. at 9:15 p.m. and to identify and characterize expected occurrences of additional purchases from the Lucky Strike™ bowling alley of a first round of concessions (e.g., a purchase of soft drinks and cocktails having an expected transaction value of $22.50) between five to eight minutes after the purchase of the bowling shoe rental, and of a second round of concessions (e.g., a purchase of pizza having an expected transaction value of $10.00) between fifteen and eighteen minutes after the purchase of the bowling shoe rental.

For example, the expected purchase of the bowling shoe rental from the Lucky Strike™ bowling alley on Friday, Apr. 13, 2018, between 9:00 p.m. at 9:15 p.m., may be characterized as a "parent" purchase transaction. Further, and in some examples, each of the successive purchase transactions (e.g., the purchase of the first round of concessions between five to eight minutes after the purchase of the bowling shoe rental, and the purchase of the second round of concessions between fifteen and eighteen minutes after the purchase of the bowling shoe rental) may be characterized as "supplemental" purchase transactions, as the initiation of the each of the supplemental purchase transactions occurs subsequent to, and is conditioned upon, an initiation or a successful authorization of the parent purchase transaction. As described below in reference to FIG. 8, contextual transaction system 130 may perform any of the exemplary processes described herein to identify and characterize an expected occurrence of a parent purchase transaction and one or more supplemental purchase transactions (e.g., to "pre-stage" the parent and supplemental purchase transaction), to request a pre-authorization of the parent purchase transaction in accordance with corresponding expected parameter values, and further, to condition a pre-authorization of each of the supplemental purchase transactions on the initiation or successful authorization of the parent purchase transaction.

Figure 8:
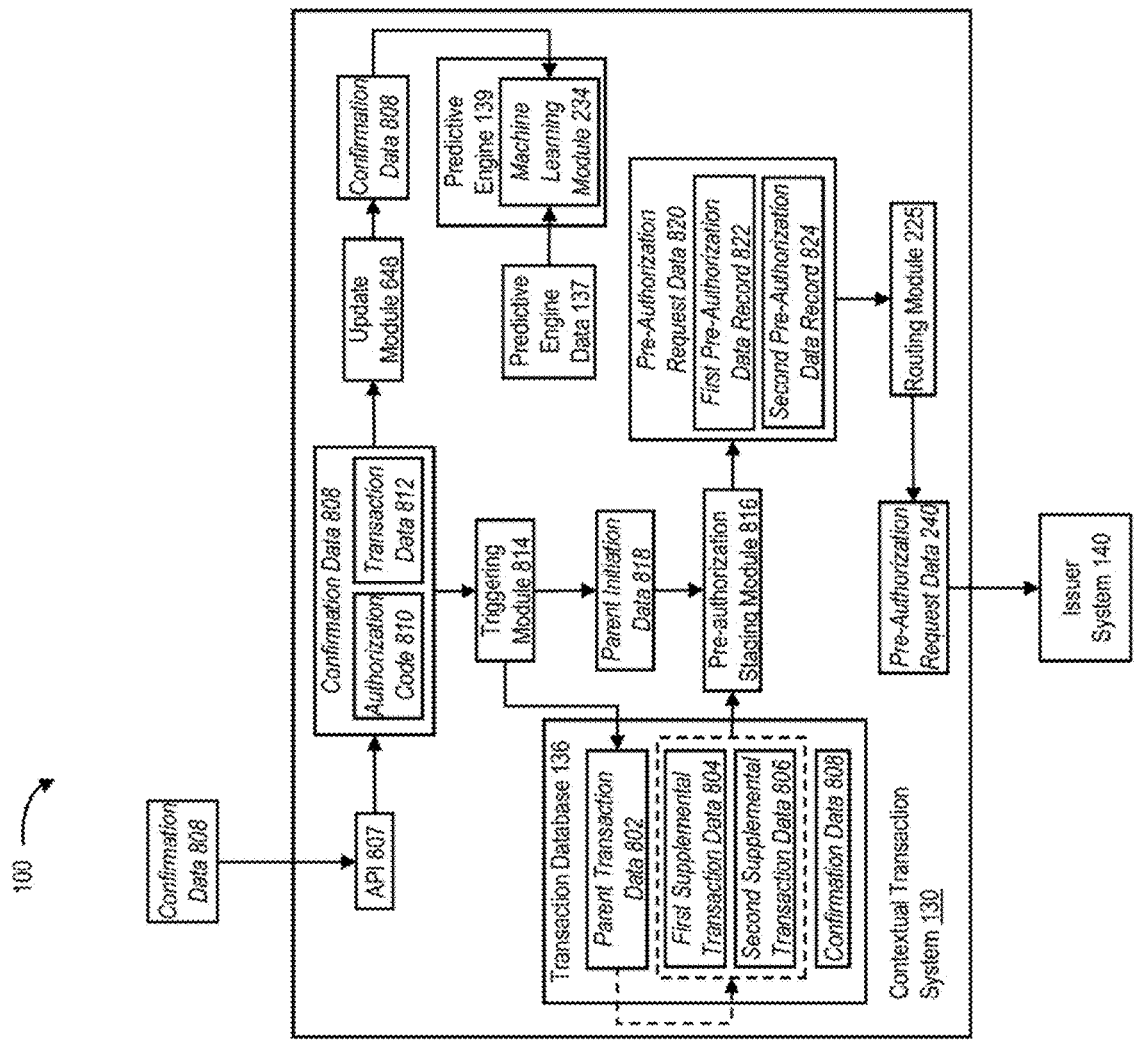
FIG. 8 is a diagram illustrating portions of an exemplary computing environment, consistent with the disclosed embodiments.

Referring to FIG. 8, contextual transaction system 130 may perform any of the exemplary processes described herein to identify a potential counterparty to a parent exchange of data capable of initiation by a client device, such as client device 102, during a future temporal interval, and to predict values of parameters that characterize the parent data exchange. In some instances, and as described herein, the parent data exchange (e.g., a parent purchase transaction) may correspond to the purchase of the bowling shoe rental from the Lucky Strike™ bowling alley in Washington, D.C., using client device 102.

For example, contextual transaction system 130 may perform any of the exemplary processes described herein to identify the counterparty to the parent purchase transaction (e.g., terminal device 122 operated by the Lucky Strike™ bowling alley), parameter data specifying the expected parameter values that characterize the expected occurrence of the parent purchase transaction (e.g., the expected transaction value of $15.00, the expected bowling shoe rental), temporal data characterizing a temporal interval during which client device 102 is expected to initiate the parent purchase transaction (e.g., Friday, Apr. 13, 2018, between 9:00 p.m. at 9:15 p.m.), and payment data identifying a payment instrument expected to fund the parent purchase transaction (e.g., an identifier of, or tokenized data associated with, the Visa™ credit card account). Further, contextual transaction system 130 may perform additional operations that store, within a corresponding portion of transaction database 136, parent transaction data 802 that includes device identifier 206B (e.g., an IP or MAC address assigned to client device 102) and the counterparty, parameter, temporal, and payment data that collectively characterize the parent purchase transaction.

Contextual transaction system 130 may also perform any of the exemplary processes described herein to identify and characterize an expected occurrence of one or more supplemental exchanges of data capable of initiation by client device 102 during the future temporal intervals. In some examples, as described herein, each of the supplemental data exchanges may be associated with a corresponding parent data exchange, and an expected initiation of each of the supplemental data exchanges may be conditioned upon a detected initiation, or a successful authorization of, the corresponding parent data exchange.

For example, contextual transaction system 130 may implement any of the exemplary location-based or predictive processes described herein (or combinations thereof) to generate, for each of the supplemental purchase transactions, counterparty data that identifies the corresponding counterparty to the supplemental purchase transaction, parameter data specifying expected values of one or more transaction parameters that characterize the supplemental purchase transaction, and payment data that identifies and characterizes a payment instrument that funds the supplemental purchase transaction.

Further, and based on the performance of any of the exemplary location-based or predictive processes described herein (or combinations thereof), contextual transaction system 130 may generate temporal data that characterizes an expected initiation time or date of each of the supplemental data exchanges. In some exemplary embodiments, the temporal data for each of the supplemental data exchanges may not identify a particular time or date, or a particular range of times or dates. Instead, the temporal data may specify a temporal interval relative to a detected initiation time of the corresponding parent data exchange (e.g., the temporal interval includes a temporal boundary specified relative to the detected initiation time).

By predicting the expected initiation of each supplemental data exchanges relative to the initiation of the corresponding parent data exchange, one or more of the disclosed exemplary embodiments may condition a pre-authorization of each of the supplemental data exchanges on the detected initiation and successful authorization of the corresponding parent data exchange, and allocate computational resources to the generation of the pre-authorization tokens representative of the pre-authorized supplemental data exchanges in response to the occurrence of the corresponding parent data exchange. Certain of these exemplary processes, which stage a pre-authorization of primary and supplemental data exchanges, can reduce an amount of computation effort and resources allocated by contextual transaction system 130, issuer system 140, or tokenization system 160 which reducing instances of fraudulent activity during the pre-authorization and authorization process, can increase a likelihood that pre-authorized fata exchanges will be initiated by corresponding counterparties, and can be implemented in addition to, or as alternate to, certain of the conventional online and offline authorization processes described herein.

Referring to back to FIG. 8, contextual transaction system 130 may perform of any of the exemplary location-based or predictive processes described herein to identify and characterize and expected occurrence of: (i) a first supplemental data exchange that includes an expected purchase of a first round of concessions from the Lucky Strike™ bowling alley between five to eight minutes after the purchase of the bowling shoe rental; and (ii) a second supplemental data exchange that includes an expected purchase of a second round of concessions between fifteen and eighteen minutes after the purchase of the bowling shoe rental. As described herein, contextual transaction system 130 may generate counterparty data that identifies the counterparty to each of the first and second supplemental data exchanges (e.g., terminal device 122 operated by the Lucky Strike™ bowling alley).

Additionally, contextual transaction system 130 may perform any of the exemplary processes described herein to generate parameter data specifying the expected parameter values that characterize the expected occurrences of the first and second supplemental data exchanges, and payment data that identifies a payment instrument expected to fund corresponding ones of the first and second supplemental data exchanges. For instance, the parameter data for the first supplemental data exchange may identify an expected transaction value of $22.50 and expected products that include one or more soft drinks or cocktails (e.g., the UPCs assigned to the soft drinks or the cocktails), and the parameter data for the second supplemental data exchange may identify an expected transaction value of $10.00 and expected products (e.g., the UPCs assigned to the pizza). Further, in some instances, the payment data for the first and second supplemental data exchanges may include an identifier of, or tokenized account data associated with, a Visa™ credit card account held by user 101.

Further, and using any of the exemplary processes described herein, contextual transaction system 130 may perform additional operations that generate temporal data characterizing the expected initiation date or time for each of the first and second supplemental data exchanges. For instance, expected initiation of the first and second supplemental data exchanges (e.g., the purchases of the first and second round of concessions from the Lucky Strike™ bowling alley) may be conditioned upon, and may occurs subsequent to, the initiation and successful authorization of the corresponding parent data exchange (e.g., the purchase of the bowling shoe rental from the Lucky Strike™ bowling alley).

In some examples, the temporal data generated for the first supplemental data exchange may identify the corresponding parent data exchange, and the corresponding temporal window during which client device 102 is expected to initiate the first supplemental data exchange, e.g., five to eight minutes after the initiation of the parent data exchange. Further, and by way of example, the temporal data generated for the second supplemental data exchange may also identify the corresponding parent data exchange, and the corresponding temporal window during which client device 102 is expected to initiate the second supplemental data exchange, e.g., fifteen to eighteen minutes after the initiation of the parent data exchange Referring back to FIG. 8, contextual transaction system 130 may perform additional operations that store, within a corresponding portion of transaction database 136, first supplemental transaction data 804 that includes device identifier 206B (e.g., an IP or MAC address assigned to client device 102) and the counterparty, parameter, temporal, and payment data that collectively characterize the first supplemental data exchange, e.g., the purchase of first round of concessions from the Lucky Strike™ bowling alley. Contextual transaction system 130 may also perform operations that store, within a corresponding portion of transaction database 136, second supplemental transaction data 806 that includes device identifier and the counterparty, parameter, temporal, and payment data that collectively characterize the first supplemental data exchange, e.g., the purchase of second round of concessions from the Lucky Strike™ bowling alley. Further, in some examples, contextual transaction system 130 may perform further operations that link together, or associate, parent transaction data 802 and each of first supplemental transaction data 804 and second supplemental transaction data 806 within transaction database 136.

In some exemplary embodiments, contextual transaction system 130 may perform any of the exemplary processes described herein to request a pre-authorization of the expected occurrence of the parent data exchange, e.g., the expected $15.00 purchase of the bowling shoe rental from the Lucky Strike™ bowling alley in Washington, D.C. on Friday, Apr. 13, 2018, between 9:00 p.m. at 9:15 p.m. For example, and not illustrated in FIG. 8, pre-authorization request module 224 of contextual transaction system 130 may access transaction database 136, and package all, or portions, of parent transaction data 802 into corresponding elements of pre-authorization request data, which contextual transaction system 130 may transmit across network 120 to issuer system 140 using any appropriate communications protocols.

In some instances, issuer system 140 may perform any of the exemplary processes described herein, either alone or in conjunction with payment network system 150 or tokenization system 160, to pre-authorize the parent data exchange in accordance with the expected parameter values, to generate a pre-authorization token that represents the pre-authorized parent data exchange, and to provision that pre-authorization token to a terminal device operated by the corresponding counterparty, e.g., terminal device 122 operated by the Lucky Strike™ bowling alley. Further, and using any of the exemplary processes described herein, client device 102 may initiate the parent data exchange at terminal device 122, which may perform operations that authorize locally the initiated purchase transaction (e.g., the $15.00 purchase of the bowling shoe rental) based on the provisioned pre-authorization token, and that generate and transmit data confirming the now-authorized purchase transaction to payment network system 150. In some instances, payment network system 150 may route the confirmation data to issuer system 140, which may perform any of the exemplary processes described herein to reconcile the now-authorized purchase transaction and forward the confirmation data to contextual transaction system 130 within one or more digital signals.

Referring back to FIG. 8, a programmatic interface established and maintained by contextual transaction system 130, such as an application programming interface (API) 807, may receive confirmation data 808 from issuer system 140. In some instances, confirmation data 808 may include a unique authorization code 810 indicative of the authorization of the parent data exchange (e.g., the purchase of the bowling shoe rental from the Lucky Strike™ bowling alley), and transaction data 812 that characterizes the now-authorized purchase of the bowling shoe rental from the Lucky Strike™ bowling alley. For example, transaction data 812 may include, but is not limited to, the authorized transaction value of $15.00, a transaction initiation date and time of Apr. 13, 2018, at 9:09 p.m., a UPC assigned to the purchase bowling shoe rental, and an identifier or, or tokenized account data associated with, the Visa™ credit card that funded the transaction.

API 807 may route confirmation data 808 to update module 648, which may perform operations that store authorization code 810 and portions of request data 608 and transaction data 812 within one or more data records of transaction database 136, e.g., to update transaction database 136 to reflect the now-authorized $15.0 purchase of the bowling shoe rental from the Lucky Strike™ bowling alley in Washington, D.C. on Friday, Apr. 13, 2018, at 9:09 p.m. Update module 644 may also provide confirmation data 808 and as input to machine learning module 234 of predictive engine 139. In some instances, machine learning module 324 may access elements locally stored machine learning data, (e.g., as maintained within predictive engine data 137, and based on the machine learning data, may perform operations that train or adaptively improve one or more of the machine learning algorithms (or processes), clustering algorithms, collaborative filtering algorithms, or adaptive processes in accordance with portions of confirmation data 808.

In further instances, API 807 may also route confirmation data 808 to a triggering module 814 of contextual transaction system 130, which may access transaction database 136, and based on a comparison of portions of transaction data 812 (e.g., as included within confirmation data 808) and parent transaction data 802 (e.g., as maintained within transaction database 136), determine whether the now-authorized purchase of the bowling shoe rental from the Lucky Strike™ bowling alley corresponds to the parent data exchange described herein. For example, if triggering module 814 were to determine that the now-authorized purchase transaction differs from, or is inconsistent with, the parent data exchange characterized by parent transaction data 802, contextual transaction system 130 may decline to request a pre-authorization of either of the first or second supplemental data exchanges linked to the parent data exchange characterized by parent transaction data 802. In some instances, triggering module 814 may discard confirmation data 808, and await additional data confirming the initiation and successful authorization of additional or alternate exchanges of data or purchase transactions.

If, however, triggering module 814 were to determine that the now-authorized purchase transaction is consistent with the parent data exchange characterized by parent transaction data 802, triggering module 814 may perform operations that identify and extract certain data records from transaction database 136 that characterize the first and second supplemental data exchanges linked to, and associated with, the initiated and successfully authorized parent data exchange. For example, and as described herein, the first and second supplemental data exchanges may include, respectively, to the subsequent purchase of corresponding ones of a first and second round of concessions the Lucky Strike™ bowling alley, and triggering module 814 may identify and extract first supplemental transaction data 804 and second supplemental transaction data 806 from transaction database 136.

Triggering module 814 may provide the extracted first supplemental transaction data 804 and second supplemental transaction data 806 as inputs to a pre-authorization staging module 816, along with parent initiation data 818 that characterizes the initiation time and date of the now-authorized parent data exchange (e.g., the 9:09 p.m. initiation time of the purchase of the bowling shoe rental from the Lucky Strike™ bowling alley). In some examples, and based on corresponding portions of first supplemental transaction data 804 and second supplemental transaction data 806, pre-authorization staging module 816 may perform any of the exemplary processes described herein (e.g., as described above in reference to FIGS. 2A and 2B) to generate data 820 requesting a pre-authorization of each of the first and second supplemental data exchanges.

For example, as illustrated in FIG. 8, pre-authorization staging module 816 may perform operations that establish, within pre-authorization request data 820, a first pre-authorization data record 822 that corresponds to the requested pre-authorization of the first supplemental data exchange between client device 102 and terminal device 122 (e.g., the expected purchase of soft drinks and cocktails from the Lucky Strike™ bowling alley having an expected transaction value of $22.50 between five to eight minutes after the purchase of the bowling shoe rental), and a second a first pre-authorization data record 824 that corresponds to the requested pre-authorization of the second supplemental data exchange between client device 102 and terminal device 122 (e.g., the purchase of pizza having an expected transaction value of $10.00 between fifteen and eighteen minutes after the purchase of the bowling shoe rental). Further, pre-authorization staging module 816 may also incorporate, as elements of pre-authorization request data 820, user identifier 206A (e.g., the login credential that uniquely identifies user 101) and device identifier 206B (e.g., the IP or MAC address assigned to client device 102).

As described herein (and not illustrated in FIG. 8), each of first pre-authorization data record 822 and second pre-authorization data record 824 may include discrete elements of counterparty data, parameter data, payment data, and temporal data that identify and characterize the expected occurrences of respective ones of the first and second supplemental data exchanges. For example, and within each of first pre-authorization data record 822 and second pre-authorization data record 824, the corresponding counterparty data may include an IP address or a MAC address assigned to terminal device 122 operated by the Lucky Strike™ bowling alley, or one or more geographic positions associated with terminal device 122 or the Lucky Strike™ bowling alley. Further, and as described herein, the payment data incorporated within each of first pre-authorization data record 822 and second pre-authorization data record 824 may include an identifier of, or tokenized associated with, the Visa™ credit card account held by user 101.

Additionally, in some examples, the discrete elements of parameter data included within each of first pre-authorization data record 822 and second pre-authorization data record 824 may specify the expected parameter values that characterize respective ones of the first and second supplemental data exchanges (e.g., as maintained within corresponding portions of first supplemental transaction data 804 and second supplemental transaction data 806). For instance, the parameter data of first pre-authorization data record 822 may include the expected transaction value of $22.50 and the UPCs (or other identifiers) assigned to the expected soft drinks or cocktails, and the parameter data of second pre-authorization data record 824 may include the expected transaction value of $10.00 and the UPCs (or other identifiers) assigned to the pizza.

Further, discrete element of temporal data incorporated within each of first pre-authorization data record 822 and second pre-authorization data record 824 may specify a temporal interval during which client device 102 is expected to initiate respective ones of the first and second supplemental data exchanges at terminal device 122. In some examples, pre-authorization staging module 816 may perform operations that compute the specified temporal interval for each of the first and second supplemental data exchanges based on an adjustment to corresponding ones of the relative temporal intervals (e.g., as maintained within corresponding ones of the first supplemental transaction data 804 and second supplemental transaction data 806) that reflect the initiation time of the now-authorized parent data exchange (e.g., as maintained within parent initiation data 818).

For instance, and based on portions of first supplemental transaction data 804, pre-authorization staging module 816 may determine that client device 102 is expected to initiate the first supplemental data exchange between five to eight minutes after the initiation of the parent data exchange, e.g., the purchase of the bowling shoe rental). Further, and based on portions of second supplemental transaction data 806, pre-authorization staging module 816 may determine that client device 102 is expected to initiate the second supplemental data exchange between fifteen and eighteen minutes after the initiation of the parent data exchange. Pre-authorization staging module 816 may also establish that client device 102 initiated the parent data exchange at 9:09 p.m. on Friday, Apr. 13, 2018 (e.g., based on potions of parent initiation data 818).

In some examples, pre-authorization staging module 816 may compute a first specified temporal interval indicating an expectation that client device 102 will initiate the first supplemental data exchange at terminal device 122 between 9:14 p.m. and 9:18 p.m. on April 13$^{th}$, and a second specified temporal interval indicating an expectation that client device 102 will initiate the second supplemental data exchange at terminal device 122 between 9:24 p.m. and 9:28 p.m. on April 13$^{th}$. Pre-authorization staging module 816 may perform additional operations that package the first specified temporal interval within a corresponding portion of first pre-authorization data record 822, and that package the second specified temporal interval within a corresponding portion of second pre-authorization data record 824.

The disclosed embodiments are, however, not limited to these exemplary elements of pre-authorization data, and in other examples, first pre-authorization data record 822 or second pre-authorization data record 824 may include any additional, or alternate element of data that facilitates a pre-authorization of corresponding ones of the first and second supplemental data exchanges by issuer system 140. Further, although described in terms of two supplemental data exchanges associated with a single parent data exchange, contextual transaction system 130 may perform any of the exemplary processes described herein to identify and characterize any additional, or alternate, number of parent or supplemental data exchanges, and to request pre-authorization of these additional, or alternate, parent or supplemental data exchanges.

Referring back to FIG. 8, pre-authorization staging module 816 may perform operations that provide pre-authorization request data 820 as an input to routing module 225, which may perform operations that cause contextual transaction system 130 to transmit pre-authorization request data 820 across network 120 to a unique network address of issuer system 140, e.g., using any appropriate communications protocol. Further, issuer system 140 may perform any of the exemplary processes described herein, either alone or in conjunction with payment network system 150 or tokenization system 160, to pre-authorize the first and second supplemental data exchanges in accordance with the expected parameter values, to generate a pre-authorization token that represents each of the pre-authorized supplemental data exchange, and to provision that pre-authorization token to a terminal device operated by the corresponding counterparty, e.g., terminal device 122 operated by the Lucky Strike™ bowling alley.

Figure 9:
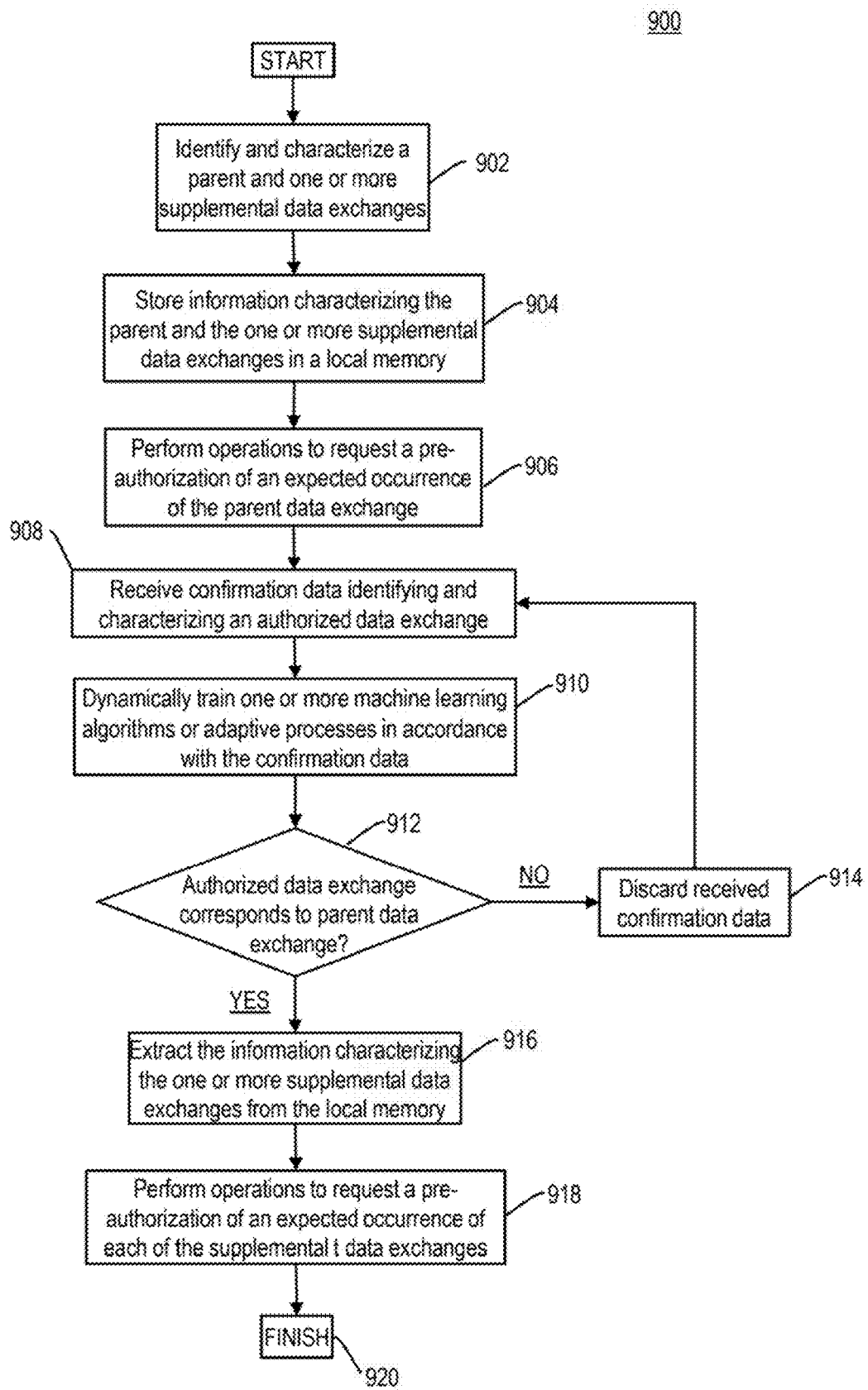
FIG. 9 is a flowchart of an exemplary process for requesting a pre-authorization of staged parent and supplemental data exchanges, consistent with the disclosed embodiments.

FIG. 9 is a flowchart of an exemplary process 900 for requesting a pre-authorization of staged parent and supplemental data exchanges, in accordance with disclosed embodiments. In some examples, contextual transaction system 130 may perform the steps of exemplary process 900, which include, among other things, detecting an initiation and successful authorization of a parent data exchange, and in response to that detected initiation and successful authorization, identify one or more supplemental data exchanges associated with the parent data exchange, and requesting a pre-authorization of each of the identified supplemental data exchanges.

As described herein, the expected occurrence of each of the supplemental data exchanges may be conditioned upon the initiation and successful authorization of the corresponding parent data exchange, and a temporal interval during which a network connected client device, such as client device 102, is expected to initiate corresponding ones of the supplemental data exchanges may be established relative to an initiation time of the parent data exchange. Further, and as described herein, examples of the parent and supplemental data exchanges include, but are not limited to, purchase transactions initiated by one or more client devices, such as client device 102, at corresponding network connected terminal devices, such as terminal device 122.

Referring to FIG. 9, contextual transaction system 130 may perform any of the exemplary location-based or predictive processes described herein to identify and characterize a parent data exchange, and one or more supplemental data exchanges associated with or linked to the parent data exchange (e.g., in step 902). In some examples, as described herein, an expected occurrence of each of the supplemental data exchanges may be conditioned upon an initiation and successful authorization of the parent data exchange, and the temporal interval during which a client device is expected to initiate each of the supplemental data exchanges may be established by contextual transaction system 130 relative to an initiation time of the parent data exchange. In some instances, using any of the exemplary processes described herein, contextual transaction system 130 may store counterparty, parameter, temporal, and/or payment data characterizing each of the parent and supplemental data exchanges within a portion of a locally accessible memory, e.g., within transaction database 136 of FIG. 1 (e.g., in step 904).

Further, contextual transaction system 130 may perform any of the exemplary processes described herein to request a pre-authorization of the expected occurrence of the parent data exchange (e.g., in step 906) For example, in step 906, contextual transaction system 130 may access transaction database 136, and package all, or portions, of the stored data corresponding to the parent data exchange into corresponding elements of pre-authorization request data, which contextual transaction system 130 may transmit across network 120 to issuer system 140 using any appropriate communications protocols. Issuer system 140 may perform any of the exemplary processes described herein, either alone or in conjunction with payment network system 150 or tokenization system 160, to pre-authorize the parent data exchange in accordance with the expected parameter values, to generate a pre-authorization token that represents the now pre-authorized parent data exchange, and to provision that pre-authorization token to a terminal device operated by the corresponding counterparty, e.g., terminal device 122 of FIG. 1.

In some examples, contextual transaction system 130 may receive, through a corresponding programmatic interface, confirmation data from issuer system 140 that confirms an initiation and a successful authorization of an exchange of data between client and terminal devices (e.g., in step 908). For example, and as described herein, the received confirmation data may include a unique authorization code indicative of the authorization of the data exchange, along with transaction data that characterizes the now-authorized data exchange. In response to the receipt of the confirmation data, contextual transaction system 130 may perform any of the exemplary processes described herein the train or adaptively improve one or more of the machine learning algorithms (or processes) or adaptive processes based on the transaction data that characterizes the authorized parent data exchange (e.g., in step 910).

Contextual transaction system 130 may also process the received confirmation data to identify and extract portions of the transaction data that identifies and characterizes the authorized data exchange, and based on a comparison between the extracted portions of the transaction data and corresponding portions of stored transaction data characterizing the parent data exchange (as maintained within transaction database 136), contextual transaction system 130 may determine whether the authorized data exchange corresponds to the parent data exchange (e.g., in step 912). For example, if contextual transaction system 130 were to determine that authorized data exchange differs from, and is inconsistent with, the parent data exchange (e.g., step 912; NO), contextual transaction system 130 may decline to request a pre-authorization of the supplemental data exchanges linked to the parent data exchange, and may discard the received confirmation data (e.g., in step 914). In some instances, exemplary process 900 may pass back to step 908, and contextual transaction system 130 may await a receipt of additional data confirming the initiation and successful authorization of additional or alternate exchanges of data or purchase transactions.

Alternatively, if contextual transaction system 130 were to determine that the authorized data exchange is consistent with the parent data exchange (e.g., step 912; YES), contextual transaction system 130 may perform operations that identify and extract certain data records from transaction database 136 that characterize the supplemental data exchanges linked to, and associated with, the initiated and authorized parent data exchange (e.g., in step 916). In some examples, contextual transaction system 130 may perform any of the exemplary processes described herein to generate data that requests a pre-authorization of each of the supplemental data exchanges in accordance with expected counterparty, parameter, payment, and temporal values specified within the extracted data records, as adjusted in accordance with the initiation time of the authorized parent data exchange (e.g., in step 918).

Contextual transaction system 130 may perform operations that transmit the generated pre-authorization request data across network 120 to issuer system 140 (e.g., also in step 918). Issuer system 140 may perform any of the exemplary processes described herein, either alone or in conjunction with payment network system 150 or tokenization system 160, to pre-authorize the supplemental data exchanges in accordance with the expected counterparty, parameter, payment, and temporal values, to generate a pre-authorization token that represents each of the pre-authorized supplemental data exchanges, and to provision that pre-authorization token to a terminal device operated by the corresponding counterparty, e.g., terminal device 122. Exemplary process 900 is then complete in step 920.

V. Exemplary Hardware and Software Implementations

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification, including payment application 107, predictive engine 139, management module 202, API 210, triggering module 212, proximity detection module 218, pre-authorization request module 224, routing module 234, machine learning module 234, API 402, local management module 406, pre-authorization module 408, token request module 416, routing module 420, API 424, management module 426, token generation module 428, linking module 438, routing module 440, provisioning module 444, routing module 450, API 452, local provisioning module 454, payment initiation module 602, transaction initiation module 610, local authorization module 614, transaction management module 628, routing modules 640 and 642, API 643, reconciliation module 644, routing module 645, API 647, update module 648, API 807, triggering module 814, and pre-authorization staging module 816, can be implemented as one or more computer programs, i.e., one or more modules of computer program instructions encoded on a tangible non-transitory program carrier for execution by, or to control the operation of, a data processing apparatus (or a computing system).

Additionally, or alternatively, the program instructions can be encoded on an artificially-generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" refer to data processing hardware and encompass all kinds of apparatus, devices, and machines for processing data, including by way of example a programmable processor, a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) or an assisted Global Positioning System (aGPS) unit, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a client computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. A computer-implemented method, comprising:
receiving, by one or more processors, a first signal that includes first data characterizing an initiation of a first exchange of data between a client device and a terminal device;
based on the first data, accessing and loading, from a storage unit, and by the one or more processors, second data that characterizes an expected initiation of a second exchange of data during a corresponding temporal interval, the temporal interval being specified relative to an initiation time of the first data exchange; and
generating and transmitting, by the one or more processors, a second signal to a computing system, the second signal comprising pre-authorization data that requests a pre-authorization of the second data exchange, the pre-authorization data comprising a portion of the second data and a modified temporal interval that reflects the initiation time of the first data exchange,
the pre-authorization data instructing the computing system to perform operations that pre-authorize the second data exchange in accordance with the portion of the second data and the modified temporal interval.

2. The computer-implemented method of claim 1, wherein:
the second data exchange involves the client and terminal devices;
the pre-authorization data further instructs the computing system to transmit a digital token representative of the pre-authorized data exchange to the terminal device, the digital token being valid during the modified temporal interval and comprising a cryptogram associated with the client device; and
the cryptogram comprises a secure element hash value, a multi-use digital token consistent with a host card emulation protocol, or a cryptogram, hash value, or digital token consistent with an authorization protocol.

3. The computer-implemented method of claim 1, further comprising extracting the temporal interval from the second data, the temporal interval being characterized by a temporal boundary specified relative to the initiation time of the first data exchange, and the first data exchange being associated with the second data exchange.

4. The computer-implemented method of claim 3, further comprising:
computing a modified temporal boundary that reflects the initiation time of the first data exchange; and
generating the modified temporal interval in accordance with the modified temporal boundary.

5. The computer-implemented method of claim 1, further comprising:
extracting, from the second data, a value of a parameter that characterizes the expected initiation of the second data exchange and a data type available for use in the second data exchange; and
generating the pre-authorization data, the pre-authorization data comprising the parameter value, the available data type, and the temporal data, the pre-authorization data further instructing the computing system to perform operations that pre-authorize the data exchange in accordance with the parameter value, and using the available data type.

6. The computer-implemented method of claim 5, further comprising:
accessing and loading, from the storage unit, occurrence data that characterize prior exchanges of data initiated during prior temporal intervals;
performing operations that apply one or more machine learning processes to portions of the occurrence data; and
predicting at least one of the temporal interval, the parameter value, or the available data type based on the application of the one or more machine learning processes to the portions of the occurrence data; and
storing the at least one of the predicted temporal interval, parameter value, or available data type within a portion of the storage unit corresponding to the second data.

7. The computer-implemented method of claim 1, further comprising:
accessing and loading, from the storage unit, additional data that characterizes an expected initiation of the first data exchange between the client and terminal devices; and
generating and transmitting an additional signal to the computing system, the additional signal comprising additional pre-authorization data that requests a pre-authorization of the first data exchange, the pre-authorization data comprising a portion of the additional data, and the additional pre-authorization data instructing the computing system to pre-authorize the first data exchange in accordance with the portion of the additional data.

8. The computer-implemented method of claim 7, wherein:
the additional data comprises at least one of an expected parameter value or an expected data type; and
the computer-implemented method further comprises:
accessing and loading, from the storage unit, occurrence data that characterizes prior exchanges of data initiated during prior temporal intervals;
performing operations that apply one or more machine learning processes to portions of the occurrence data;
predicting at least one of expected parameter value or the expected data type based on the application of the one or more machine learning processes to the portions of the occurrence data; and
storing the at least one of the predicted parameter value, or available data type within a portion of the storage unit corresponding to the additional data.

9. The computer-implemented method of claim 1, further comprising:
accessing and loading, from the storage unit, machine learning data that characterizes one or more machine learning processes; and
based on portions of the machine learning data, performing operations that train the one or more machine learning processes in accordance with potions of the first data.

10. An apparatus, comprising:
a communications unit;
a storage unit storing instructions; and
at least one processor coupled to the communications unit and the storage unit, the at least one processor being configured to execute the instructions to:
receive a first signal via the communications unit, the first signal comprising first data characterizing an initiation of a first exchange of data between a client device and a terminal device;
based on the first data, access and load, from the storage unit, second data that characterizes an expected initiation of a second exchange of data during a corresponding temporal interval, the temporal interval being specified relative to an initiation time of the first data exchange;
generate and transmit a second signal to a computing system via the communications unit, the second signal comprising pre-authorization data that requests a pre-authorization of the second data exchange, the pre-authorization data comprising a portion of the second data and a modified temporal interval that reflects the initiation time of the first data exchange,
wherein the pre-authorization data instructs the computing system to perform operations that pre-authorize the second data exchange in accordance with the portion of the second data and the modified temporal interval.

11. The apparatus of claim 10, wherein:
the second data exchange involves the client and terminal devices;
the pre-authorization data further instructs the computing system to transmit a digital token representative of the pre-authorized data exchange to the terminal device, the digital token being valid during the modified temporal interval and comprising a cryptogram associated with the client device; and the cryptogram comprises a secure element hash value, a multi-use digital token consistent with a host card emulation protocol, or a cryptogram, hash value, or digital token consistent with an authorization protocol.

12. The apparatus of claim 10, wherein the second data exchange is associated with the first data exchange, and the at least one processor is further configured to extract the temporal interval from the second data, the temporal interval being characterized by a temporal boundary specified relative to the initiation time of the first data exchange.

13. The apparatus of claim 12, wherein the at least one processor is further configured to:
compute a modified temporal boundary that reflects the initiation time of the first data exchange; and
generate the modified temporal interval in accordance with the modified temporal boundary.

14. The apparatus of claim 10, wherein the at least one processor is further configured to:
extract, from the second data, a value of a parameter that characterizes the expected initiation of the second data exchange and a data type available for use in the second data exchange; and
generate the pre-authorization data, the pre-authorization data comprising the parameter value, the available data type, and the temporal data,
wherein the pre-authorization data further instructs the computing system to perform operations that pre-authorize the data exchange in accordance with the parameter value and using the available data type.

15. The apparatus of claim 14, wherein the at least one processor is further configured to:
access and load, from the storage unit, occurrence data that characterizes prior exchanges of data initiated during prior temporal intervals;
perform operations that apply one or more machine learning processes to portions of the occurrence data, the one or more machine learning processes comprising an association-rule process, a clustering process, a collaborative filtering process, or an artificial intelligence process; and
predict at least one of the temporal interval, the parameter value, or the available data type based on the application of the one or more machine learning processes to the portions of the occurrence data; and
store the at least one of the predicted temporal interval, parameter value, or available data type within a portion of the storage unit corresponding to the second data.

16. The apparatus of claim 10, wherein the at least one processor is further configured to:
access and load, from the storage unit, additional data that characterizes the initiation of the first data exchange; and
generate and transmit an additional signal to the computing system via the communications unit, the additional signal comprising additional pre-authorization data that requests a pre-authorization of the first data exchange, the pre-authorization data comprising a portion of the additional data, and the additional pre-authorization data instructing the computing system to pre-authorize the first data exchange in accordance with the portion of the additional data.

17. The apparatus of claim 16, wherein:
the additional data comprises at least one of an expected parameter value or an expected data type; and
the at least one processor is further configured to:
access and load, from the storage unit, occurrence data that characterizes prior exchanges of data during prior temporal intervals;
perform operations that apply one or more machine learning processes to portions of the occurrence data;
predict at least one of the expected parameter value or the expected data type based on the application of the one or more machine learning processes to the portions of the occurrence data; and
store the at least one of the predicted parameter value or the available data type within a portion of the storage unit corresponding to the additional data.

18. The apparatus of claim 10, wherein the at least one processor is further configured to:
access and load, from the storage unit, machine learning data that characterizes one or more machine learning processes; and
based on portions of the machine learning data, perform operations that train the one or more machine learning processes in accordance with potions of the first data.

19. A tangible, non-transitory computer-readable medium storing instructions that, when executed by at least one processor, performs a method, the method comprising:
receiving a first signal that includes first data characterizing an initiation of a first exchange of data between a client device and a terminal device;
based on the first data, accessing and loading, from a storage unit second data that characterizes an expected initiation of a second exchange of data during a corresponding temporal interval, the temporal interval being specified relative to the initiation time of the first data exchange; and
generating and transmitting a second signal to a computing system, the second signal comprising pre-authorization data that requests a pre-authorization of the second data exchange, the pre-authorization data comprising a portion of the second data and a modified temporal interval that reflects the initiation time of the first data exchange,
the pre-authorization data instructing the computing system to perform operations that pre-authorize the second data exchange in accordance with the portion of the second data and the modified temporal interval.

20. The tangible, non-transitory computer-readable medium of claim 19, wherein:
the second data exchange involves the client and terminal devices;
the pre-authorization data further instructs the computing system to transmit a digital token representative of the pre-authorized data exchange to the terminal device, the digital token being valid during the modified temporal interval and comprising a cryptogram associated with the client device; and
the method further comprises:
accessing and loading, from the storage unit, machine learning data that characterizes one or more machine learning processes; and
based on portions of the machine learning data, performing operations that train the one or more machine learning processes in accordance with potions of the first data.

* * * * *